United States Patent
Tsubouchi et al.

[19]

[11] Patent Number: 6,112,637
[45] Date of Patent: Sep. 5, 2000

[54] NEGATIVE PRESSURE TYPE BOOSTER

[75] Inventors: Kaoru Tsubouchi, Toyota; Akihiko Miwa, Anjo, both of Japan

[73] Assignee: Aisin Seiki Kabushiki Kaisha, Kariya, Japan

[21] Appl. No.: 09/163,192

[22] Filed: Sep. 30, 1998

[30] Foreign Application Priority Data

| Sep. 30, 1997 | [JP] | Japan | 9-265921 |
| Nov. 28, 1997 | [JP] | Japan | 9-327730 |
| Nov. 28, 1997 | [JP] | Japan | 9-327731 |

[51] Int. Cl.$^7$ ........................................ F15B 9/17
[52] U.S. Cl. ........................... 91/173; 91/376 R; 91/519
[58] Field of Search ........................... 60/547.1, 554; 91/376 R, 173, 519; 92/65

[56] References Cited

U.S. PATENT DOCUMENTS

| 4,117,769 | 10/1978 | Carré et al. |
| 4,610,483 | 9/1986 | Matsumoto et al. ............... 91/519 |
| 4,640,097 | 2/1987 | Kobayashi ...................... 60/554 |
| 5,094,080 | 3/1992 | Gautier et al. ................. 91/519 |
| 5,178,441 | 1/1993 | Heibel et al. ................. 60/547.1 |
| 5,275,265 | 1/1994 | Castel ........................ 91/376 R |
| 5,802,951 | 9/1998 | Satoh et al. ................ 91/376 R |
| 5,890,775 | 4/1999 | Tsubouchi et al. ............ 91/376 R |

FOREIGN PATENT DOCUMENTS

| 3943002 | 7/1991 | Germany. |
| 4227286 | 2/1994 | Germany. |
| 19635016 | 3/1997 | Germany. |
| 2-274649 | 11/1990 | Japan. |
| 5-24533 | 2/1993 | Japan. |
| 9-226562 | 9/1997 | Japan. |
| 94/04402 | 3/1994 | WIPO. |

*Primary Examiner*—F. Daniel Lopez
*Attorney, Agent, or Firm*—Burns, Doane, Swecker & Mathis LLP

[57] ABSTRACT

An automatically operable negative pressure type booster can be applied for a front stage pressurizing function in a braking fluid pressure control apparatus with braking and steering control. The booster includes a housing, a movable wall dividing the housing interior into a front chamber and a rear chamber, a valve housing outputting a braking force to an output rod, an input member, and a control valve. The output rod can be divided into a first member and a second member. The booster further includes an auxiliary movable wall which can be engaged with the first member, a partition wall forming an auxiliary variable pressure chamber behind the auxiliary movable wall, and an electromagnetic valve unit selectively communicating the auxiliary variable pressure chamber with the front chamber or atmosphere. Further, a negative pressure type booster which is able to achieve the smooth flow of air from a space portion into a variable pressure chamber includes a housing, a movable wall, and a plate forming a space portion between the housing and the plate. An air passage retractable in the axial direction is disposed in a constant pressure chamber and communicates the space portion with a variable pressure chamber. An electromagnetic valve unit selectively communicates the variable pressure chamber with a negative pressure source or atmosphere through the space portion and the air passage. One end portion of the air passage is engaged in an airtight manner with only the plate member.

32 Claims, 19 Drawing Sheets

NEGATIVE PRESSURE TYPE BOOSTER

This application corresponds to and claims priority under 35 U.S.C. § 119 with respect to Japanese Application No. 09(1997)-265921 filed on Sep. 30, 1997, Japanese Application No. 09(1997)-327730 filed on Nov. 28, 1997 and Japanese Application No. 09(1997)-327731 filed on Nov. 28, 1997, the entire content of each of which is incorporated herein by reference.

FIELD OF THE INVENTION

The present invention generally relates to a brake booster. More particularly, the present invention pertains to a negative pressure type brake booster for assisting a braking force in a vehicle.

BACKGROUND OF THE INVENTION

A negative pressure type booster for reducing an operating force during braking of a vehicle is widely known and used. This booster includes a constant pressure chamber always communicating with an intake manifold of an engine so that a negative pressure is applied, a variable pressure chamber selectively under one state in which the variable pressure chamber is cut off from the constant pressure chamber and is communicated with the atmosphere and another state in which the variable pressure chamber is communicated with the constant pressure chamber so that the negative pressure is applied, a vacuum valve for switching the communication between the constant pressure chamber and the variable pressure chamber, and an air valve for switching the communication between the variable pressure chamber and the atmosphere. Through the operation of a brake operation member of a vehicle, the vacuum valve and the air valve are switched so that a pressure difference corresponding to the operating force of the brake operation member is set between the constant pressure chamber and the variable pressure chamber. As a result, an amplified output according to the operating force of the brake operation member is generated.

In recent years, there is known a negative pressure type booster which includes an electrically operated solenoid valve. Even at the time when a driver does not operate the brake operation member, the variable pressure chamber is communicated with the atmosphere by the operation of the solenoid valve so that a large pressure difference is generated between the variable pressure chamber and the constant pressure chamber and a large output is generated. For example, Japanese Patent Unexamined Publication No. Hei. 5-24533 discloses this type of negative pressure type booster.

In a braking fluid pressure control device of a vehicle having braking and wheel control (oversteer restraining control) and the like in which, for example, in the case where a vehicle is put in an oversteering state upon rotation of the vehicle, a pump is driven so that without braking operation by the driver, brake fluid is supplied to the outside front wheel to temporarily increase the brake fluid pressure of the outside front wheel to escape the oversteering state, a front stage pressurizing function for supplying pressurized brake fluid to the pump is required so that the pump can smoothly supply brake fluid to the outside front wheel.

In the case where the front stage pressurizing function is performed by the above conventional negative pressure type booster, for example, in the situation where a vehicle is put in an oversteering state upon rotation of the vehicle, a solenoid valve is first electrically operated without a braking operation of the driver, and a variable pressure chamber is communicated with the atmosphere by the operation of the solenoid valve so that a large pressure difference is generated between the variable pressure chamber and a constant pressure chamber, and the output is generated. Next, the output of the negative pressure type booster is converted into a fluid pressure by a well-known master cylinder, pressurized brake fluid is supplied to a pump, and the pump sucks the pressurized brake fluid and supplies the brake fluid to the side of the outside front wheel.

However, in the structure of fluid pressure piping of a brake apparatus having the braking and wheel control, it has been conceivable to provide a construction such that wheels other than the rotation outside front wheel are communicated with the master cylinder. That is, in the conventional negative pressure type booster, the solenoid valve is operated so that air completely enters the variable pressure chamber and a large output is generated. In the case where the conventional negative pressure type booster as the front stage pressurizing function is operated in the braking and wheel control or the like, a large fluid pressure is directly applied from the master cylinder to wheels other than a wheel to be controlled through the braking and wheel control. Thus, there is a fear that the performance of the braking and wheel control cannot be sufficiently achieved.

Another conventional negative pressure type booster disclosed in Japanese Patent Unexamined Publication No. Hei. 9-226562 includes a housing containing at least one pressure chamber and a movable wall disposed in the housing so as to be capable of moving back and forth. The movable wall divides the pressure chamber into a constant pressure chamber positioned at a front side and in communication with a negative pressure source and a variable pressure chamber positioned at a rear side and selectively communicated with the negative pressure source and the atmosphere. A bottomed cylindrical portion is disposed at the front portion of the housing and extends toward the constant pressure chamber, and a plate member is disposed in the constant pressure chamber. The plate member includes an annular flange portion having a bottomed cylindrical shape and extending outward from an open front end portion, a space portion airtightly separated from the constant pressure chamber and formed between the outer peripheral portion and the bottom portion of the bottomed cylindrical portion, and an opposite portion around the bottomed cylindrical portion of the housing and opposite to the angular flange portion. An introduction passage which is retractable in the axial direction is disposed in the constant pressure chamber, one end of which is held between the bottom portion of the plate member and the bottom portion of the bottomed cylindrical portion of the housing, and communicates the space portion with the variable pressure chamber. A groove is formed at one end portion of the introduction passage and communicates the space portion with the inside of the introduction passage, and a first inlet is formed at the opposite portion of the housing and communicates the constant pressure chamber with the outside of the housing. A second inlet which is formed at the outer peripheral portion of the opposite portion of the housing communicates the constant pressure chamber with the outside of the housing. A first conduit communicates with the first inlet and a second conduit communicates with the second inlet. A switching device communicates the first conduit with the second conduit so that the variable pressure chamber is communicated with the constant pressure chamber through the first conduit, the second conduit, the space portion, the groove, and the inside of the introduction passage, and cuts off the communication between the first conduit and the second conduit to cut off the communication between the variable pressure chamber and the constant pressure chamber so that the first conduit is communicated with the atmosphere and the variable pressure chamber is communicated with the atmosphere through the first conduit, the space portion, the groove, and the inside of the introduction passage. An output member is disposed in the inside of the introduction passage, passes through the bottom of the plate member and the bottomed cylindrical portion, and outputs a propelling force to the outside of the apparatus by the movement of the movable wall.

In this conventional negative pressure type booster, when the switching device is operated to communicate the space portion with the atmosphere through the first conduit, the air flowing into the space portion flows into the inside of the introduction passage from the space portion through the groove formed on the one end portion of the introduction passage, and then flows into the variable pressure chamber. When the air is introduced into the variable pressure chamber, a pressure difference is generated between the constant pressure chamber and the variable pressure chamber, the movable wall is advanced, and the propelling force caused by the advance of the movable wall is outputted to the outside of the apparatus through the output member.

However, in the foregoing conventional negative pressure type booster, when air flows into the inside of the introduction passage from the space portion, the air must pass through the thin groove formed at the one end portion of the introduction passage and so there is a fear that the introduction of the air from the space portion to the constant pressure chamber as well as the introduction passage cannot be smoothly carried out.

Moreover, although the one end portion of the introduction passage is held between the bottomed cylindrical portion of the housing and the bottom portion of the plate member, some negative pressure type boosters are structured such that a portion bulging in a constant pressure chamber is made a cylindrical portion and a rear portion of a master cylinder is disposed to the inside of the constant pressure chamber through this cylindrical portion. In the negative pressure type booster of such a construction, there is a fear that such a disadvantage arises that one end portion of an introduction passage is not stably held.

Moreover, because the rear end portion of the master cylinder is disposed at the bottomed cylindrical portion of the housing, a reinforcing plate having a substantially bottomed cylindrical shape is disposed around the bottomed cylindrical portion of the housing of the negative pressure type booster to reinforce the housing. However, in the foregoing conventional negative pressure type booster, because the space portion is formed also between the outside flange portion of the plate member and the portion opposite to the outer flange portion of the housing, when the reinforcing plate is set in the conventional negative pressure type booster, a large space is required for the formation of the space portion at the front portion of the constant pressure chamber so that the volume of the constant pressure chamber is decreased and the use of space in the constant pressure chamber is hindered.

Moreover, the switching device is a member separate from the housing and is disposed outside of the housing. This increases the size of the negative pressure type booster.

In light of the foregoing, a need exists for a negative pressure type booster which can be automatically operated and can be applied for a front stage pressurizing function in a brake fluid pressure control apparatus with braking and steering control and the like, and which makes the braking and steering control and the like more effective.

A need also exists for a negative pressure type booster in which the inflow of air from a space portion into a variable pressure chamber can be smoothly carried out.

SUMMARY OF THE INVENTION

According to one aspect of the present invention, a negative pressure type booster includes a housing in which at least one pressure chamber is formed, a piston including a movable wall and a valve housing coupled to the movable wall, with the movable wall being disposed in the housing for moving back and forth with respect to the housing and dividing the pressure chamber into a front chamber adapted to be communicated with a negative pressure source and a rear chamber adapted to be selectively communicated with the negative pressure source and the atmosphere. An input member is disposed in the valve housing for moving back and forth with respect to the valve housing and is capable of being moved by a braking operation. A valve mechanism is disposed in the valve housing and includes a negative pressure valve for communicating the rear chamber with the front chamber according to movement of the input member and an atmosphere valve for communicating the rear chamber with the atmosphere according to movement of the input member. An output member outputs to the outside a propelling force of the valve housing caused by movement of the movable wall. The output member is formed by a first member at a front side and a second member at a rear side. An auxiliary movable wall is disposed in the front chamber for moving back and forth and is capable of being engaged with the first member. A partition member is provided for forming an auxiliary variable pressure chamber behind the auxiliary movable wall, and a switching device selectively communicates the auxiliary variable pressure chamber with the negative pressure source or the atmosphere. An urging device is adapted to urge the partition member rearward so that the partition member is brought into contact with the piston and urge the piston rearward.

In accordance with another aspect of the invention, a negative pressure type booster includes a housing having at least one pressure chamber, a piston, an input member, and a valve mechanism. The piston includes a movable wall and a valve housing coupled to the movable wall, with the movable wall being disposed in the housing for moving back and forth with respect to the housing and dividing the pressure chamber into a front chamber adapted to communicate with a negative pressure source and a rear chamber adapted to be selectively communicated with the negative pressure source and the atmosphere. The input member is disposed in the valve housing for moving back and forth with respect to the valve housing and is adapted to be moved by a braking operation. The valve mechanism is disposed in the valve housing and includes a negative pressure valve for selectively communicating the rear chamber with the front chamber according to movement of the input member and an atmosphere valve for selectively communicating the rear chamber with the atmosphere according to movement of the input member. An output member outputs to the outside a propelling force of the valve housing caused by movement of the movable wall, with the output member including a first member at a front side and a second member at a rear side. An auxiliary movable wall is disposed in the front chamber for moving back and forth and is adapted to engage the first member. A partition member forms an auxiliary variable pressure chamber behind the auxiliary movable wall. The partition member has a flexible curved portion including an outer peripheral cylindrical portion protruding forward, an inner peripheral cylindrical portion protruding forward at an inner peripheral side of the outer periphery cylindrical portion, and a connection portion for connecting a front portion of the outer peripheral cylindrical portion and a front portion of the inner peripheral cylindrical portion. A contact portion extends from a rear portion of the inner peripheral cylindrical portion to the inner peripheral side and comes in contact with the auxiliary movable wall. A switching device selectively communicates the auxiliary variable pressure chamber with the negative pressure source or the atmosphere.

Another aspect of the present invention involves a negative pressure type booster that includes a housing having at least one pressure chamber, a movable wall disposed in the housing for moving back and forth, a plate member, an introduction passage, and a switching device. The movable wall divides the pressure chamber into a constant pressure chamber positioned at a front side that is adapted to be communicated with a negative pressure source and a variable pressure chamber positioned at a rear side that is adapted to be selectively communicated with the negative pressure source and the atmosphere. The plate member is disposed in the constant pressure chamber and forms a space portion separated in an airtight manner from the constant pressure chamber between the plate member and the housing. The introduction passage is disposed in the constant pressure chamber, with one end portion of the introduction passage being in contact with only the plate member and communicating the space portion with the variable pressure chamber. The switching device selectively communicates the variable pressure chamber with the negative pressure source or the atmosphere through the space portion and the introduction passage. An output member for outputting to the outside a propelling force caused by movement of the movable wall.

According to a further aspect of the invention, a negative pressure type booster includes a housing having at least one pressure chamber, a piston, an input member, a valve mechanism, a first negative pressure passage, and an output member. The piston includes a movable wall and a valve housing coupled to the movable wall, with the movable wall being disposed in the housing for moving back and forth with respect to the housing. The movable wall divides the pressure chamber into a front chamber adapted to communicate with a negative pressure source and a rear chamber adapted to be selectively communicated with the negative pressure source and the atmosphere. The input member is disposed in the valve housing for moving back and forth with respect to the valve housing and being movable by a braking operation. The valve mechanism is disposed in the valve housing and including a negative pressure valve for communicating the rear chamber with the front chamber according to movement of the input member and an atmosphere valve for communicating the rear chamber with the atmosphere according to movement of the input member. The first negative pressure passage is formed in the valve housing for communicating the front chamber with the negative pressure valve, and the output member outputs to the outside a propelling force of the valve housing caused by movement of the movable wall. The output member is defined by a first member at a front side and a second member at a rear side. An auxiliary movable wall is disposed in the front chamber for back and forth movement, and is adapted to be engaged with the first member. A partition member forms an auxiliary variable pressure chamber behind the auxiliary movable wall, and a switching device selectively communicates the auxiliary variable pressure chamber with the negative pressure source or the atmosphere. A second negative pressure passage is formed between the partition member and the piston for communicating the front chamber with the first negative pressure passage.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
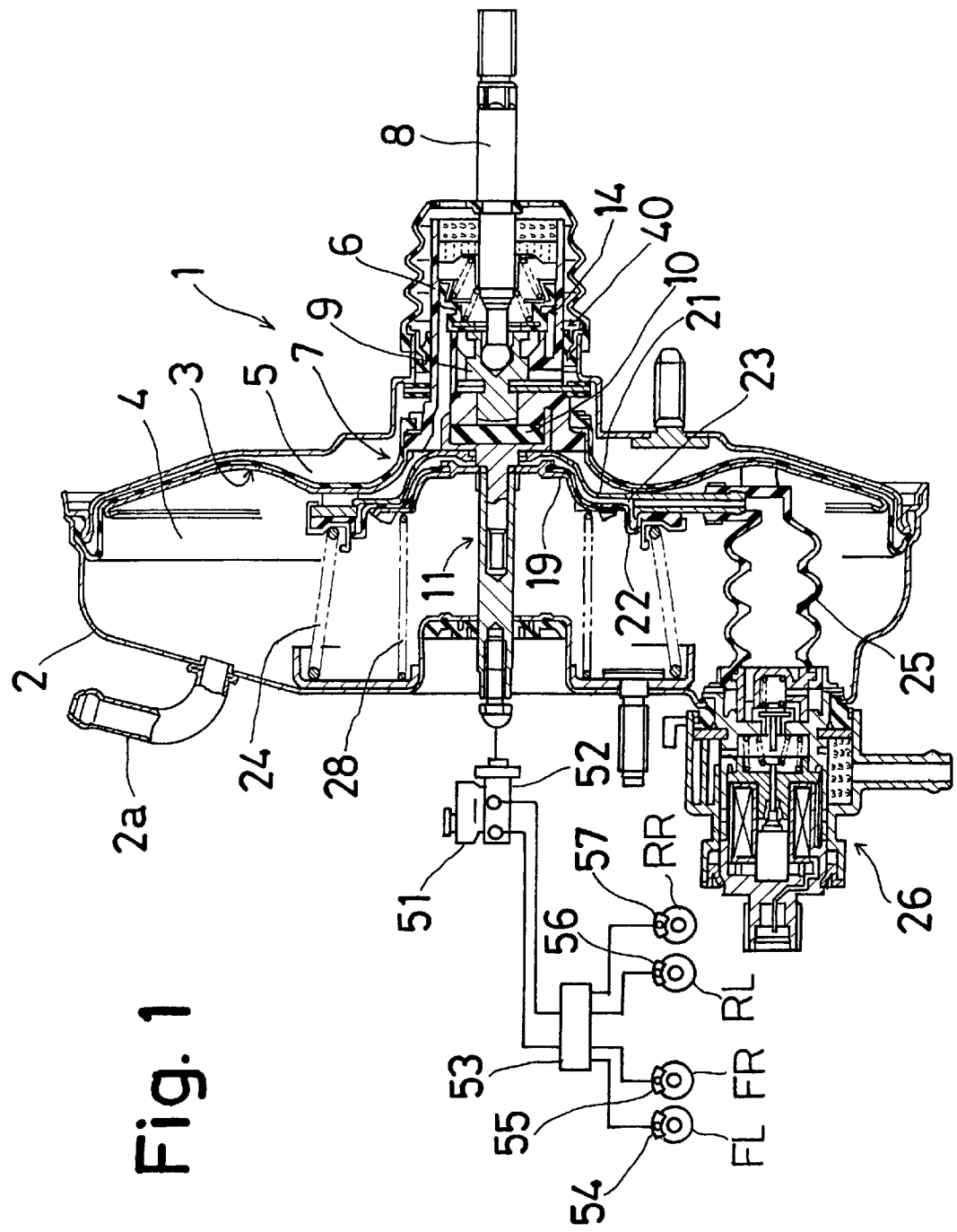
FIG. 1 is a cross-sectional view of a negative pressure type booster according to a first embodiment of the present invention.
Figure 2:
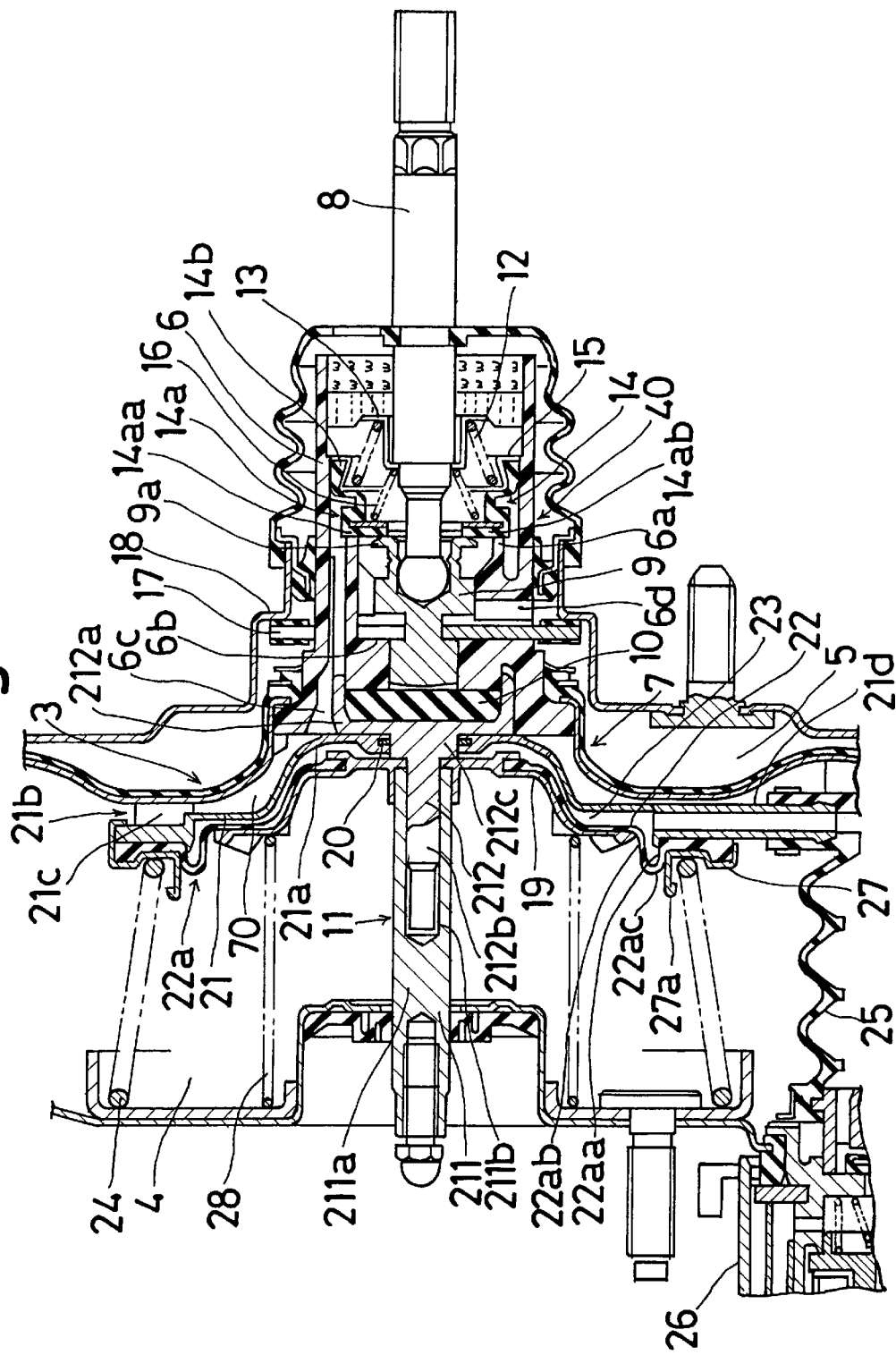
FIG. 2 is an enlarged cross-sectional view of a portion of the negative pressure type booster shown in FIG. 1 in the vicinity of the output rod.

With reference to FIGS. 1 and 2, a master cylinder including a reservoir tank 51 is disposed in front of a negative pressure type booster 1. An actuator portion 53 for effecting ABS (Anti-lock Brake System), TRC (Traction Control), and braking and steering control is connected to the master cylinder 52 through a fluid pressure conduit. A plurality of wheel cylinders 54, 55, 56, 57 disposed at respective wheels FL, FR, RL, RR are connected to the actuator portion 53 through fluid pressure conduits.

The negative pressure type booster 1 includes a housing 2 containing a movable wall 3 whose outer periphery is fixed in an air-tight manner. The movable wall 3 is movable in the rearward and forward direction (i.e., the right and left direction in FIG. 1). A pressure chamber in the housing 2 is divided in an air-tight manner into a front chamber 4 and a rear chamber 5 by the movable wall 3. The front chamber 4 is communicated with the intake manifold of an engine of a vehicle serving as a negative pressure source through an inlet 2a so that negative pressure is always generated.

A valve housing 6 made of a resin material is inserted into the housing 2 from the rear, and the movable wall 3 is fixed in an air-tight manner to the valve housing 6 at the inner peripheral end. The movable wall 3 and the valve housing 6 form a piston 7 which moves in the housing 2 in the rear and front direction.

An input rod 8 is located within the inside of the valve housing 6. The rear end of the input rod 8 is coupled to a brake operation member of the vehicle, for example, a brake pedal. The input rod 8 is integrally coupled to an input member 9 so as to be movable.

The input member 9 serves to transmit the input from the input rod 8 to a reaction disk 10. An output rod 11 brought into contact with the reaction disk 10 is moved by receiving the input through the reaction disk 10 to operate a piston of the master cylinder 52.

A first retainer 13 for receiving a return spring 12 is fixed to the input rod 8. A second retainer 15 for supporting the rear end portion 14b of a control valve 14 is fixed to the valve housing 6. The second retainer 15 receives the elastic force from the input rod 8 through the first retainer 13 and the return spring 12. The control valve 14 is engaged with the second retainer 15 at an inner periphery of the rear end portion 14b in FIG. 2, and produces a seal between an outer periphery of the control, valve 14 and the valve housing 6. A valve spring 16 is provided between the retainer for supporting a seal portion 14a as the front end portion of the control valve 14 and the first retainer 13.

With the above structure, in an inoperative state of the input rod 8, an air valve portion 14aa of the seal portion 14a of the control valve 14 engages an air valve seat 9a formed at a rear end of the input member 9. In an operative state of the input rod 8, a vacuum valve portion 14ab of the seal portion 14a can be engaged with a vacuum valve seat 6a provided on the valve housing 6. That is, the air valve 14aa and the air valve seat 9a make up an atmosphere valve, and the vacuum valve portion 14ab and the vacuum valve seat 6a make up a negative pressure valve. The control valve 14, the air valve seat 9a of the input member 9, and the vacuum valve seat 6a of the valve housing 6 make up a valve mechanism 40.

A key 17 is inserted in a key groove 6b disposed in the valve housing 6 and contacts the housing 2 through a damper member 18 in an inoperative state. Further, a first vacuum path 6c for communicating the front chamber 4 with the negative pressure valve and an air path 6d for communicating the rear chamber 5 with the atmosphere valve are formed in the valve housing 6. A front chamber side opening of the first vacuum path 6c which opens in the front chamber 4 is formed at a front end portion of the valve housing 6, and a rear chamber side opening of the air path 6d which opens in the rear chamber 5 is formed at a side portion of the valve housing 6.

An auxiliary movable wall 19 and a partition wall 21 are disposed in the front chamber 4. The auxiliary movable wall 19 is urged rearward by the return spring 28. The auxiliary movable wall 19 engages with a front side (i.e., the left side in FIG. 2) first member 211 of the output rod 11 at the inner periphery of the auxiliary movable wall 19, and the partition wall 21 airtightly engages a rear side (i.e., the right side in FIG. 2) second member 212 of the output rod 11 through a seal member 20. The auxiliary movable wall 19 and the partition wall 21 engage each other in an airtight manner through the seal member 22, and an auxiliary variable pressure chamber 23 is formed between the auxiliary movable wall 19 and the partition wall 21. The partition wall 21 receives an urging force from the housing 2 by a return spring 24 through the seal member 22, and the piston 7 is also urged rearward by the return spring 24 through the seal member 22 and the partition wall 21.

The rear end of an air passage 25 functioning as an introduction passage is coupled in an airtight manner to an inlet 21d that communicates with the auxiliary variable pressure chamber 23 formed at the partition wall 21. The air passage 25 passes through the front chamber 4, and the front end of the air passage 25 engages an electromagnetic valve unit 26 in an airtight manner. Thus, the air passage 25 communicates with the electromagnetic valve unit 26. The air passage 25 has a bellows shape and is retractable/extensible in the rear and front direction.

The output rod 11 is made up of the first member 211 at the front side and the second member 212 at the rear side. The second member 212 includes a bottomed cylindrical portion 212a containing the reaction disk 10 and fitted to the front end side of the valve housing 6, and an engaged shaft portion 212b engaged with the first member 211. The first member 211 includes a shaft portion 211a and an engaged hole 211b in which is positioned the engaged shaft portion 212b of the second member 212 is inserted.

The inner peripheral portion of the auxiliary movable wall 19 is fixed in an airtight manner to the rear end portion of the first member 211 by press insertion. The partition wall 21 integrally includes an engaged portion 21a which is in contact with the front end surface of the bottomed cylindrical portion 212a of the second member 212 and is fitted in an airtight manner to the outer periphery of the engaged shaft portion 212b through the seal member 20. The engaged portion 21a is flexible.

The seal member 22 is a flexible member having an inner peripheral portion that is engaged in an airtight manner with the auxiliary movable wall 19 and an outer peripheral portion that is engaged in an airtight manner with the outer peripheral portion of the partition wall 21 by a retainer 27.

The auxiliary variable pressure chamber 23 is thus surrounded in an airtight manner by the output rod 11, the auxiliary movable wall 19, the partition wall 21, and the seal member 22.

A second vacuum path 70 is formed between the rear surface of the partition wall 21 and the front end surface of the piston 7.

The partition wall 21 includes a contact portion 21*b* capable of coming into contact with the movable wall 3 at the outer peripheral portion and the rear surface of the partition wall. The contact portion 21*b* is provided with a communication passage 21*c* for enabling communication between the front chamber 4 and the first vacuum path 6*c* through the second vacuum path 70 when the contact portion 21*b* is in contact with the movable wall 3.

The seal member 22 includes a curved portion 22*a* opening rearward between the inner peripheral portion and the outer peripheral portion. The curved portion 22*a* is made up of an outer peripheral annular portion 22*aa* protruding forwardly, an inner peripheral annular portion 22*ab* protruding forward at an inner peripheral side of the outer peripheral annular portion 22*aa*, and a connection portion 22*ac* connecting the front end portion of the outer peripheral annular portion 22*aa* and the front end portion of the inner peripheral annular portion 22*ab*.

A retainer 27 is provided with an annular protruding portion 27*a* extending forward at the front portion of the retainer 27 and in the vicinity of the outer peripheral side of the curved portion 22*a* of the seal member 22.

Figure 3:
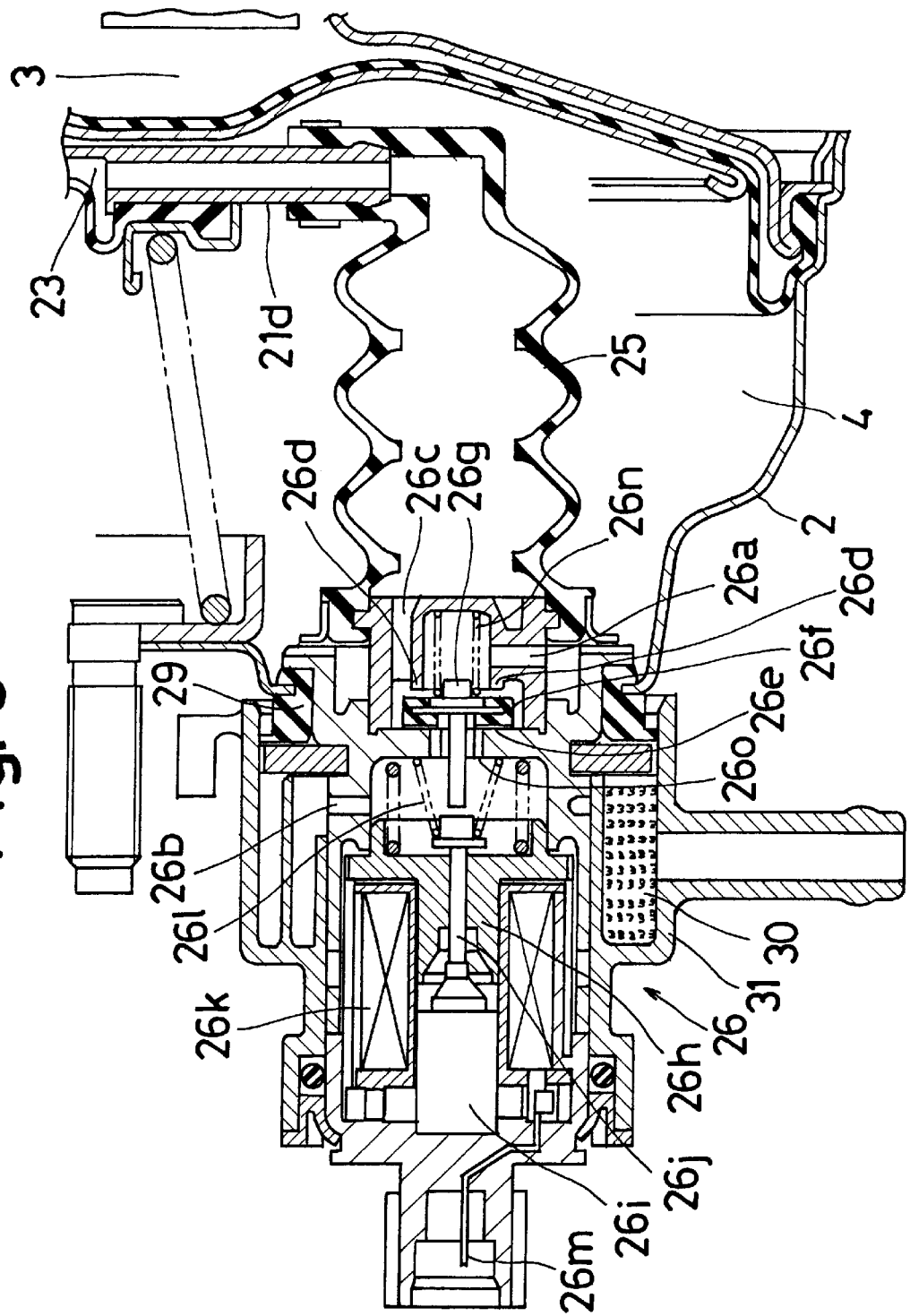
FIG. 3 is an enlarged cross-sectional view of the electromagnetic valve used in the negative pressure type booster shown in FIG. 1.

FIG. 3 is an enlarged view of the electromagnetic valve unit 26 shown in FIG. 1. The electromagnetic valve unit 26 constitutes a switching device for selectively communicating the auxiliary variable pressure chamber 23 of the negative pressure type booster 1 with the negative pressure source or the atmosphere. As illustrated in FIG. 3, the electromagnetic valve unit 26 is engages the front surface of the housing 2 through the seal member 29 in an airtight manner. The electromagnetic valve unit 26 includes, in its inside, a constant pressure port 26*a* communicating with the front chamber 4, an atmosphere port 26*b* communicating with an air introducing air cleaner 31 having a cleaner member 30, a variable pressure port 26*c* communicating with the air passage 25, a constant pressure valve seat 26*d* for permitting and preventing communication between the front chamber 4 and the auxiliary variable pressure chamber 23, an atmospheric valve seat 26*e* for permitting and preventing communication of the atmosphere and the auxiliary variable pressure chamber 23, a valve body portion 26*g* having a valve 26*f* as a valve body at the front end portion, a fixed core 26*h*, a movable core 26*i*, a rod portion 26*j* passing through the fixed core 26*h* and adapted to come into contact with the movable core 26*i* at the front end side, and a solenoid 26*k* disposed so as to cover the outer periphery of the fixed core 26*h* and the movable core 26*i*.

The electromagnetic valve unit 26 is provided with the air introducing air cleaner 31 at its outer peripheral portion which forms an air inflow path used for the inflow of the air into the air passage 25 through the electromagnetic valve unit 26 and detouring around the outer periphery of the electromagnetic valve unit 26. The air introducing air cleaner 31 is communicated with the inner space of the vehicle through a tube.

A spring 26*l* is disposed between the rod portion 26*j* as well as the movable core 26*i* and a partition wall to urge the movable core 26*i* in the direction in which the movable core 26*i* moves away from the fixed core 26*h* and to urge the rod portion 26*j* in the direction in which the rod portion 26*j* moves away from the valve body portion 26*g* (i.e., to the left in FIG. 3).

The solenoid 26*k* is connected to a power source of the vehicle by a terminal 26*m* and is supplied with electric power from the power source by a controller of the vehicle so that it is operated.

The valve body portion 26*g* is urged to the left in FIG. 3 by a spring 26*n* so that the valve 26*f* is detached from the constant pressure valve seat 26*d* and is brought into contact with the atmosphere valve seat 26*e*. The rod portion 26*j* and the valve body portion 26*g* are not in contact with each other in the inoperative state of the electromagnetic valve unit 26 shown in FIG. 3.

In this inoperative state, because the valve 26*f* and the constant pressure valve seat 26*d* are in the non-engaged state, the auxiliary variable pressure chamber 23 is communicated with the negative pressure source as well as the front chamber 4 through the inside of the air passage 25, the variable pressure port 26*c*, the clearance between the valve 26*f* and the constant pressure valve seat 26*d*, and the constant pressure port 26*a*.

On the other hand, when electric power is supplied to the solenoid 26*k* by the controller of the vehicle, the solenoid 26*k* is operated to attract the movable core 26*i* to the fixed core 26*h* so that the movable core 26*i* slides toward the fixed core 26*h* (i.e., to the right in FIG. 3). Thus, the movable core 26*i* presses the rod portion 26*j*, and the movable core 26*i* and the rod portion 26*j* move together to the right in FIG. 3.

The rear end portion of the rod portion 26*j* urged by the movable core 26*i* comes in contact with the front end portion of the valve body portion 26*g*, the rod portion 26*j* presses the valve body portion 26*g* rearward (i.e., to the right in FIG. 3), the valve 26*f* comes in contact with the constant pressure valve seat 26*d*, and the valve 26*f* and the atmosphere valve seat 26*e* assume the non-engaged state.

Thus, air is introduced into the auxiliary variable pressure chamber 23 from the vehicle inner space through the inside of the air passage 25, the variable pressure port 26*c*, the clearance between the valve 26*f* and the atmosphere valve seat 26*e*, the communication hole 26*o*, the atmosphere port 26*b*, and the air introducing air cleaner 31.

The actuator portion shown in FIG. 1 includes, in its inside, a fluid pressure conduit in which brake fluid flows, an electromagnetic valve unit for cutting off the flow of brake fluid in the fluid pressure conduit, a reservoir in which the brake fluid is stored, a pump unit for sucking and discharging the brake fluid, and an electric control unit (ECU) for controlling the electromagnetic valve unit, the pump unit and the like.

Figure 4:
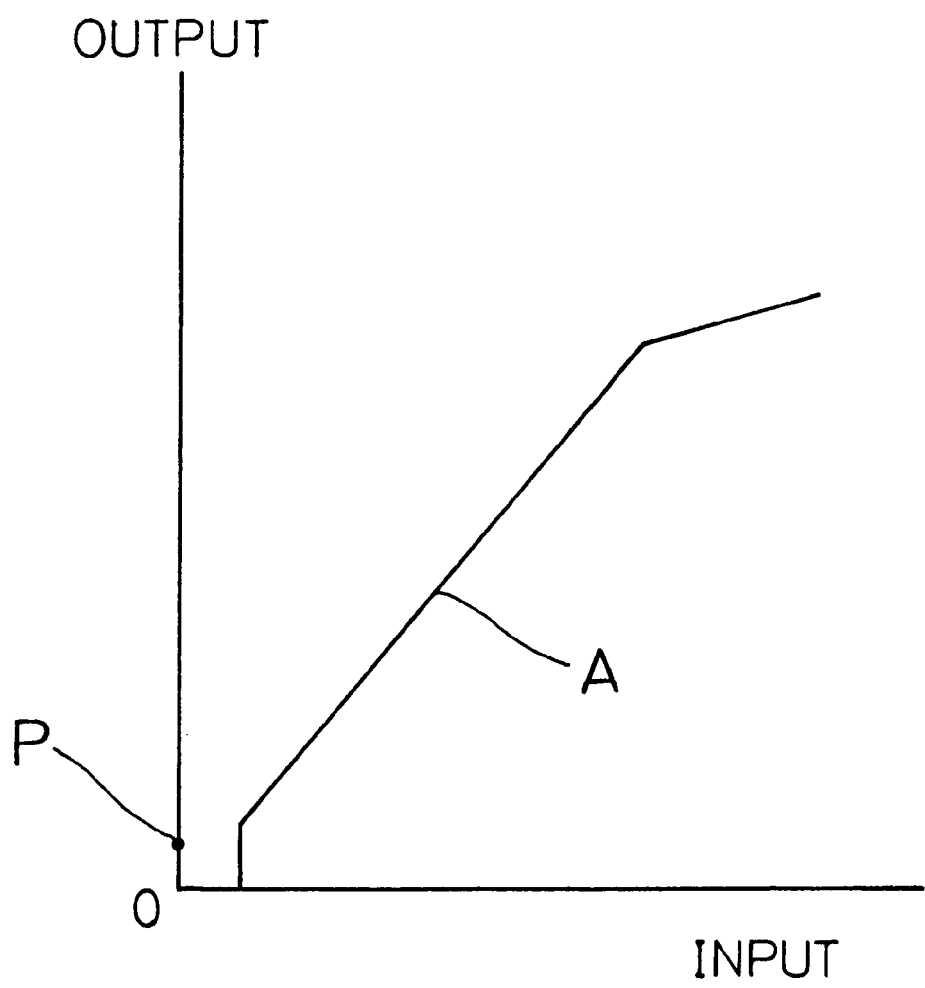
FIG. 4 is a characteristic input/output diagram of the negative pressure type booster according to the first embodiment of the present invention.

The operation of the negative pressure type booster 1 illustrated in FIGS. 1–3 is as follows. FIG. 4 is a characteristic diagram of the negative pressure type booster 1 in which the vertical axis indicates output, and the horizontal axis indicates input. In the initial state in which a driver does not operate the brake operation member of the vehicle, the partition wall 21 and the movable wall 3 of the piston 7 are in contact with each other by the urging force of the return spring 24. In addition, the air valve portion 14*aa* of the seal portion 14*a* of the control valve 14 is engaged with the air valve seat 9*a* of the input member 9, and the vacuum valve portion 14*ab* of the seal portion 14*a* is not engaged with the vacuum valve seat 6*a* of the valve housing 6. Thus, the rear chamber 5 is communicated with the engine intake manifold serving as the negative pressure source through the air path 6*d*, the clearance between the vacuum valve portion 14*ab* and the vacuum valve seat 6*a*, the first vacuum path 6*c*, the second vacuum path 70, the communication path 21*c*, the front chamber 4, and the inlet 2*a*.

When the driver operates the brake operation member of the vehicle (e.g., a brake pedal), the input rod 8 coupled with the brake operation member receives input so that the input rod 8 is moved forward. Thus, the input member 9 fixed to the input rod 8 is also moved forward together with the input rod 8.

By the movement of the input member 9, the seal portion 14*a* as well as the control valve 14 moves forward together with the input member 9 by the urging force of the valve spring 16, and then, the vacuum valve portion 14*ab* of the seal portion 14*a* comes in contact with the vacuum valve seat 6*a* of the valve housing 6, and the rear chamber 5 is cut off from the front chamber 4, so that the communication with the negative pressure source of the vehicle is also cut off.

Further, when the input member 9 moves forward, the engagement between the air valve portion 14*aa* of the seal portion 14*a* and the air valve seat 9*a* of the input member 9 is released, and the rear chamber 5 is communicated with the atmosphere through the air path 6*d* and the clearance between the air valve portion 14*aa* and the air valve seat 9*a*. Thus, a pressure difference is generated between the front chamber 4 and the rear chamber 5 by the inflow of air into the rear chamber 5. The movable wall 3 which receives the load caused by this pressure differential and the valve housing 6 coupled to the movable wall 3 (i.e., the piston 7) presses the second member 212 of the output rod 11 forward through the reaction disk 10, and presses the partition wall 21 forward through the contact portion 21*b*.

Because the second member 212 is pressed and moved forwardly, the front side end surface of the bottomed cylindrical portion 212 presses the partition wall 21, and a stepped portion 212*c* of the engaged shaft portion 112*b* of the second member 212 presses the auxiliary movable wall 19 and the first member 211 coupled to the auxiliary movable wall 19. That is, the piston 7, the partition wall 21, the auxiliary movable wall 19, and the seal member 22 advance together, and the piston 7 outputs an amplified input to the output rod 11.

When a propelling force of the piston 7 is outputted to the output rod 11 and the output rod 11 is moved forward, the piston of the master cylinder 52 is pressed, the brake fluid flows into the wheel cylinders 54, 55, 56, 57 through the actuator portion 53, and a braking force is applied to the respective wheels FL, FR, RL, and RR.

Subsequently, by virtue of a counter force received by the input rod 8 through the input member 9 from the reaction disk 10, the air valve portion 14*aa* of the seal portion 14*a* and the air valve seat 9*a* of the input member 9, and the vacuum valve portion 14*ab* of the seal portion 14*a* and the vacuum valve seat 6*a* of the valve housing 6 are selectively engaged so that an assisting force of the negative pressure type booster 1 is controlled according to the input of the driver applied to the input rod 8. The counter force, caused by the propelling force of the piston 7 and the input generated by the operation of the brake pedal and transmitted to the input member 8 are applied to the reaction disk 10 and are balanced.

When the inside of the rear chamber 5 reaches atmospheric pressure by the inflow of air into the rear chamber 5, the piston 7 does not advance any more. Thereafter, the output of the negative pressure type booster 1 is made in such a manner that the input rod 8 and the input member 9 press the output rod 11 forward through the reaction disk 10. That is, the input becomes equal to the output.

In the case where the input member 9 presses the output rod 11, the second member 212 of the output rod 11 is first pressed forward by the input member 9 through the reaction disk 10. Next, because the second member 212 is pressed and moved forward, the front end surface of the bottomed cylindrical portion 212*a* presses the engaged portion 21*a* of the partition wall 21 to deform the engaged portion 21*a* forward, and the step portion 212*c* of the engaged shaft portion 212*b* of the second member 212 presses the auxiliary movable wall 19 and the first member 211 coupled to the auxiliary movable wall 19 in the forward direction.

The advance of the auxiliary movable wall 19 caused by the advance of the output rod 11 merely deforms the curved portion 22*a* of the seal member 22, and does not move the partition wall 21 forward. The entirety of the partition wall 21 is not moved forward by the forward deformation of the engaged portion 21*a* caused by the advance of the output rod 11. Thus, when the input member 9 presses the output rod 11, the contact portion 21*b* of the partition wall 21 is maintained in the state in which the contact portion is in contact with the movable wall 3 of the piston 7.

In this state of normal operation, because the solenoid 26*k* is in the inoperative state, the auxiliary variable pressure chamber 23 is communicated with the front chamber 4, there is no pressure difference between the front and the rear of the auxiliary movable wall 19, and the auxiliary movable wall 19 is in the inoperative state. The relationship between the braking operation force applied to the input rod 8 and the braking output to the output rod 11 at this time is indicated by characteristic line A in FIG. 4.

When the ECU of the actuator portion 53 detects, for example, the oversteering state of the vehicle during left rotation of the vehicle, a well-known operation of braking and steering control (oversteer restraining control) is initiated without a braking operation by the driver, whereby brake fluid pressure is applied to the rotation outside front wheel, that is the right front wheel FR, from the pump unit of the actuator portion 53.

While the operation of braking and steering control is started in the actuator portion 53, the power source supplies electric power to the solenoid 26*k*, and the automatic operation of applying an output larger than a normal output of the negative pressure type booster 1 is also started. The solenoid 26*k* supplied with the electric power generates an electromagnetic force to move the movable core 26*i* rearward against the urging force of the springs 26*l*, 26*n*.

As described above, because air is introduced into the auxiliary variable pressure chamber 23 by the movement of the movable core 26*i*, a pressure difference is generated between the rear and the front of the auxiliary movable wall 19, and the seal member 22 and the auxiliary movable wall 19 coupled to the seal member 22 are moved forward, while the outer peripheral cylindrical portion 22*aa*, the connecting portion 22*ac*, and the inner peripheral cylindrical portion 22*ab* of the curved portion 22*a* of the seal member 22 are sequentially brought into contact with the inner peripheral surface of the cylindrical portion 27*a* of the retainer 27.

The auxiliary movable wall 19 is moved so that only the first member 211 of the output rod 11 coupled to the auxiliary movable wall 19 is moved forward. The auxiliary movable wall 19 advances while shrinking the length of the air passage 25.

When the first member 211 is applied with the load caused by the pressure difference between the front chamber 4 and the auxiliary variable pressure chamber 23 and the first member 211 is moved forward, the piston of the master cylinder 52 is pressed, and the brake fluid pressurized by the negative pressure type booster 1 is applied from the master cylinder 52 to the pump unit of the actuator 53, and the respective wheel cylinders 54, 56, 57 of the wheels FL, RL, and RR not subjected to the braking and steering control.

The pump unit of the actuator portion 53 sucks the brake fluid pressurized by the negative pressure type booster 1, and discharges the brake fluid to the wheel cylinder 55 of the right front wheel FR. Thus, the braking force is applied to the right front wheel FR.

At this time, the relationship between the input applied to the input rod 8 in the negative pressure type booster 1 and the output to the first member 211 is indicated by point P in FIG. 4. That is, the negative pressure type booster 1 outputs the output P with the input being 0.

The amount of movement of the auxiliary movable wall 19 is preferably determined from a supply amount of brake fluid necessary for the pump unit of the actuator portion 53 to carry out pressurizing and supplying to the braking system during the braking and steering control. Moreover, in the structure in which a braking unit having the ABS function is applied, the braking and steering control is added to the braking unit, and the pump unit sucks the brake fluid from the master cylinder during the braking and steering control and discharges the brake fluid to the wheel to be controlled, the amount of movement of the auxiliary movable wall is determined from the pressure necessary for the front stage pressurizing function of the pump unit. For example, the amount of movement of the auxiliary movable wall 19 is 5 to 15 mm, and the pressurizing force of the brake fluid by the output P is 3 to 10 kg/cm$^2$. In the present invention, the size of the auxiliary movable wall 19 is suitably set so that such necessary pressure can be supplied. The output at point P in FIG. 4 becomes an output value suitable for the front stage pressurizing function to the pump operation of the braking and steering control.

Thus, at the start of the operation of the braking and steering control, the brake fluid pressurized by the automatic operation off the negative pressure type booster 1 is sucked from the master cylinder 52 to the pump unit of the actuator portion 53, so that the sucking and discharging operation of the pump unit can be made more smoothly, and further, the brake fluid pressure of the rotation outside front wheel can be smoothly increased. Because the fluid pressure applied to the noncontrolled wheels FL, RL, RR is small, the braking and steering control is not damaged.

As the result of the operation of the braking and steering control, the brake fluid pressure of the rotation outside front wheel is temporarily increased so that the oversteering state of a vehicle can be avoided. At the operation of the braking and steering control, the automatic operation of the negative pressure type booster 1 becomes equivalent to the front stage pressurizing function at the braking and steering control.

When the microcomputer of the actuator portion 53 detects the release of the braking and steering control, the supply of electric power from the power source to the solenoid 26K is stopped so that the solenoid 26k no longer generates the electromagnetic force applied to the movable core 26i. The movable core 26i is thus returned forward by the urging force of the spring 26l through the rod portion 26j. In addition, the valve body portion 26g is urged forward by the urging force of the spring 26n so that the valve 26f is separated from the constant pressure valve seat 26d and is brought into contact with the atmosphere valve seat 26e.

By virtue of the forward movement of the movable core 26i and the valve body portion 26g, the auxiliary variable pressure chamber 23 is cut off from the atmosphere and is again communicated with the front chamber 4, and the auxiliary movable wall 19 and the seal member 22 through the auxiliary movable wall 19 are pressed back by the return spring 28. That is, the front stage pressurizing operation of the negative pressure type booster 1 is ended.

In the braking and steering control, when the brake pedal is operated by the driver, the input rod 8 coupled thereto receives the input and is moved forward. Thus, the input member 9 fixed to the input rod 8 is also moved forward together with the input rod 8. The movement of the input member 9 also moves the seal portion 14a as well as the control valve 14 in the forward direction by the urging force of the valve spring 16 together with the input member 9, and then the vacuum valve portion 14ab of the seal portion 14a comes into contact with the vacuum valve seat 6a of the valve housing 6. The rear chamber 5 is thus cut off from the front chamber 4 so that the communication with the negative pressure source of the vehicle is also cut off.

Further, when the input member 9 is moved forward, the engagement between the air valve portion 14aa of the seal portion 14a and the air valve seat 9a of the input member 9 is released, so that the rear chamber 5 is communicated with the atmosphere. Thus, by the inflow of the air into the rear chamber 5, a pressure difference is generated between the front chamber 4 and the rear chamber 5. The movable wall 3 receiving the load caused by this pressure differential and the valve housing 6 coupled to the wall 3 (i.e., the piston 7) presses the second member 212 of the output rod 11 forward through the reaction disk 10 and presses the partition wall 21 forward through the contact portion 21b.

Because the braking and steering control is carried out, the first member 211 of the output rod 11 moves forward by a predetermined amount with respect to the piston 7 and the second member 212. Thus, during the first part of the movement of the piston 7 and the second member 212, the step portion 212c of the engaged shaft portion 212b of the second member 212 does not come in contact with the auxiliary movable wall 19 and the first member 211. When the piston 7 and the second member 212 advance by a predetermined amount with respect to the housing 2, the step portion 212c comes in contact with the auxiliary movable wall 19 and the first member 211 coupled to the auxiliary movable wall 19. After the contact between the second member 212 and the first member 211, the foregoing normal braking operation is carried out.

Further, in the structure in which the piston 7 is urged rearward through the partition wall 21 by the return spring 24, because the partition wall 21 includes the contact portion 21a capable of coming in contact with the piston 7, the partition wall 21 can stably receive the urging force from the return spring 24.

Moreover, because the second vacuum path 70 is disposed between the partition wall 21 and the piston 7, and the partition wall 21 includes the communication passage 21c, even when the partition wall 21 comes in contact with the piston 7, the communication between the first vacuum path 6c and the front chamber 4 can be made more certain by the second vacuum path 70 and the communication passage 21c.

Also, because the seal member 22 includes the curved portion 22a, when a pressure difference is generated between the auxiliary variable pressure chamber 23 and the front chamber 4, the auxiliary movable wall 19 as well as the seal member 22 can be smoothly moved forward.

Because the engaged portion 21a of the partition wall 21 is deformed by the movement of the second member 212, the entirety of the partition wall 21 does not move in accordance with the movement of the second member 212, the partition wall 21 maintains the state of being in contact with the piston 7, and the partition wall can stably receive the urging force from the return spring 24.

Also, because the air passage 25 is shrunk or reduced in length in the rear and front direction during the advance of the auxiliary movable wall 19, the movement of the auxiliary movable wall 19 can be made smoother.

In this embodiment of the present invention, although the negative pressure type booster of the present invention is applied in the braking fluid pressure circuit having the braking and steering control, the present invention is not limited in this regard, but rather can be applied to any braking fluid control circuit requiring the front stage pressurizing function. For example, it is possible to use the present invention in a braking fluid pressure unit of a vehicle including a traction control system or the like in which upon the application of an excessive driving force to the wheels so that the driving wheels slip on the road surface, without the application of a braking operation by the driver, a pump unit is driven to apply a braking force to the slipping driving wheel side to temporarily increase the brake pressure so that the slipping wheels grip the road surface and the wheels are effectively accelerated. When the present invention is utilized in this regard, it becomes possible to supply brake fluid to the slipping driving wheels more smoothly to give the braking force.

Also, in this embodiment, although the automatic operation caused by the operation of the electromagnetic valve unit 26 of the negative pressure type booster 1 is used as the front stage pressurizing function in the braking and steering control, the present invention is not limited in this regard. For example, the operation can be used as an automatic braking function in which, when the distance from a vehicle running ahead becomes shorter than a predetermined distance, and a controller of the vehicle determines that automatic braking is necessary on the basis of a value detected by a distance sensor attached to the front portion of the vehicle and by a method of judging the necessity of the automatic braking, electric power is supplied to the solenoid 26k from the power source independently of a braking operation of the driver so that the negative pressure type booster 1 generates an output more than the normal output.

Although the auxiliary variable pressure chamber 23 is described and illustrated as being surrounded by the output rod 11, the auxiliary movable wall 19, the seal member 22, and the partition wall 21, the present invention is not limited to this structure. For example, similar operations and effects can be obtained in a negative pressure type booster that includes an auxiliary variable pressure chamber formed by being surrounded with an auxiliary movable wall and a diaphragm as a partition member airtightly engaged with the auxiliary movable wall, or in the negative pressure type booster of the present invention that includes an auxiliary variable pressure chamber formed by being surrounded with only a diaphragm as a partition member behind an auxiliary movable wall.

The electromagnetic unit 26 is described as being communicated with the negative pressure source through the front chamber 4, but the present invention is not limited to such a construction. For example, similar advantages and effects can be obtained in a negative pressure type booster in which the electromagnetic valve unit is directly communicated with the negative pressure source.

Figure 5:
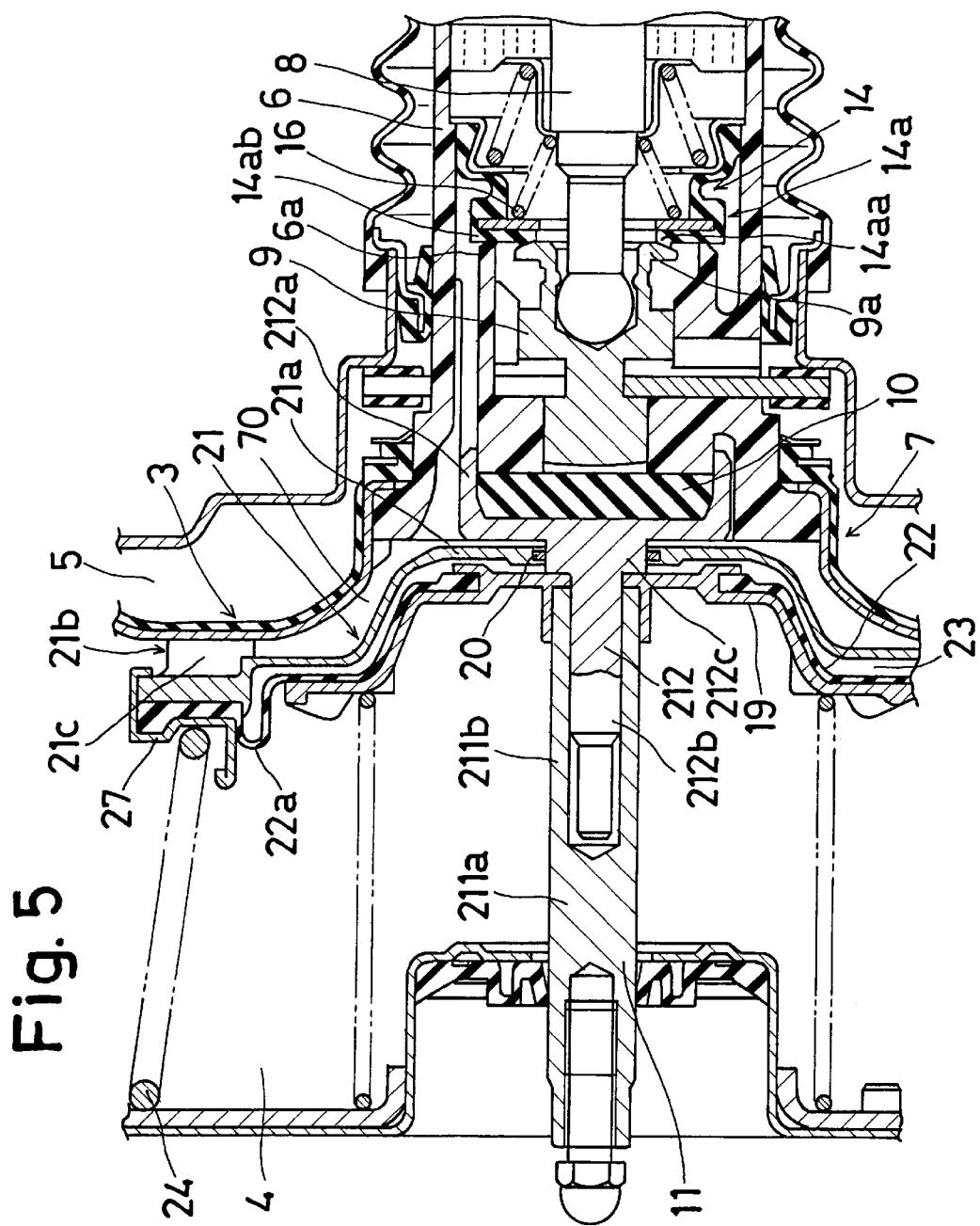
FIG. 5 is an enlarged cross-sectional view of a portion of a negative pressure type booster according to a second embodiment in the vicinity of the auxiliary movable wall.

A second embodiment of the present invention is illustrated in FIG. 5 and features in this embodiment that are the same as those in the above-described embodiment are identified by the same reference numerals. This embodiment differs from the first embodiment primarily with respect to the partition wall 21 and so a detailed description of all of the other parts of the booster will not be repeated here.

As shown in FIG. 5, the auxiliary movable wall 19 engaged with the front side (i.e., left side in FIG. 5) first member 211 of the output rod 11 at its inner peripheral portion and the partition wall 21 engaged in an airtight manner with the rear side (i.e., the right side in FIG. 5) second member 212 of the output rod 11 are disposed in the front chamber 4.

The auxiliary movable wall 19 and the partition wall 21 engage each other in an airtight manner through a seal member 22, and the auxiliary variable pressure chamber 23 is formed between the two walls 19, 21. The partition wall 21 receives an urging force from a housing 2 by a return spring 24 through the seal member 22, and the piston 7 is also urged rearward by the return spring 24 through the seal member 22 and the partition wall 21.

The output rod 11 is made up of the first member 211 at the front side and the second member 212 at the rear side. The second member 212 includes the bottomed cylindrical portion 212a containing the reaction disk 10 and fitted to the front end side of the valve housing 6, and an engaged shaft portion 212b engaged with the first member 211. The first member 211 includes the shaft portion 211a and the engaged hole 211b in which the engaged shaft portion 212b of the second member 212 is inserted.

The inner peripheral portion of the auxiliary movable wall 19 is fixed in an airtight manner to the rear end portion of the first member 211 by press insertion. The partition wall 21 is engaged in an airtight manner with the outer periphery of the engaged shaft portion 212b at the engaged portion 21a through the seal member 20 and is slidable in the rear and front direction. At an initial state, a predetermined clearance is provided between the engaged portion 21a and the front end surface of the bottomed cylindrical portion 212a of the second member 212, and the relative displacement between the engaged portion 21a and the second member 212 can be made in the rear and front direction.

The seal member 22 is flexible, with its inner peripheral portion being engaged in an airtight manner with the auxiliary movable wall 19 and with its outer peripheral portion being engaged in an airtight manner with the outer peripheral portion of the partition wall 21 by the retainer 27.

Thus, the auxiliary variable pressure chamber 23 is surrounded in an airtight manner by the output rod 11, the auxiliary movable wall 19, the partition wall 21, and the seal member 22.

For example, when the rear chamber 5 reaches atmospheric pressure by the inflow of air into the rear chamber 5, the piston 7 does not advance any more, and the output of the negative pressure type booster 1 thereafter is such that the input rod 8 and the input member 9 press the output rod 11 forward through the reaction disk 10. That is, the input becomes equal to the output.

In the case where the input member 9 presses the output rod 11, the second member 212 of the output rod 11 is pressed forward through the reaction disk 10 by the input member 9. Next, because the second member 212 is pressed and moved forward, the second member 212 slides on the inner peripheral portion of the engaged portion 21a of the partition wall 21 through the seal member 20, so that the step portion 212c of the engaged shaft portion 112b of the second member 212 presses forward the auxiliary movable wall 19 and the first member 211 is coupled to the auxiliary movable wall 19.

The advance of the auxiliary movable wall 19 caused by the advance of the output rod 11 merely deforms the curved portion 22a of the seal member 22 and does not move the partition wall 21 forward. Moreover, because the engaged portion 21a is not moved in accordance with the advance of the second member 212, the entirety of the partition wall 21 is not moved forward with the advance of the output rod 11. Thus, when the input member 9 presses the output rod 11, the contact portion 21b of the partition wall 21 maintains the state in which the contact portion is in contact with the movable wall 3 of the piston 7.

Thus, the entirety of the partition wall 21 does not move in accordance with the movement of the second member 212, so that the partition wall 21 maintains the state of being in contact with the piston 7 and can stably receive the urging force from the return spring 24.

Figure 6:
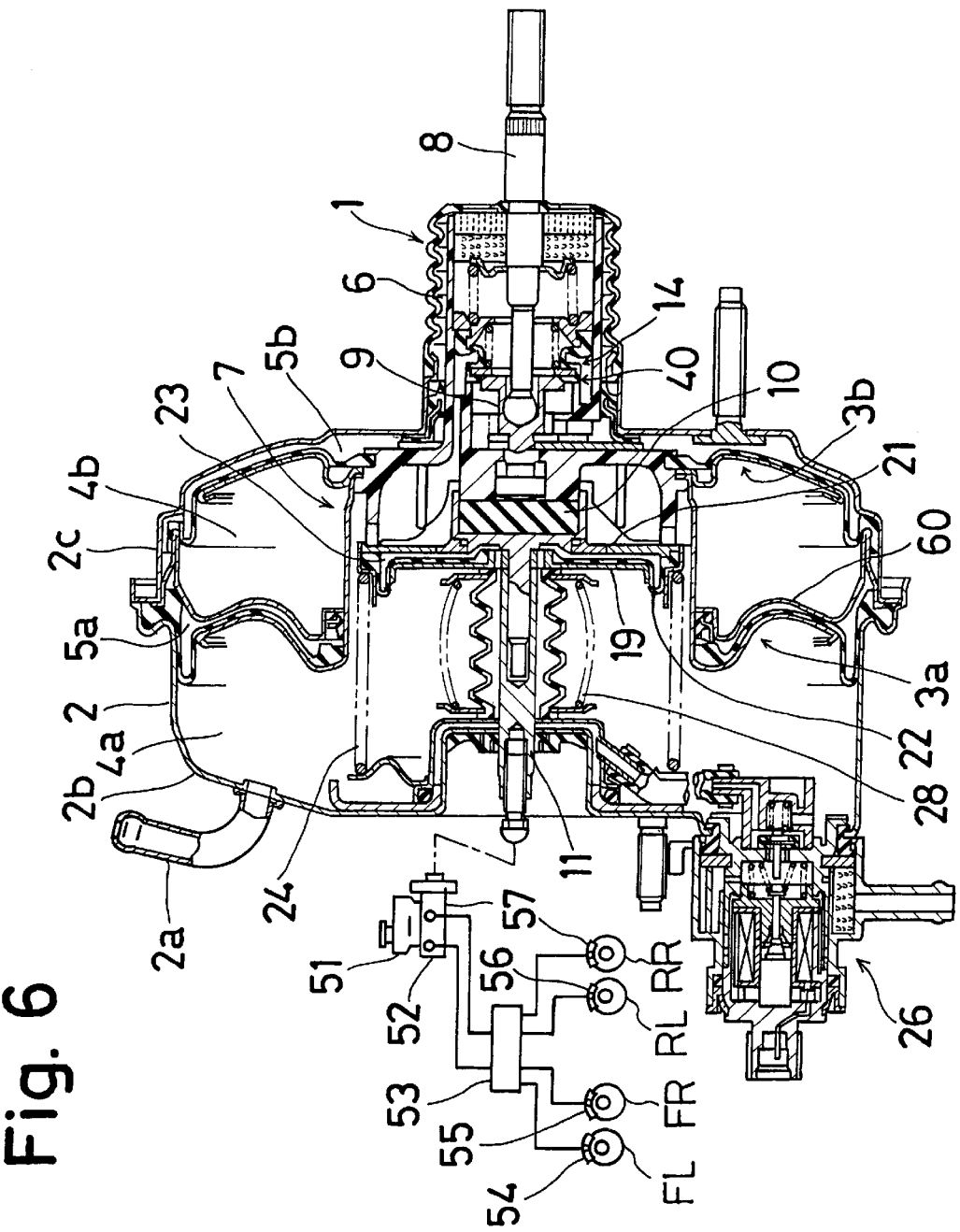
FIG. 6 is a cross-sectional view of a negative pressure type booster according to a third embodiment of the present invention.
Figure 7:
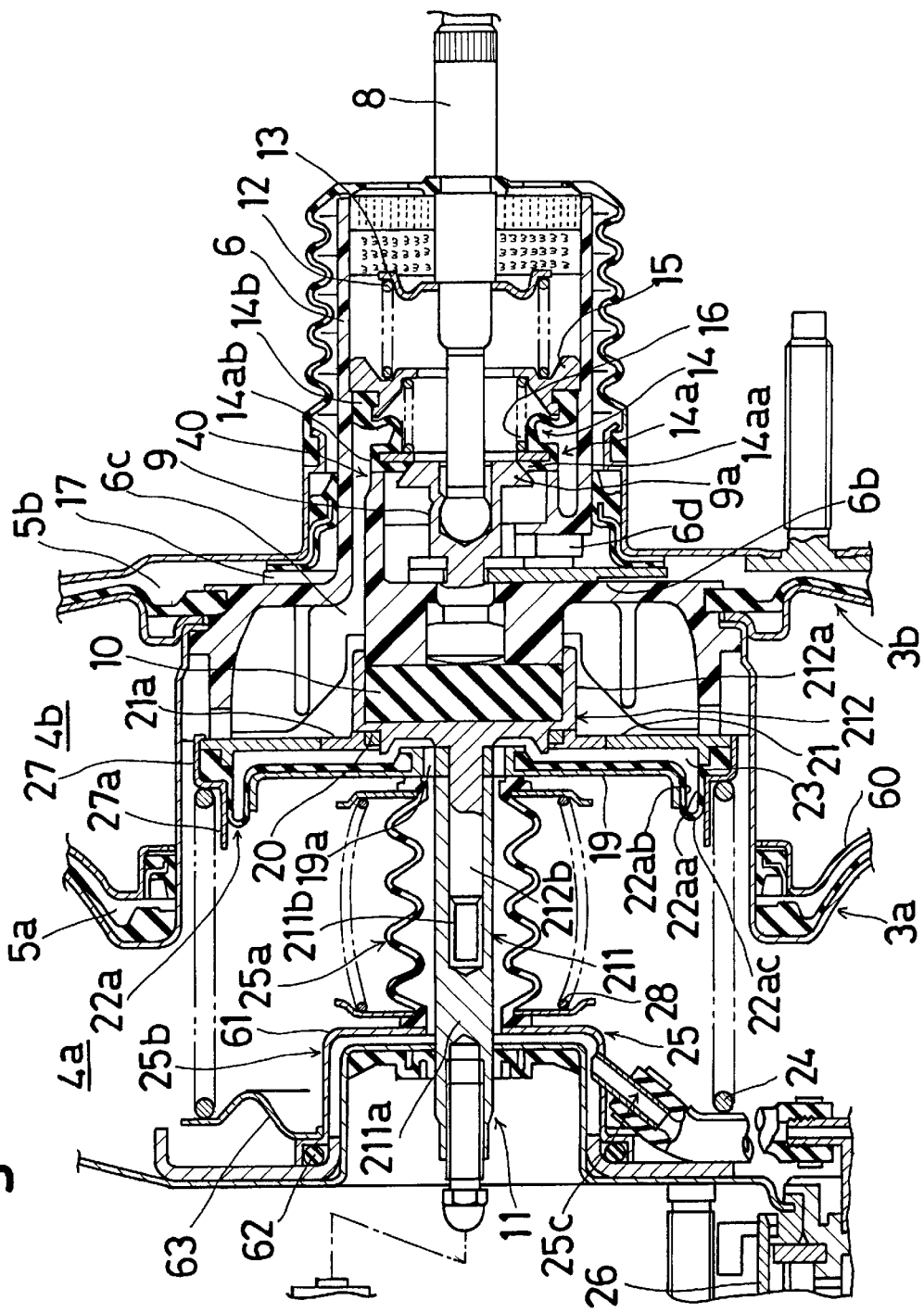
FIG. 7 is an enlarged cross-sectional view of a portion of the negative pressure type booster shown in FIG. 6 in the vicinity of the output rod.
Figure 8:
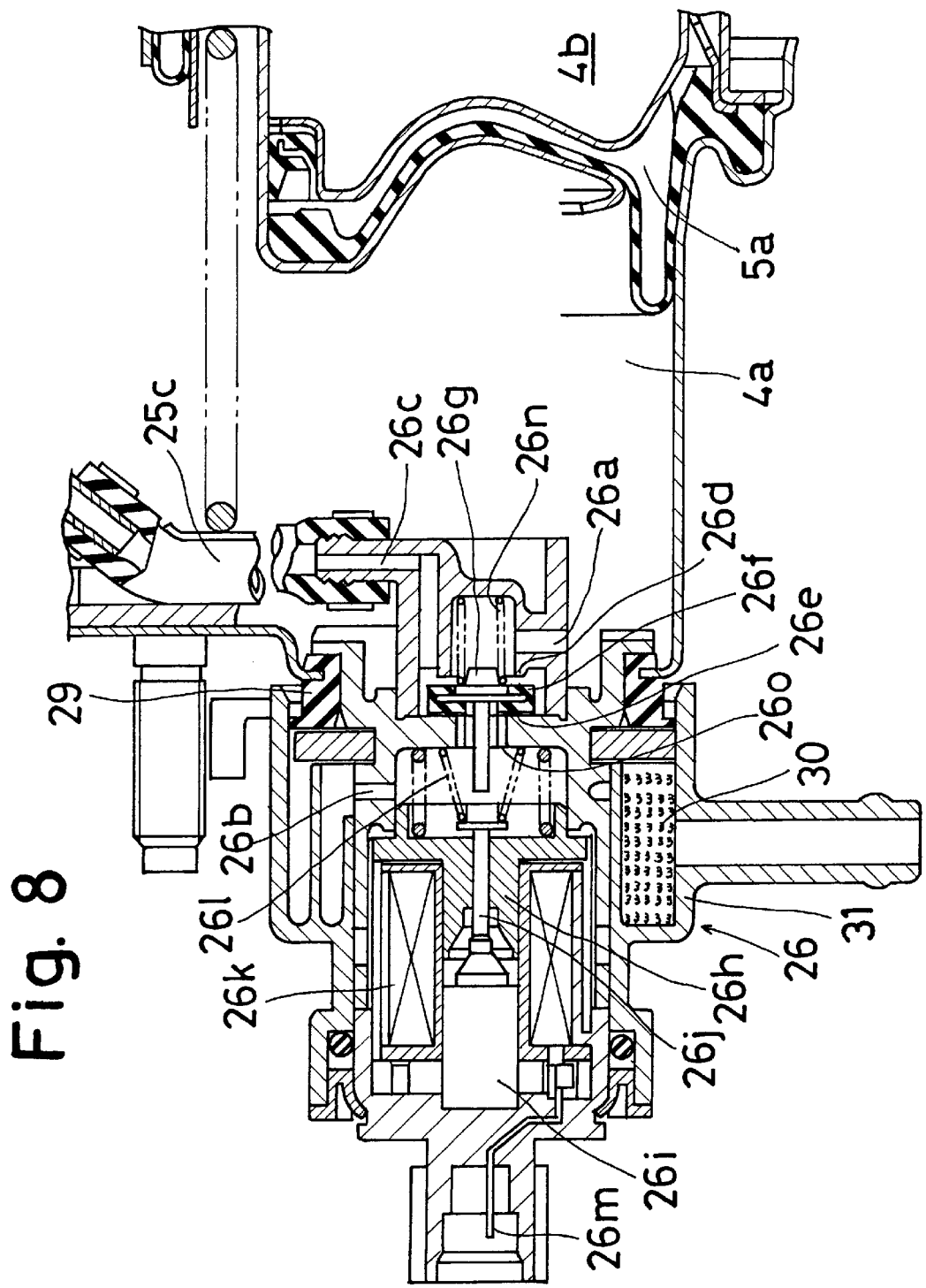
FIG. 8 is an enlarged cross-sectional view of the electromagnetic valve unit used in the negative pressure type booster shown in FIG. 6.

A third embodiment of the invention is illustrated in FIGS. 6–8. Features in this embodiment that are the same as those in the above-described embodiments are identified by the same reference numerals. This embodiment is similar to the first embodiment described above except for features relating to the pressure chamber in the housing 2, the structure of the auxiliary variable pressure chamber 23, and the structure of the air passage 25. A description of all of the details relating to other aspects of the booster will not be repeated here.

As shown in FIGS. 6 to 8, the housing 2 of the negative pressure type booster 1 includes a partition wall 60 dividing the pressure chamber in the housing 2 into a front pressure chamber and a rear pressure chamber, a first movable wall 3a having an outer peripheral portion fixed in an airtight manner in the front pressure chamber and movable in the rear and front direction (i.e., the right and left direction in FIG. 6), and a second movable wall 3b having an outer peripheral portion fixed in an airtight manner in the rear pressure chamber and movable in the rear and front direction (i.e., the right and left direction in FIG. 6). The first movable wall 3a divides the front pressure chamber in the housing 2 in an airtight manner into a first front chamber 4a and a first rear chamber 5a. The second movable wall 3b divides the rear pressure chamber in the housing 2 in an airtight manner into a second front chamber 4b and a second rear chamber 5b.

The first front chamber 4a is communicated with the intake manifold of an engine of a vehicle serving as a negative pressure source and thus always generates a negative pressure. The second front chamber 4b is communicated with the first front chamber 4a through a hole formed in a cylindrical portion of the first movable wall 3a. Thus, the second front chamber 4b is also always kept at a negative pressure.

The first rear chamber 5a is communicated with the second rear chamber 5b through a groove formed on the inner peripheral surface of a bead portion of an outer peripheral flange of the first movable wall 3a, a hole formed in the partition wall 60, and a groove formed on the outer peripheral surface of a bead portion of an outer peripheral flange of the second movable wall 3b.

A valve housing 6 made of a resin material is inserted in the housing 2 from the rear, and the movable walls 3a and 3b are airtightly fixed to the valve housing 6 at their inner peripheral ends. The movable walls 3a and 3b and the valve housing 6 form a piston 7 moving back and forth in the housing 2.

Disposed in the first front chamber 4a are the auxiliary movable wall 19 engaged with a front side (i.e., the left side in FIG. 7) first member 211 of the output rod 11 at its inner peripheral portion, and the partition wall 21 engaged in an airtight manner with the rear side (i.e., the right side in FIG. 7) second member 212 of the output rod 11 through a seal member 20. The auxiliary movable wall 19 and the partition wall 21 are engaged with each other in an airtight manner through a seal member 22, and the auxiliary variable pressure chamber 23 is formed between the two walls 19, 21. The partition wall 21 receives an urging force from the housing 2 by a return spring 24 through the seal member 22, and the piston 7 is also urged rearward by the return spring 24 through the seal member 22 and the partition wall 21.

The inner peripheral portion of the auxiliary movable wall 19 is fixed in an airtight manner to the rear end portion of the first member 211. The partition wall 21 is fitted in an airtight manner to the front end surface of a bottomed cylindrical portion 212a of the second member 212 through the seal member 20.

The air passage 25 for communicating the auxiliary variable pressure chamber 23 with the electromagnetic valve unit 26 is made up of a first air passage 25a, a second air passage 25b, and a third air passage 25c. The second air passage 25b is formed between the front portion of the inner surface of the housing 2 and a partition wall 61 disposed in an airtight manner at the inner surface front portion of the housing 2 through a seal member 62.

The second air passage 25b and the electromagnetic valve unit 26 are in airtight communication with each other through the third air passage 26c. The second air passage 25b and the auxiliary variable pressure chamber 23 are in airtight communication with each other through the first air passage 25a.

The first air passage 25a has a bellows shape, and is retractable/extensible in the rear and front direction (i.e., the right and left direction in FIG. 6). The first air passage 25a and the auxiliary variable pressure chamber 23 are communicated with each other through a communication hole 19a formed in the auxiliary movable wall 19.

A retainer is disposed at the front end portion and at the rear end portion of the first air passage 25a, and a return spring 28 is disposed between these retainers. The return spring 28 brings the first air passage 25a into airtight contact with the partition wall 61 and the auxiliary movable wall 19 by the urging force, and urges the auxiliary movable wall 19 rearward.

A retainer 63 is disposed at the outer peripheral portion of the partition wall 61, and a return spring 24 is disposed between the retainer 63 and another retainer 27. The return spring 24 urges the partition wall 61 toward the front of the housing 2 through the retainer 63 by the spring urging force so that the partition wall 61 is in airtight contact with the housing 2. Further, the return spring 24 urges the partition wall 21 rearward through the retainer 27 and the seal member 22 so that the partition wall 21 is in contact with the valve housing 6 of the piston 7.

The housing 2 is made up of a front shell 2b and a rear shell 2c. Upon assembling the negative pressure type booster 1, the front shell 2b integrally includes the partition wall 61, the third air passage 25c, and the electromagnetic valve unit 26, and the rear shell 2c integrally includes the piston 7, the input rod 8, the valve mechanism 40, the reaction disk 10, the output rod 11, and the auxiliary variable pressure chamber forming portions (i.e., the auxiliary movable wall 19, the partition member 21, etc.).

When the front shell 2b and the rear shell 2c are coupled together so that the first air passage 25a provided with the return spring 24 and the retainer and the return spring 28 are held between them, the return spring 28 is disposed between the retainer 63 and the retainer 27, and the first air passage 25a is disposed between the partition wall 61 and the auxiliary movable wall 19 in such a manner that the first air passage 25a includes the output rod 11 in its inside. That is, the assembling of the negative pressure type booster 1 is simplified.

Next, the operation of the booster will be described. The input and output characteristics of the negative pressure type booster 1 of this embodiment are substantially the same as the first embodiment and so the explanation will be set forth with reference to FIG. 4. As shown in FIG. 4 and FIGS. 6–8, in an initial state in which a driver does not operates the brake operation member of a vehicle, the partition wall 21 is in contact with the valve housing 6 by the urging force of the return spring 24, the air valve portion 14aa of the seal portion 14a of the control valve 14 is engaged with the air valve seat 9a of the input member 9, and the vacuum valve portion 14ab of the seal portion 14a is not engaged with the vacuum valve seat 6a of the valve housing 6. Thus, the second rear chamber 5b is communicated with the intake manifold of the engine of the vehicle through the air path 6d, the clearance between the vacuum valve portion 14ab and the vacuum valve seat 6a, the vacuum path 6c, the space between the inner peripheral portion of the front movable wall 3 and the outer peripheral portion of the partition wall 21, the first front chamber 4a, and the inlet to the manifold.

When the driver operates the brake operation member of the vehicle, for example, the brake pedal, the input rod coupled to the operation member receives the input and is moved forward. Thus, the input member 9 fixed to the input rod 8 is also moved forward together with the input rod 8.

The movement of the input member 9 causes the seal portion 14a as well as the control valve 14 to be moved forward by the urging force of the valve spring 16 together with the input member 9. The vacuum valve portion 14ab of the seal portion 14a is brought into contact with the vacuum valve seat 6a of the valve housing 6 and the second rear chamber 5b is cut off from the first front chamber 4a so that the communication between the rear chambers 5a, 5b and the negative pressure source of the vehicle is also cut off.

When the input member 9 is further moved forward, the engagement between the air valve portion 14aa of the seal portion 14a and the air valve seat 9a of the input member 9 is released, and the second rear chamber 5b is communicated with the atmosphere through the air path 6d and the clearance between the air valve portion 14aa and the air valve seat 9a. Thus, by the inflow of air into both of the rear chambers 5a, 5b, a pressure difference is generated between the front chambers 4a, 4b and the rear chambers 5a, 5b. The movable walls 3a, 3b receiving the load caused by the pressure differential and the valve housing coupled thereto (i.e., the piston 7) press the second member 212 of the output rod 11 forward through the reaction disk 10.

The second member 212 is pressed and moved forward so that the front end surface of the bottomed cylindrical portion 212a presses the partition wall 21, and a step portion 212c of the engaged shaft portion 212b of the second member 212 presses the auxiliary movable wall 19 and the first member 211 coupled to the auxiliary movable wall 19 forward. That is, the piston 7 outputs the amplified input to the output rod 11.

When a propelling force of the piston 7 is outputted to the output rod 11 and the output rod 11 is moved forward, a piston of the master cylinder 52 is pressed, brake fluid flows into the wheel cylinders 54, 55 56, 57 through the actuator portion 53, and a braking force is applied to the wheels FL, FR, RL, RR of the vehicle.

Subsequently, by the counter force received by the input rod 8 through the input member 9 from the reaction disk 10, the air valve portion 14aa of the seal portion 14a and the air valve seat 9a of the input member 9, and the vacuum valve portion 14ab of the seal portion 14a and the vacuum valve seat 6a of the valve housing 6 are selectively engaged with each other. The assisting force of the negative pressure type booster 1 is thus controlled according to the input of the driver applied to the input rod 8.

The counter force caused by the propelling force of the piston 7 and the input generated by the operation of the brake pedal and transmitted to the input member 8 are applied to the reaction disk 9 and are balanced.

When the interiors of the rear chambers 5a, 5b reach atmospheric pressure by the inflow of air into the rear chambers 5a, 5b, the piston 7 does not advance any more and thereafter the output of the negative pressure type booster 1 is made in such a manner that the input rod 8 and the input member 9 press the output rod 11 forward through the reaction disk 10. That is, the input becomes equal to the output.

When the input member 9 presses the output rod 11, the second member 212 of the output rod 11 is pressed forward by the input member 9 through the reaction disk 10. Next, because the second member 212 is pressed and moved forward, the front end surface of the bottomed cylindrical portion 212a presses the engaged portion 21a of the partition wall 21 to deform the engaged portion 21a forward, and the step portion 212c of the engaged shaft portion 212b of the second member 212 presses the auxiliary movable wall 19 and the first member 211 coupled to the auxiliary movable wall 19 in the forward direction.

The advance of the auxiliary movable wall 19 caused by the advance of the output rod 11 merely deforms the curved portion 22a of the seal member 22, and does not move the partition wall 21 forward. Also, the entirety of the partition wall 21 is not moved forward by the forward deformation of the engaged portion 21a caused by the advance of the output rod 11. Thus, when the input member 9 presses the output rod 11, the contact portion 21b of the partition wall 21 is maintained in the state in which the contact portion is in contact with the movable wall 3 of the piston 7.

During normal operation, because the solenoid 26k is in the inoperative state, the auxiliary variable pressure chamber 23 is communicated with the first front chamber 4a, and so there is no pressure difference between the front and the rear of the auxiliary movable wall 19. The auxiliary movable wall 19 is thus in the inoperative state. At this time, the relationship between the braking operation force applied to the input rod 8 and the braking output to the output rod 11 is indicated by the line A in FIG. 4.

When the ECU of the actuator portion 53 detects the oversteering state of a vehicle during left rotation of the vehicle, a well-known operation of braking and steering control (oversteer restraining control) is started without a braking operation by a driver. In the oversteering state, brake fluid pressure is applied from the pump unit of the actuator portion 53 to the rotation outside front wheel, that is, the right front wheel FR.

While the operation of braking and steering control is started in the actuator portion 53, the electric power source supplies electric power to the solenoid 26*k*, and the automatic operation of generating an output larger than a normal output of the negative pressure type booster 1 is also started. The solenoid 26*k* supplied with the electric power generates an electromagnetic force to move the movable core 26*i* rearward against the urging force of a pair of springs 26*l*, 26*n*.

Because air is introduced into the auxiliary variable pressure chamber 23 by the movement of the movable core 26*i*, a pressure difference is generated between the front side and the rear side of the auxiliary movable wall 19, and the seal member 22 and the auxiliary movable wall 19 coupled to the seal member 22 are moved forward while the outer cylindrical portion 22*aa*, the communication portion 22*ac*, and the inner peripheral cylindrical portion 22*ab* of the curved portion 22*a* of the seal member 22 are sequentially brought into contact with the inner peripheral surface of the cylindrical portion 27*a* of the retainer 27.

By the movement the auxiliary movable wall 19, only the first member 211 of the output rod 11 coupled to the auxiliary movable wall 19 is moved forward. The auxiliary movable wall 19 advances while shrinking the first air passage 25*a*.

When the first member 211 is applied with the load or force caused by the pressure difference between the front chamber 4 and the auxiliary variable pressure chamber 23, and the first member 111 is moved forward, the piston of the master cylinder 52 is pressed, and the brake fluid pressurized by the negative pressure type booster 1 is applied from the master cylinder 52 to the pump unit of the actuator portion 53 and to the respective wheel cylinders 54, 56, 57 of the wheels FL, FR, RR which are not subjected to the braking and steering control.

The pump unit of the actuator portion 53 sucks the brake fluid pressurized by the negative pressure type booster 1 and discharges the brake fluid to the wheel cylinder 55 of the right front wheel FR. Thus, the braking force is applied to the right front wheel FR.

At this time, the relationship between the input applied to the input rod 8 in the negative pressure type booster 1 and the output to the first member 211 is indicated by point P in FIG. 4. That is, the negative pressure type booster 1 outputs the output P with the input being 0.

Thus, at the start of the operation of the braking and steering control, the brake fluid pressurized through the automatic operation of the negative pressure type booster 1 is sucked from the master cylinder 52 to the pump unit of the actuator portion 53 so that the sucking and discharging operation of the pump unit can be made more smoothly. Further, the brake fluid pressure of the rotation outside front wheel can be smoothly increased. Because the fluid pressure applied to the noncontrolled wheels FL, RL, RR is small, the braking and steering control is not damaged.

As the result of the operation of the braking and steering control, the brake fluid pressure of the rotation outside front wheel is temporarily increased so that the oversteering state of the vehicle can be avoided.

Upon the operation of the braking and steering control, the automatic operation of the negative pressure type booster 1 becomes equivalent to the performance of a front stage pressurizing function in the braking and steering control.

When the microcomputer of the actuator portion 53 detects the release of the braking and steering control, the supply of electric power from the power source to the solenoid 26K is stopped. Thus, the solenoid 26*k* no longer generates an electromagnetic force to the movable core 26*i*, and the movable core 26*i* is returned forward by the urging force of the spring 26*l* through the rod portion 26*j*. In addition, the valve body portion 26*g* is urged forward by the urging force of the spring 26*n* so that the valve 26*f* is separated from the constant pressure valve seat 26*d* and is brought into contact with the atmosphere valve seat 26*e*.

As a result of the forward movement of the movable core 26*i* and the valve body portion 26*g*, the auxiliary variable pressure chamber 23 is cut off from the atmosphere and is again communicated with the first front chamber 4*a*, and the auxiliary movable wall 19 and the seal member 22 through the auxiliary movable wall 19 are pressed and returned back by the return spring 28. That is, the front stage pressurizing operation of the negative pressure type booster 1 is ended.

In the braking and steering control, when a driver operates the brake pedal, the input rod 8 coupled to the brake pedal receives the input and is moved forward. Thus, the input member 9 fixed to the input rod 8 is also moved forward together with the input rod 8.

Through movement of the input member 9, the seal portion 14*a* as well as the control valve 14 are moved forward by the urging force of the valve spring 16 together with the input member 9. The vacuum valve portion 14*ab* of the seal portion 14*a* then comes in contact with the vacuum valve seat 6*a* of the valve housing 6, and the rear chambers 5*a* and 5*b* are cut off from the front chambers 4*a*, 4*b* so that the communication with the negative pressure source of the vehicle is also cut off.

Further, the input member 9 is moved forward, and the engagement between the air valve portion 14*aa* of the seal portion 14*a* and the air valve seat 9*a* of the input member 9 is released so that the rear chambers 5*a*, 5*b* are communicated with the atmosphere. Thus, by the inflow of the air into the rear chambers 5*a*, 5*b*, a pressure difference is generated between the front chambers 4*a*, 4*b* and the rear chambers 5*a*, 5*b* so that the movable wall 3 receiving the load caused by this pressure difference and the valve housing 6 coupled to this (i.e., the piston 7) presses the second member 212 of the output rod 11 forward through the reaction disk 10 and presses the partition wall 21 forward through the contact portion 21*b*.

Because the braking and steering control is carried out, the first member 211 of the output rod 11 moves forward by a predetermined amount with respect to the piston 7 and the second member 212. Thus, at the first stage of the movement of the piston 7 and the second member 212, the step portion 212*c* of the engaged shaft portion 212*b* of the second member 212 does not come in contact with the auxiliary movable wall 19 and the first member 211. When the piston 7 and the second member 212 advance by a predetermined amount with respect to the housing 2, the step portion 212*c* comes in contact with the auxiliary movable wall 19 and the first member 211 coupled to the auxiliary movable wall 19. After the contact between the second member 212 and the first member 211, the foregoing normal braking operation is carried out.

Other operations and effects are similar to those of the first embodiment described above.

Although the tandem type negative pressure booster is constructed in the manner described above, the present invention is not limited to this specific structure. For example, the present invention can be applied to a single type negative pressure booster while obtaining similar operations and effects.

Although the partition wall 21 and the seal member 22 are constructed separately, other constructions are possible. For example, the partition member and the seal member can be integrally formed of a flexible member.

Figure 9:
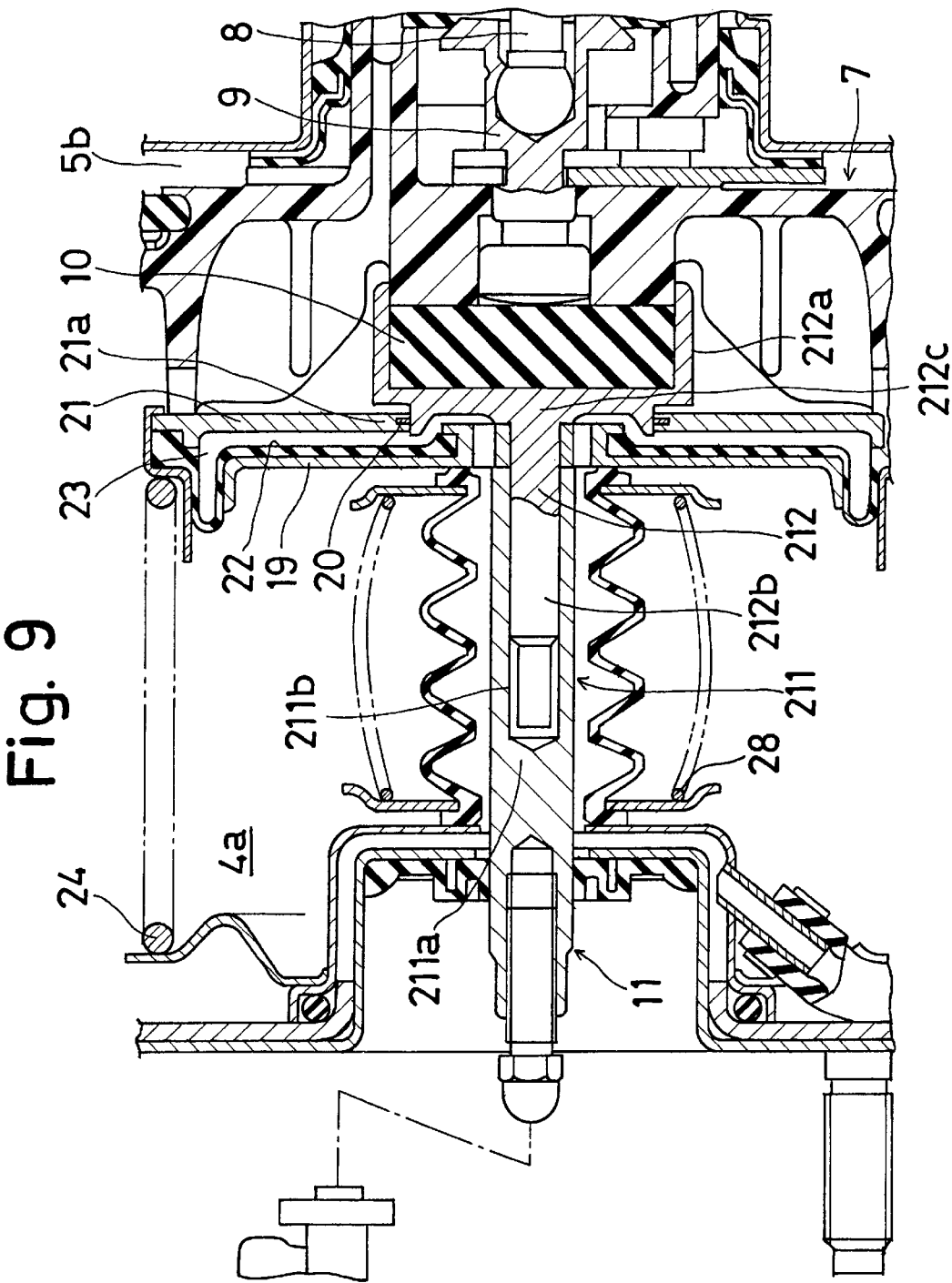
FIG. 9 is an enlarged cross-sectional view of a portion of a negative pressure type booster according to a fourth embodiment of the present invention in the vicinity of the auxiliary movable wall.

A fourth embodiment of the present invention is shown in FIG. 9. Features in this embodiment that are the same as those in the above-described third embodiment are identified by the same reference numerals. This embodiment is similar to the third embodiment described above except for features relating to the partition and so a detailed description of all of the features relating to other aspects of the booster will not be repeated here.

As shown in FIG. 9, the auxiliary movable wall 19 engaged with the front side (i.e., the left side in FIG. 9) first member 211 of the output rod 11 at its inner peripheral portion, and the partition wall 21 engaged in an airtight manner with the rear side (i.e., the right side in FIG. 9) second member 212 of the output rod 11 through a seal member 20 are disposed in the first front chamber 4a.

The auxiliary movable wall 19 and the partition wall 21 engage each other in an airtight manner through the seal member 22, and an auxiliary variable pressure chamber 23 is formed between the two walls 19, 21. The partition wall 21 receives an urging force from the housing 2 by a return spring 24 through the seal member 22, and the piston 7 is also urged rearward by the return spring 24 through the seal member 22 and the partition wall 21.

The output rod 11 is made up of the first member 211 at the front side and the second member 212 at the rear side. The second member 212 includes a bottomed cylindrical portion 212a containing the reaction disk 10 and fitted to the front end side of a valve housing 6, and an engaged shaft portion 212b engaged with the first member 211. The first member 211 includes a shaft portion 211a and an engaged hole in which the engaged shaft portion 212b of the second member 212 is inserted.

The inner peripheral portion of the auxiliary movable wall 19 is fixed in an airtight manner to the rear end portion of the first member 211. The partition wall 21 is engaged with the outer periphery of the engaged shaft portion 212b at an engaged portion 21a through the seal member 20 in an airtight manner and slidably in the rear and front direction. Between the engaged portion 21a and the front end surface of the bottomed cylindrical portion 212a of the second member 212, a predetermined amount of clearance is provided at an initial state, and the relative displacement between the engaged portion 21a and the second member 212 can be made in the rear and front direction.

The seal member 22 is flexible, its inner peripheral portion is engaged in an airtight manner with the auxiliary movable wall 19, and its outer peripheral portion is engaged in an airtight manner with the outer peripheral portion of the partition wall 21 by a retainer 27. The auxiliary variable pressure chamber 23 is thus surrounded in an airtight manner by the output rod 11, the auxiliary movable wall 19, the partition wall 21, and the seal member 22.

By way of example, when rear chambers 5a, 5b reach atmospheric pressure by the inflow of the air into the rear chambers 5a, 5b, the piston 7 does not advance any more and the output of the negative pressure type booster 1 thereafter is made in such a manner that the input rod 8 and the input member 9 press the output rod 11 forward through the reaction disk 10. That is, the input becomes equal to the output.

In the situation where the input member 9 presses the output rod 11, the second member 212 of the output rod 11 is pressed forward by the input member 9 through the reaction disk 10. Next, because the second member 212 is pressed and moved forward, the second member 212 slides forward on the inner peripheral portion of the engaged portion 21a of the partition wall 21, so that the step portion 212c of the engaged shaft portion 212b of the second member 212 presses the auxiliary movable wall 19 and the first member 211 coupled to the auxiliary movable wall 19 in the forward direction.

The advance of the auxiliary movable wall 19 caused by the advance of the output rod 11 merely deforms the curved portion 22a of the seal member 22, and does not move the partition wall 21 forward. Also, because the engaged portion 21a does not move in accordance with the advance of the second member 212, the entirety of the partition wall 21 does not move forward with the advance of the output rod 11.

Thus, the entirety of the partition wall 21 does not move in accordance with the movement of the second member 212, the partition wall 21 maintains the state of being in contact with the piston 7, and can stably receive the urging force from the return spring 24.

Other operations and effects of this embodiment are similar to those described above in connection with the third embodiment.

Figure 10:
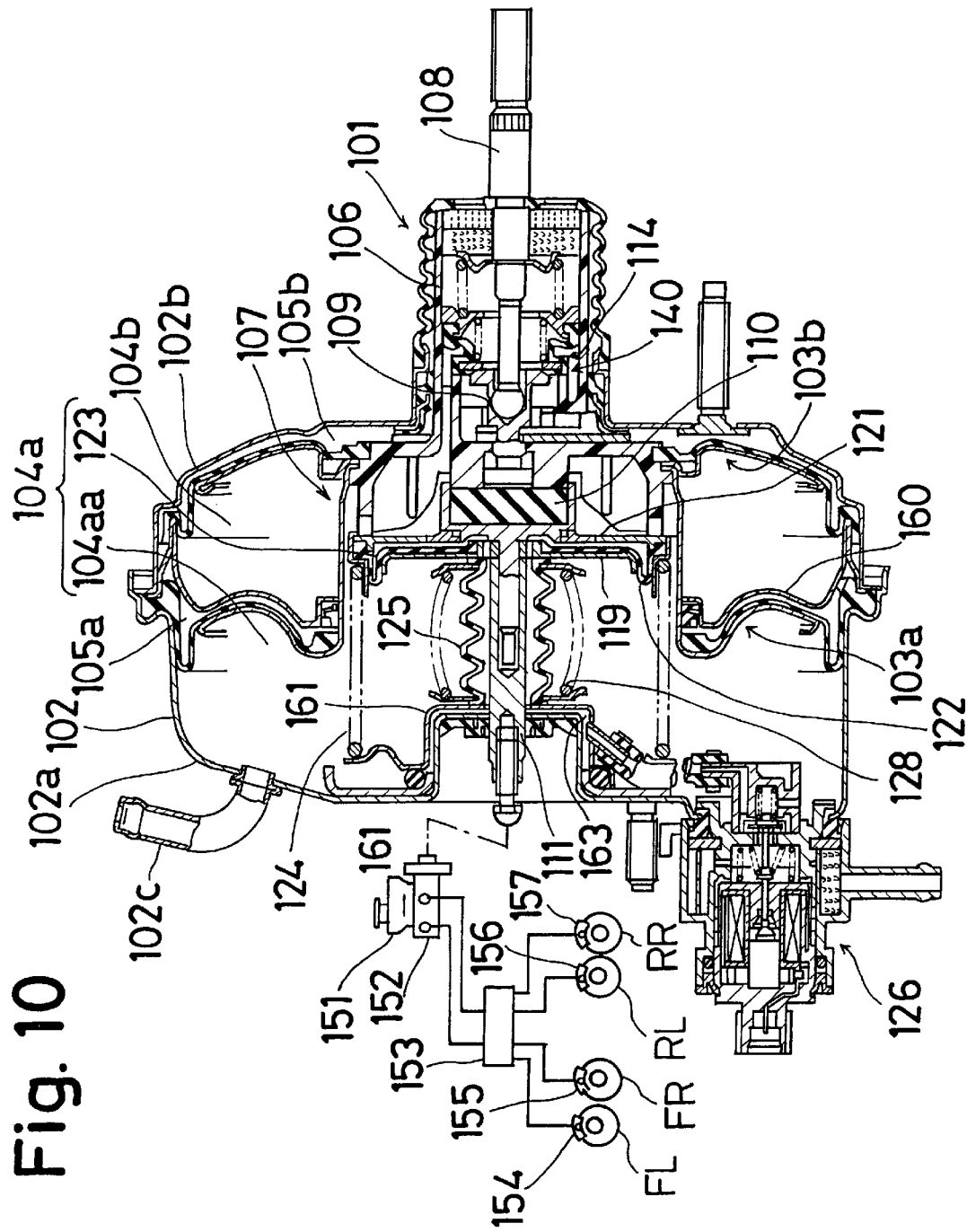
FIG. 10 is a cross-sectional view of a negative pressure type booster according to a fifth embodiment of the present invention.

FIGS. 10–13 illustrate a fifth embodiment of a negative pressure type booster 101 according to the present invention. As shown in FIG. 10, a master cylinder including a reservoir tank 151 is disposed in front of the negative pressure type booster 101. An actuator portion 153 for effecting ABS (Anti-lock Brake System), TRC (Traction Control), and braking and steering control is connected to the master cylinder 152 through a fluid pressure conduit. Wheel cylinders 154, 155, 156, 157 disposed at respective wheels FL, FR, RL, RR are connected to the actuator portion 153 through fluid pressure conduits.

Figure 11:
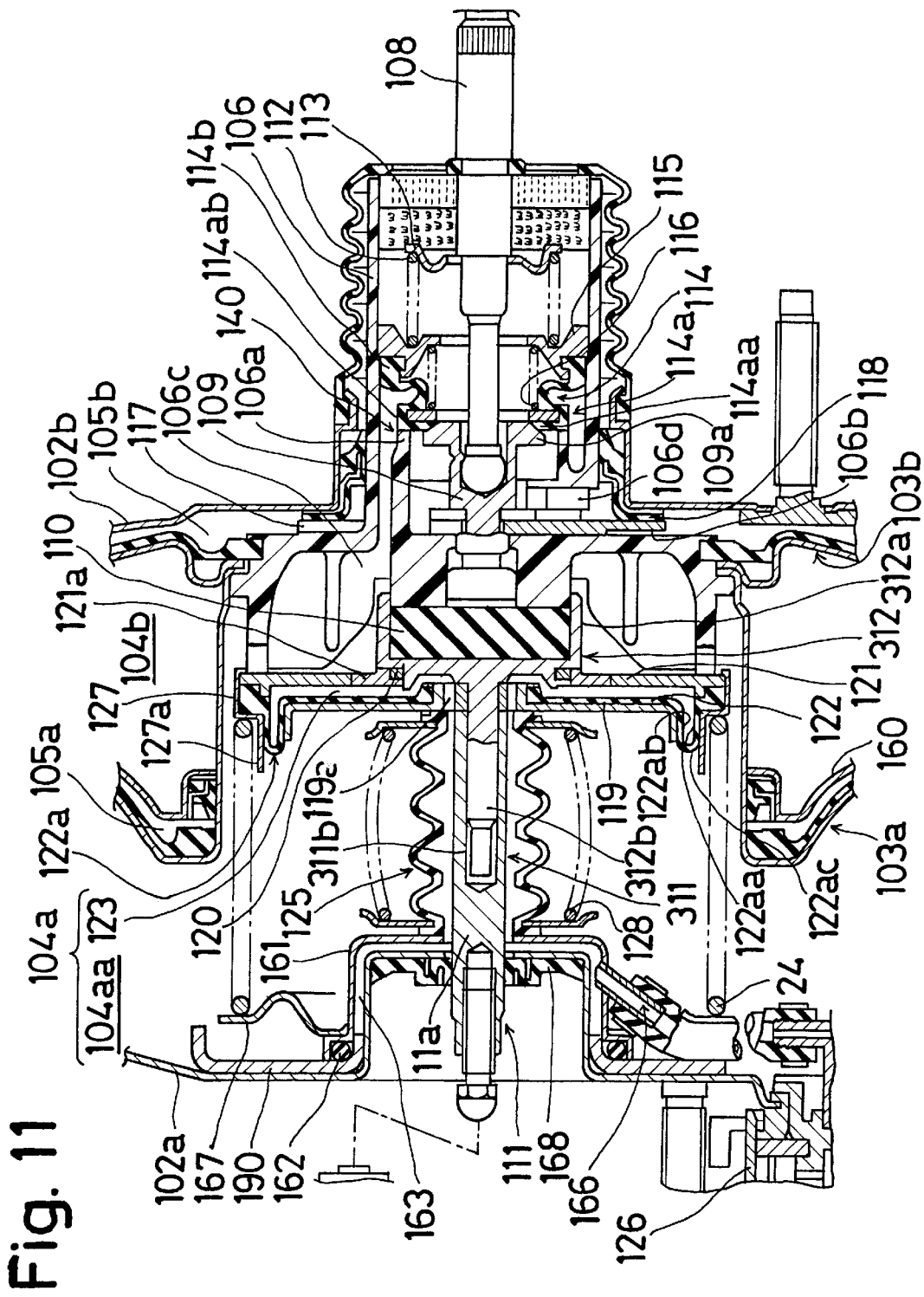
FIG. 11 is an enlarged cross-sectional view of a portion of a negative pressure type booster shown in FIG. 10 in the vicinity of the valve mechanism.

As seen with reference to FIGS. 10 and 11, a housing 102 of the negative pressure type booster 101 is made up of a front shell 102a at the front side (i.e., the left side in FIG. 10) portion and a rear shell 102b at a rear side (i.e., the right side in FIG. 10) portion. Provided in the housing 102 are a partition wall 160 for dividing a pressure chamber in the housing 102 into a front pressure chamber and a rear pressure chamber, a front first movable wall 103a having an outer peripheral portion fixed in an airtight manner in the front pressure chamber and being movable in the rear and front direction (i.e., the right and left direction in FIG. 10), and a rear first movable wall 103b having an outer peripheral portion fixed in an airtight manner in the rear pressure chamber and being movable in the rear and front direction.

The front first movable wall 103a divides the front pressure chamber in the housing 102 in an airtight manner into a first front chamber 104a and a first rear chamber 105a. The second movable wall 103b divides the rear pressure chamber in the housing 2 in an airtight manner into a second front chamber 104b and a second rear chamber 105b. An auxiliary movable wall (i.e., second movable wall) 119 divides the first front chamber 104a in an airtight manner into a constant pressure chamber 104aa and an auxiliary variable pressure chamber 123.

The constant pressure chamber 104aa is communicated with the intake manifold of the engine of a vehicle as a negative pressure source and always generates a negative pressure. The second front chamber 104b is communicated with the constant pressure chamber 104aa through a hole formed in a cylindrical portion of the front first movable wall 103*a*. Thus, the second front chamber 104*b* also functions as a constant pressure chamber which is always kept at a negative pressure.

The first rear chamber 105*a* is communicated with the second rear chamber 105*b* through a groove formed in an inner peripheral surface of a bead portion of an outer peripheral flange of the front first movable wall 103*a*, a hole formed in the partition wall 160, and a groove formed on an outer peripheral surface of a bead portion of an outer peripheral flange of the rear first movable wall 103*b*.

A valve housing 106 made of a resin material is inserted into the housing 102 from the rear, and the first movable walls 103*a*, 103*b* are fixed in an airtight manner to the valve housing 106 at their inner peripheral ends. The first movable walls 103*a*, 103*b* and the valve housing 106 form a power piston 107 moving in the housing 102 in the rear and front direction.

In FIG. 10, an input rod 108, the rear end of which is coupled to a brake operation member of a vehicle (e.g., a brake pedal), is inserted into the inside of the valve housing 106. The input rod 108 is integrally coupled to an input member 109 so as to be movable in the valve housing 106 in the rear and front direction.

The input member 109 serves to transmit the input from the input rod 108 to a reaction disk 110. An output rod 111 brought into contact with the reaction disk 110 is moved by receiving the input through the reaction disk 110 so that a piston of the master cylinder 152 is operated.

A first retainer 113 receiving a return spring 112 is fixed to the input rod 108. A second retainer 115 for supporting a rear end portion 114*b* of a control valve 114 is fixed to the valve housing 106 while receiving an elastic force from the input rod 108 through the first retainer 113 and the return spring 112. The control valve 114 is engaged with the second retainer 115 at the inner periphery of the rear end portion 114*b* in FIG. 11 and produces a seal function between the outer periphery and the valve housing 106. A valve spring 116 is provided between a retainer for supporting the seal portion 114*a* at the front end portion of the control valve 114 and the second retainer 115.

By virtue of the above structure, in an inoperative state of the input rod 108, an air valve portion 114*aa* of the seal portion 114*a* of the control valve 114 is engaged with an air valve seat 109*a* formed at the rear end of the input member 109. In an operative state of the input rod 108, a vacuum valve portion 114*ab* of the seal portion 114*a* can be engaged with a vacuum valve seat 106*a* provided on the valve housing 106. That is, the air valve portion 114*aa* and the air valve seat 109*a* make up an atmosphere valve, and the vacuum valve portion 114*ab* and the vacuum valve seat 106*a* make up a negative pressure valve. The control valve 114, the air valve seat 109*a* of the input member 109, and the vacuum valve seat 106*a* of the valve housing 106 make up a valve mechanism 140.

A key 117 is inserted in a key groove 106*b* provided in the valve housing 106, and is in contact with the housing 102 through a damper member 118 in the inoperative state. Further, in the valve housing 106, there are formed a vacuum path 106*c* for communicating the constant pressure chamber 104*aa* with the negative pressure valve, and an air path 106*d* for communicating the second rear chamber 105 with the atmosphere valve. One end opening of the vacuum path 106*c* opening in the constant pressure chamber 104*aa* is formed at the front end portion of the valve housing 106 and the other end opening is communicated with the negative pressure valve. One end opening of the air path 106*d* opening in the second rear chamber 105*b* is formed at the side portion of the valve housing 106 and the other end opening is communicated with the atmosphere valve.

The output rod 111 is made up of a first member 311 at the front side (i.e., the left side in FIG. 11) and a second member 312 at the rear side (i.e., the right side in FIG. 11). The second member 312 includes a bottomed cylindrical portion 312*a* containing a reaction disk 110 and fitted to the front end side of the valve housing 106, and an engaged shaft portion 312*b* engaged with the first member 311. The first member 311 includes a shaft portion 311*a* and an engaged hole 311*b* in which the engaged shaft portion 312*b* of the second member 312 is inserted.

In the front chamber 104*a*, there are disposed an auxiliary movable wall 119 engaged with the first member 311 of the output rod 111 at its inner peripheral portion, and a partition wall 121 engaged in an airtight manner with the second member 312 of the output rod 111 through a seal member 120. The auxiliary movable wall 119 and the partition wall 121 are engaged in an airtight manner with each other through a seal member 122, and an auxiliary variable pressure chamber 123 is formed between the two walls 119, 121. The partition wall 121 receives an urging force from the housing 102 by a return spring 124 through the seal member 122, and the power piston 107 is also urged backward by the return spring 124 through the seal member 122 and the partition wall 121.

The inner peripheral portion of the auxiliary movable wall 119 is fixed in an airtight manner to the rear end portion of the first member 311. The partition wall 121 integrally includes an engaged portion 121*a* which is in contact with the front end surface of the bottomed cylindrical portion 312*a* of the second member 312, and is fitted in an airtight manner to the outer periphery of the engaged shaft portion 312*b* through the seal member 120. The engaged portion 121*a* is flexible.

The seal member 122 is flexible and has an inner peripheral portion engaged in an airtight manner with the auxiliary movable wall 119 and an outer peripheral portion engaged in an airtight manner with the outer peripheral portion of the partition wall 121 by a retainer 127. Thus, the auxiliary variable pressure chamber 123 is surrounded in an airtight manner by the output rod 111, the auxiliary movable wall 119, the partition wall 121, and the seal member 122.

Further, the seal member 122 includes a curved portion 122*a* opening rearward between the inner peripheral portion and the outer peripheral portion. The curved portion 122*a* is made up of an outer peripheral annular portion 122*aa* protruding forward, an inner peripheral annular portion 122*ab* protruding forward at the inner peripheral side of the outer peripheral annular portion 122*aa*, and a connection portion 122*ac* for connecting the front end portion of the outer peripheral annular portion 122*aa* and the front end portion of the inner peripheral annular portion 122*ab*. The retainer 127 includes an annular protruding portion 127*a* extending forward at its front portion in the vicinity of the outer peripheral side of the curved portion 122*a* of the seal member 122.

Figure 12:
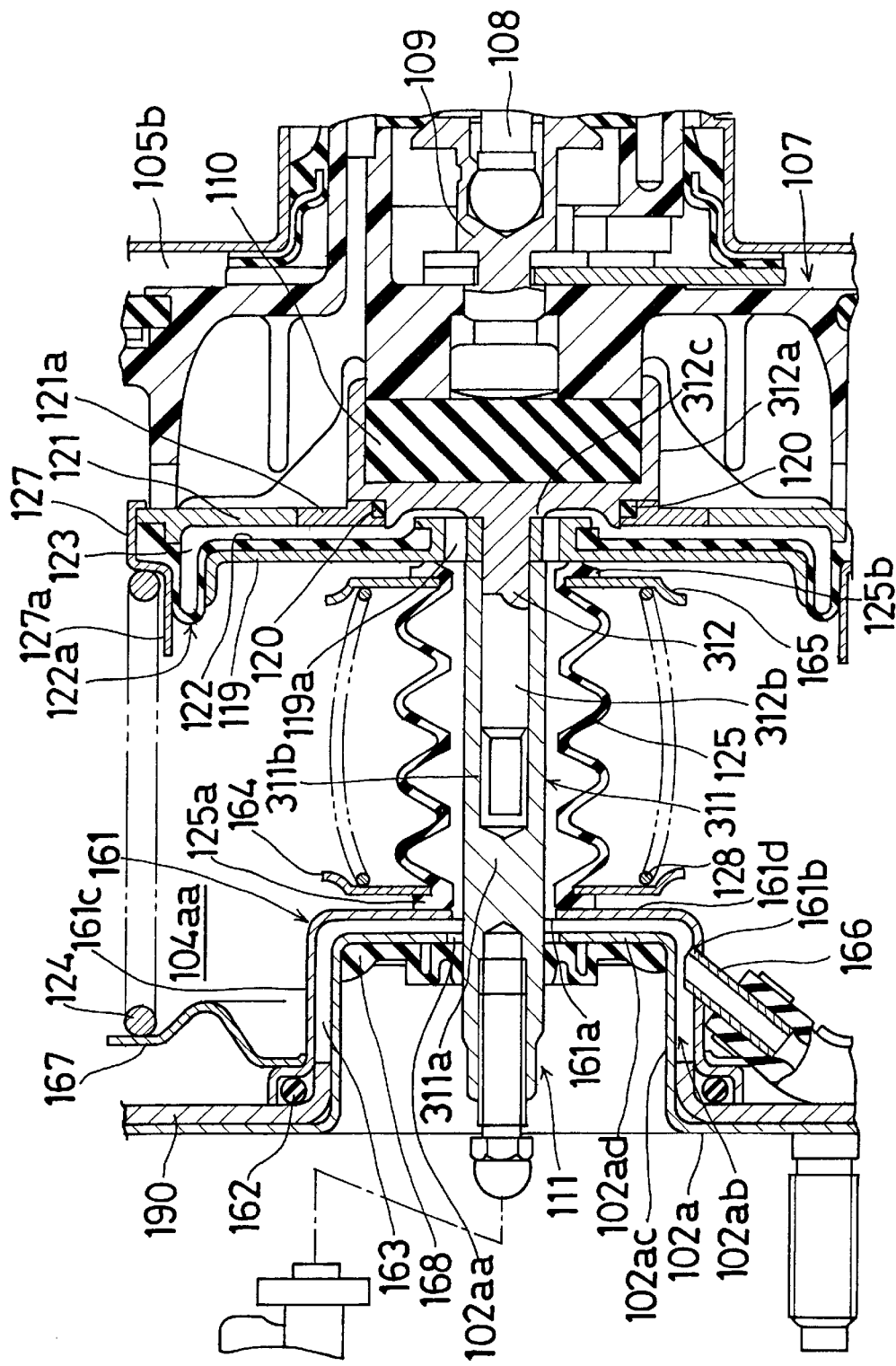
FIG. 12 is an enlarged cross-sectional view of a portion of a negative pressure type booster shown in FIG. 11 in the vicinity of the output rod.

As best seen in FIG. 12, the housing 102 includes a bulging portion 102*ab* bulging toward the constant pressure chamber 104*aa* at the front inner side center portion of the front shell 102*a*. Further, a reinforcing plate 190 having a substantially bottomed cylindrical shape and being in contact with the housing 102 at a circumference of a cylindrical portion 102*ac* of the bulging portion 102*ab* is disposed in the housing 102.

A plate 161 positioned opposite to the bulging portion 102ab is disposed in the constant pressure chamber 104aa. A seal member 62 is disposed between the front outer peripheral portion of the cylindrical portion 102ac (first cylindrical portion) of the bulging portion 102ab and the front inner peripheral portion of the cylindrical portion 161c of the plate 161 through the inner cylindrical portion of the reinforcing plate 190, and a space portion 163 separated in an airtight manner from the constant pressure chamber 104aa is formed between the outer peripheral portion 102ac of the cylindrical portion 102ac of the bulging portion 102ab and the cylindrical portion 161c of the plate 161, and between the rear surface of a bottom portion 102ad of the bulging portion 102ab and the front surface of a bottom portion 161d of the plate 161.

An air passage 125 serving as an introduction passage for communicating the auxiliary variable pressure chamber 123 with the space portion 163 is disposed between the auxiliary movable wall 119 and the bottom portion 161d of the plate 161. The air passage 125 is made of an elastic material, has a bellows shape, is flexible, and is retractable/extensible in the rear and front direction (right and left direction in FIG. 12). Two annular plates 164, 165 are respectively disposed at the rear surface of a flange-shaped front end portion 125a and the front surface of a flanged-shaped rear end portion 125b of the air passage, and a return spring 128 is disposed between the annular plates 164, 165.

The return spring 128 urges the front end portion 125a of the air passage 125 toward the bottom portion 161d of the plate 161, and urges the rear end portion 125b toward the auxiliary movable wall 119. Thus, the front end portion 125a of the air passage 125 is in contact with the rear surface of the bottom portion 161 of the plate 161 in an airtight manner, and the rear end portion 125b is in contact with the front surface of the auxiliary movable wall 119 in an airtight manner. Further, the return spring 128 urges the auxiliary movable wall 119 rearward.

The plate 101 includes an opening 161a at the bottom portion 161d for communicating the inside of the air passage 125 with the space portion 163. The auxiliary movable wall 119 includes a communication passage 119a for communicating the inside of the air passage 125 with the auxiliary variable pressure chamber 123. Thus, the auxiliary variable pressure chamber 123 and the space portion 163 are communicated with each other through the communication passage 119a, the inside of the air passage 125, and the opening 161a.

The first member 311 of the output rod 111 protrudes outside of the housing 102 through a hole 102aa formed in the bottom portion 102ac of the bulging portion 102ab of the front shell 102a, the opening 161a of the plate 161, and the inside of the air passage 125. The engaged shaft portion 312b of the second member 312 passes through the auxiliary variable pressure chamber 123. That is, the output rod 111 is disposed in the air passage 125, and passes through the space portion 163, the air passage 125, and the auxiliary variable pressure chamber 123. The first member 311 passes through the front shell 102a in an airtight manner through the seal member 168.

An electromagnetic valve unit 126 is disposed in an airtight manner at the front side of the front shell 102a of the housing 102. The electromagnetic unit 126 is connected to the plate 161 through a tube 166 as an introduction conduit. One end portion of the tube 166 is connected to a variable pressure port 126c of the electromagnetic valve unit 126, and the other end portion is attached in an airtight manner to a communication hole 161b formed in the plate 161. Thus, the variable pressure port 126c of the electromagnetic valve unit 126 is communicated with the space portion 163 through the tube 166.

A substantially annular retainer 167 is disposed on the front outer peripheral portion of the cylindrical portion 161c of the plate 161, and a return spring 124 is disposed between the retainer 167 and the retainer 127. The return spring 124 urges the plate 161 toward the front of the housing 102 through the retainer 167 by the urging force so that the front portion of the cylindrical portion 161c of the plate 161 is brought into contact with the housing 102 through the seal member 162 and the reinforcing plate 190 in an airtight manner. Further, the return spring 124 urges the partition wall 121 rearward through the retainer 127 and the seal member 122, so that the partition wall 121 is brought into contact with the valve housing 106 of the power piston 107, and the power piston 107 is urged rearward.

Figure 13:
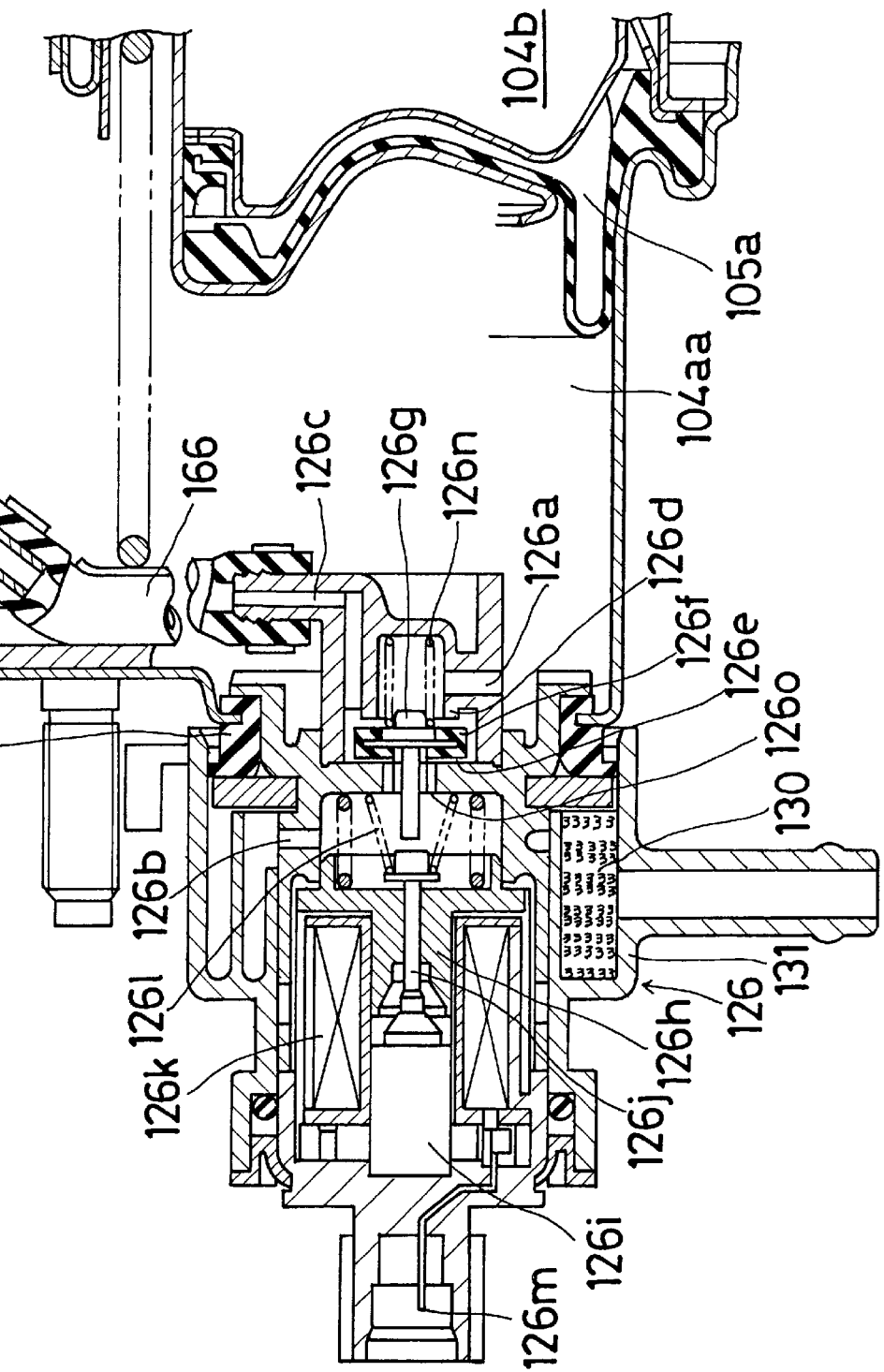
FIG. 13 is an enlarged cross-sectional view of the electromagnetic valve used in the negative pressure type booster shown in FIG. 10.

As best seen in FIG. 13, the electromagnetic valve unit 126, which is a switching device for selectively communicating the auxiliary variable pressure chamber 123 of the negative pressure type booster 101 with the negative pressure source or the atmosphere, is engaged in an airtight manner with the front surface of the front shell 102a of the housing 102 through the seal member 129. The electromagnetic valve unit 126 includes a constant pressure port 126a communicating with the constant pressure chamber 104, an atmosphere port 126b communicating with an air introducing air cleaner having a cleaner member 130, the variable pressure port 126c communicating with the tube 166, a constant pressure valve seat 126d for permitting and preventing communication of the constant pressure chamber 104aa and the auxiliary variable pressure chamber 123, and an atmosphere valve seat 126e for permitting and preventing communication of the atmosphere and the auxiliary variable pressure chamber 123. The electromagnetic valve unit 126 further includes a valve body portion 126g having a valve 126f as a valve body at its tip end, a fixed core 126h, a movable core 126i, a rod portion 126j passing through the fixed core 126h and having its front end portion capable of being brought into contact with the movable core 126i, and a solenoid 126k disposed to cover the outer periphery of the fixed core 126h and the movable core 126i.

The electromagnetic valve unit 126 is provided with the air introducing air cleaner 131 at its outer peripheral portion which forms an air inflow passage used for the inflow of the air flowing into the air passage 125 as well as the tube 166 through the electromagnetic valve unit 126 and detouring around the outer periphery of the electromagnetic valve unit 126. The air introducing air cleaner is communicated with an inside space of a vehicle through a tube which is not specifically illustrated.

A spring 126l is disposed between the rod portion 126j as well as the movable core 126i and the partition wall. The spring 126l urges the movable core 126i in the direction in which the movable core moves away from the fixed core 126h, and urges the rod portion 126j in the direction (i.e., the left in FIG. 13) in which the rod portion moves away from the valve body portion 126g.

The solenoid 126k is connected to a power source of a vehicle through a terminal 126m, and is supplied with electric power from the power source by a controller of the vehicle so that it is operated.

The spring 126n urges the valve body portion 126g to the left in FIG. 13 so that the valve 126f is separated from the constant pressure valve seat 126d and is brought into contact with the atmosphere valve seat 126e. The rod portion 126j the valve body portion 126g are not in contact with each other in an inoperative state of the electromagnetic valve unit shown in FIG. 13.

In this state, because the valve 126f and the constant pressure valve seat 126d are in a non-engaged state, the auxiliary variable pressure chamber 123 is communicated with the negative pressure source as well as the constant pressure chamber 104aa through the inside of the air passage 125, the space portion 163, the tube 166, the variable pressure port 126c, the clearance between the valve 126f and the constant pressure valve seat 126d, and the constant pressure port 126a.

On the other hand, when the solenoid 126 is supplied with electric power by the vehicle controller, the solenoid 126 operates so that the movable core 126i is attracted to the fixed core 126h, and the movable core 126i slides toward the fixed core 126h (i.e., towards the right in FIG. 13). As a result the movable core 126i presses the rod portion 126j, and the movable core 126i and the rod portion 126j are moved together to the right in FIG. 13.

The rear end portion of the rod portion 126j urged by the movable core 126i comes in contact with the front end portion of the valve body portion 126g, the rod portion 126j presses the valve body portion 126g rearward (i.e., to the right in FIG. 13), the valve 126f comes in contact with the constant pressure valve seat 126d, and the valve 126f and the atmosphere valve seat 126e assume a non-engaged state.

Thus, air is introduced into the auxiliary variable pressure chamber 123 through the inside of the air passage 125, the space portion 163, the tube 166, the variable pressure port 126c, the clearance between the valve 126f and the atmosphere valve seat 126e, the communication hole 126o, the atmosphere port 126b, and the air introducing air cleaner 131 from the inside space of the vehicle.

Upon assembling the front shell 102a and the rear shell 102b of the negative pressure type booster 101, the front shell 102a is provided with the inlet 102c, forming portions (i.e., the plate 161, the seal 162) of the space portion 163, the tube 166, and the electromagnetic valve unit 126, while the rear shell 102b is provided with the power piston 107, the valve mechanism 140, the input rod 108, the reaction disc 110, the output rod 111, and forming portions (i.e., the auxiliary movable wall 119, the partition member 121, the retainer 127) of the auxiliary variable pressure chamber 123.

Next, the air passage 125 in which the plates 164, 165 and the return spring 128 are coupled together is guided by the output rod 111 while containing the output rod 111, and is set on the auxiliary movable wall 119 to the rear shell 102b. Further, the return spring 124 is set on the retainer 127.

After the respective members are set in the front shell 102a and the rear shell 102b, the front shell 102a and the rear shell 102b are coupled together. When the front shell 102a and the rear wheel 102b are coupled together, the output rod 111 protrudes through the hole of the front shell 102a to the outside of the housing 102, the air passage 125 is disposed between the plate 161 and the auxiliary movable wall 119, and the return spring 124 is disposed between the retainer 167 and the retainer 127.

The actuator portion 153 in FIG. 10 includes a fluid pressure conduit in which brake fluid flows, an electromagnetic valve unit for cutting off the flow of brake fluid in the fluid pressure conduit, a reservoir for storing the brake fluid, a pump unit for sucking and discharging the brake fluid, and an electronic control unit (ECU) for controlling the electromagnetic valve unit, the pump unit, and the like.

Figure 14:
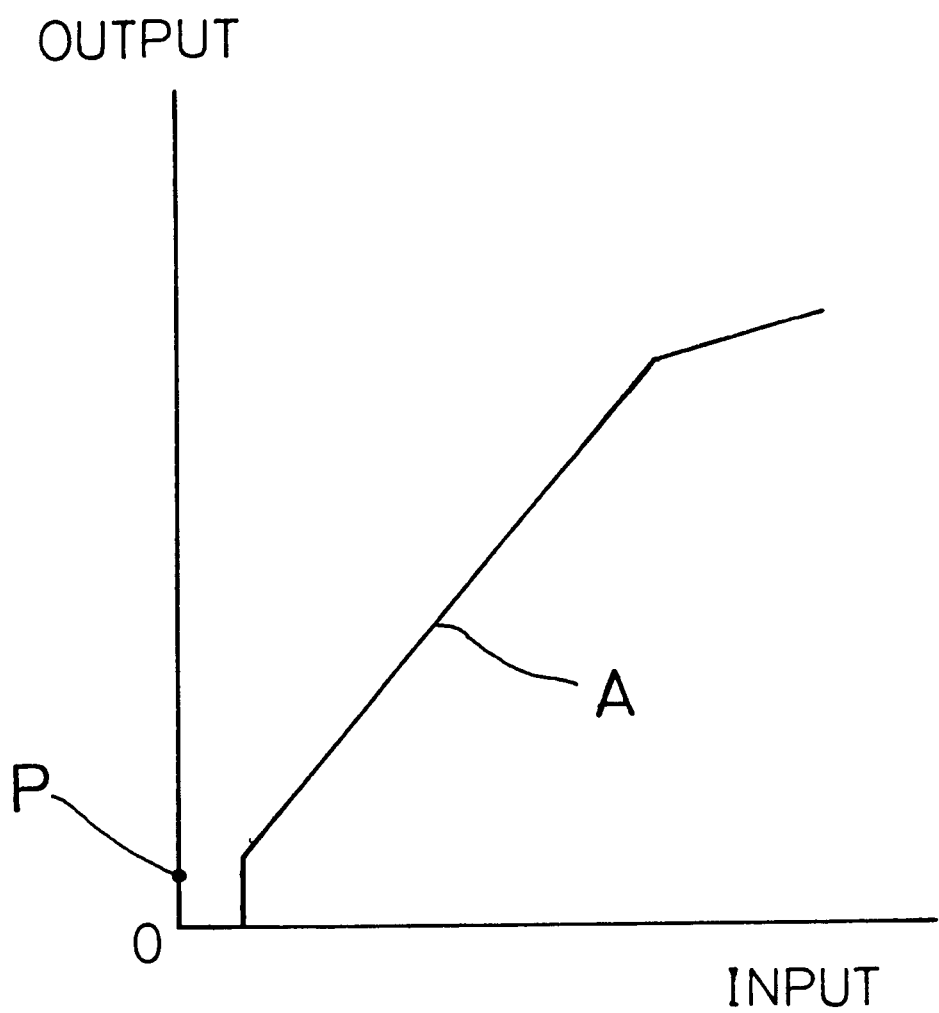
FIG. 14 is a characteristic input/output diagram of the negative pressure type booster according to the fifth embodiment of the present invention.

The operation of the negative pressure type booster 101 is as follows. FIG. 14 is a characteristic diagram of the negative pressure type booster 101 in which the vertical axis indicates output and the horizontal axis indicates input. As shown in FIGS. 10 to 14, in an initial state in which a driver does not operate a brake operation member of a vehicle (e.g., brake pedal), the partition-wall 121 and the valve housing 106 are in contact with each other by the urging force of the return spring 124, the air valve portion 114aa of the seal portion 114a of the control valve 114 is engaged with the air valve seat 109a of the input member 109, and the vacuum valve portion 114ab of the seal portion 114a is not engaged with the vacuum valve seat 106a of the valve housing 106. Thus, the second rear chamber 105b is communicated with the intake manifold of the vehicle serving as the negative pressure source through the air path 106d, the clearance between the vacuum valve portion 114ab and the vacuum valve seat 106a, the vacuum path 106c, the space between the inner peripheral portion of the front first movable wall 103a and the outer peripheral portion of the partition wall 121, the constant pressure chamber 104aa, and the inlet 102a.

When the driver operates the brake operation member of the vehicle (e.g., a brake pedal), the input rod linked to this receives the input and is moved forward. Thus, the input member 109 fixed to the input rod 108 is also moved forward together with the input rod 108.

By the movement of the input member 109, the seal portion 114a as well as the control valve 114 is also moved forward by the urging force of the valve spring 116 together with the input member 109. The vacuum valve portion 114ab of the seal portion 114a then comes in contact with the vacuum valve seat 106a of the valve housing 106, and the second rear chamber 105b is cut off from the constant-pressure chamber 104aa so that the communication between the rear chambers 105a, 105b and the negative pressure source of the vehicle is also cut off.

When the input member is further moved forward, the engagement between the air valve portion 114aa of the seal portion 114a and the air valve seat 109a of the input member 109 is released, so that the second rear chamber 105b is communicated with the atmosphere through the air path 106d, and the clearance between the air valve portion 114aa and the air valve seat 109a. Thus, by the inflow of the air into both the rear chambers 105 and 105b, a pressure difference is generated between the constant pressure chamber 104a, the second front chamber 104, and the rear chambers 105a and 105b, respectively. Thus, both the first movable walls 103a and 103b receiving the load caused by this pressure difference and the valve housing 106 coupled to this (i.e., the power piston 107) advances in the housing 102, and presses the second member 312 of the output rod 111 forward through the reaction disk 110.

When the second member 312 is pressed and moved forward, the front end surface of the bottomed cylindrical portion 312a presses the partition wall 121 and the step portion 312c of the engaged shaft portion 312b of the second member 312 presses the auxiliary movable wall 119 and the first member 311 coupled to the auxiliary movable wall 119 forward. That is, the power piston 7 outputs an amplified input to the output rod 111.

When a propelling force of the power piston 107 is outputted to the output rod 111 and the output rod 111 is moved forward, the piston of the master cylinder 152 is pressed, the brake fluid flows out to the wheel cylinders 154, 155, 156, 157 through the actuator portion 153, and the braking force is applied to the wheels FL, FR, RL, RR of the vehicle.

Subsequently, by the counter force received by the input rod 108 through the input member 109 from the reaction disk 110, the air valve portion 114aa of the seal portion 114a and the air valve seat 109a of the input member 109, and the vacuum valve portion 114ab of the seal portion 114a and the vacuum valve seat 106a of the valve housing 106 are selectively engaged, so that the assisting force of the negative pressure type booster 1 is controlled according to the input of the driver applied to the input rod 108.

The propelling force of the power piston 107, that is, the counter force caused by the output of the output rod 111, and the input generated by the operation of the brake pedal and transmitted to the input member 108 are applied to the reaction disk 110 and are balanced.

When the insides of the rear chambers 105a, 105b reach the atmospheric pressure by the inflow of the air into the rear chambers 105a and 105b, the power piston 107 does not advance any more, and thereafter, the output of the negative pressure type booster 101 is made in such a manner that the input rod 108 and the input member 109 press the output rod 111 forward through the reaction disk 110. That is, the input becomes equal to the output.

In the case where the input member 109 presses the output rod 111, the second member 312 of the output rod 111 is first pressed forward by the input member 109 through the reaction disk 110. Next, because the second member 312 is pressed and moved forward, the front end surface of the bottomed cylindrical portion 312a presses the engaged portion 121a of the partition wall 121 to deform the engaged portion 121a forward, and the step portion 312c of the engaged shaft portion 312b of the second member 312 presses the auxiliary movable wall 119 and the first member 311 coupled to the auxiliary movable wall 119 in the forward direction.

The advance of the auxiliary movable wall 119 caused by the advance of the output rod 111 merely deforms the curved portion 122a of the seal member 122, and does not move the partition wall 121 forward. Moreover, the entirety of the partition wall 121 is not moved forward through the forward deformation of the engaged portion 121a by the advance of the output rod 111. Thus, when the input member 109 presses the output rod 111, the contact portion 121b of the partition wall 121 maintains the state in which the contact portion is in contact with the movable wall 103 of the power piston 107.

In the state of the normal operation, because the solenoid 126k is in an inoperative state, the auxiliary variable pressure chamber 123 is communicated with the constant pressure chamber 104aa, there is no pressure difference between the front and the rear of the auxiliary movable wall 119, and the auxiliary movable wall 119 is in an inoperative state. At this time, the relationship between the braking operation force applied to the input rod 108 and the braking output to the output rod 111 is indicated by the line A in FIG. 14.

When, for example, the ECU of the actuator portion 153 detects the oversteering state of a vehicle upon leftward rotation of the vehicle, a well-known operation of braking and steering control (oversteer restraining control) in which a brake fluid pressure is applied from the pump unit of the actuator portion 53 to the rotation outside front wheel, that is the right front wheel FR, is started without a braking operation by a driver.

While the braking and steering control operation is started in the actuator portion 153, the power source supplies electric power to the solenoid 126k, and the automatic operation of generating an output larger than a normal output of the negative pressure type booster 1 is also started. The solenoid 26k supplied with the electric power generates an electromagnetic force to move the movable core 26i rearward against the urging force of the springs 126l, 126n.

Because the air is introduced into the auxiliary variable pressure chamber 123 by the movement of the movable core 126i, a pressure difference is generated between the rear and the front of the auxiliary movable wall 119, and the seal member 122 and the auxiliary movable wall 119 coupled to the seal member 122 are moved forward, while the outer peripheral cylindrical portion 122aa, the connection portion 122ac, the inner peripheral cylindrical portion 122ab of the curved portion 122a of the seal member 122 are sequentially brought into contact with the inner peripheral surface of the cylindrical portion 127a of the retainer 127.

The auxiliary movable wall 119 is moved so that only the first member 311 of the output rod 111 coupled to the auxiliary movable wall 119 is moved forward. The auxiliary movable wall 119 advances while shrinking the air passage 125a.

When the load caused by the pressure difference between the constant pressure chamber 104aa and the auxiliary variable pressure chamber 123 is applied to the first member 311 and the first member 311 is moved forward, the piston of the master cylinder 152 is pressed. The brake fluid pressurized by the negative pressure type booster 101 is applied from the master cylinder 152 to the pump unit of the actuator portion 153 and to the respective wheel cylinders 154, 156, 157 of the wheels FL, RL, RR which are not subjected to the braking and steering control.

The pump unit of the actuator portion 153 sucks the brake fluid pressurized by the negative pressure type booster 101 and discharges the brake fluid to the wheel cylinder 155 of the right front wheel FR. Thus, the braking force is applied to the right front wheel FR.

At this time, the relationship between the input applied to the input rod 108 of the negative pressure type booster 101 and the output to the first member 311 is indicated by point P in FIG. 4. That is, the negative pressure type booster 101 outputs the output P in the state where the input is 0.

The amount of movement of the auxiliary movable wall 119 is preferably determined from the supply amount of brake fluid necessary for the pump unit of the actuator portion 153 to carry out pressurizing and supplying to the braking system in the braking and steering control. Moreover, in the structure in which a braking unit having the ABS function is applied, the braking and steering control is added to the braking unit, and the pump unit sucks the brake fluid from the master cylinder at the braking and steering control and discharges the brake fluid to the wheel to be controlled, the amount of movement of the auxiliary movable wall being determined from the pressure necessary for the front stage pressurizing function of the pump unit. For example, the amount of movement of the auxiliary movable wall 119 is 5 to 15 mm, and the pressurizing force of the brake fluid by the output P is 3 to 10 kg/cm$^2$. In the present invention, the size of the auxiliary movable wall 119 is suitably set so that such necessary pressure can be supplied. The output at point P in FIG. 14 becomes an output value suitable for the front stage pressurizing-function with respect to the pump operation of the braking and steering control.

Thus, at the start of operation of the braking and steering control, the brake fluid pressurized by the automatic operation of the negative pressure type booster 101 is sucked from the master cylinder 152 to the pump unit of the actuators portion 153, so that the sucking and discharging operation of the pump unit can be made more smoothly, and further the brake fluid pressure of the rotation outside front wheel can be smoothly increased. Because the fluid pressure applied to the noncontrolled wheels FL, RL, RR is small, the braking and steering control is not damaged.

As the result of the operation of the braking and steering control, the brake fluid pressure of the rotation outside front wheel is temporarily increased so that the oversteering state of the vehicle can be avoided.

At the operation of the braking and steering control, the automatic operation of the negative pressure type booster 101 becomes equivalent to the performance of the front stage pressurizing function in the braking and steering control.

When the microcomputer of the actuator portion 153 detects the release of the braking and steering control, the supply of electric power from the power source to the solenoid 126K is stopped. The solenoid 126k thus does not generate an electromagnetic force to the movable core 126i, and the movable core 126i is returned forward by the urging force of the spring 126l through the rod portion 126j. In addition, the valve body portion 126g is urged forward by the urging force of the spring 126n, and the valve 126f is separated from the constant pressure valve seat 126d and is brought into contact with the atmosphere valve seat 126e.

By the forward movement of. the movable core 126i and the valve body portion 126g, the auxiliary variable pressure chamber 123 is cut off from the atmosphere and is again communicated with the front chamber 104aa. The auxiliary movable wall 119 and the seal member 122 through the auxiliary movable wall 119 are pressed back by the return spring 128. That is, the front stage pressurizing operation of the negative pressure type booster 101 is ended.

In the braking and steering control, when a brake pedal is operated by a driver, the input rod 108 coupled thereto receives the input and is moved forward. Thus, the input member 109 fixed to the input rod 108 is also moved forward together with the input rod 108.

By the movement of the input member 109, the seal portion 114a as well as the control valve 114 is also moved forward by the urging force of the valve spring 116 together with the input member 109, and then the vacuum valve portion 114ab of the seal portion 114a comes in contact with the vacuum valve seat 106a of the valve housing 106. Also, the rear chambers 105a, 105b are cut off from the constant pressure chamber 104aa and the second front chamber 104b so that the communication with the negative pressure source of the vehicle is also cut off.

Further, the input member 109 is moved forward, and the engagement between the air valve portion 114aa of the seal portion 114a and the air valve seat 109a of the input member 109 is released so that the rear chambers 105a, 105b are communicated with the atmosphere. Thus, by the inflow of the air into the rear chambers 105a, 105b, a pressure difference is generated between the constant pressure chamber 104aa, the second front chamber 104b and the rear chambers 105a, 105b, respectively, so that the first movable walls 103a, 103b receiving the load caused by the pressure difference and the valve housing 106 coupled thereto, (i.e., the power piston 107) presses the second member 312 of the output rod 111 forward through the reaction disk 110 and presses the partition wall 121 forward through the contact portion 121a.

Because the braking, and steering control is carried out, the first member 311 of the output rod 111 moves by a predetermined amount with respect to the power piston 107 and the second member 312. Thus, at the first movement of the power piston 107 and the second member 312, the step portion 312c of the engaged shaft portion 312b of the second member 312 does not come in contact with the auxiliary movable wall 119 and the first member 311. When the power piston 107 and the second member 312 advance by a predetermined amount with respect to the housing 102, the step portion 312c comes in contact with the auxiliary movable wall 119 and the first member 311 coupled to the auxiliary movable wall 119. After the contact between the second member 312 and the first member 311, the foregoing normal braking operation is carried out.

As described above, in the negative pressure type booster 101 of this embodiment, because a structure is adopted in which the front end portion 125a of the air passage 125 comes in airtight contact with only the plate 161, the inflow of air from the space portion 163 to the air passage 125 or from the air passage 125 to the space portion 163 can be smoothly performed.

Moreover, upon assembling the negative pressure type booster 101, the structure is divided into two units, that is the front shell 162a including the inlet 102c, the forming portions (i.e., the plate 161, the seal 162) of the space portion 163, the tube 166, and the electromagnetic valve unit 126, and the rear shell 102b including the power piston 107, the valve mechanism 140, the input rod 108, the reaction disk 110, the output rod 111, and the forming portions (i.e., the auxiliary movable wall 119, the partition member 121, the retainer 127). The return spring 124 and the air passage 125 are disposed between the unit of the front shell 102a and the unit of the rear shell 102b, and the unit of the front shell 102a and the unit of the rear shell 102b are coupled together so that the negative pressure type booster 101 can be easily assembled.

Additionally, because the front end portion 125a of the air passage 125 is brought into airtight contact with only the plate 161, even if for example the negative pressure type booster 101 is constructed such that the bulging or protruding portion 102ab has a cylindrical shape and the rear end portion of the master cylinder is disposed to the inside of the constant pressure chamber 104aa through the cylindrical portion, the air passage 125 and the plate 161 are stably brought into contact with each other.

Further, because the electromagnetic valve unit 126 is integrally brought into contact with the housing 102, the negative pressure type booster 101 can be miniaturized and the number of parts can be reduced. It thus becomes possible to provide a negative pressure type booster 101 in which the inflow of the air from the space portion 163 to the auxiliary variable pressure chamber 123 can be smoothly carried out. It is also possible to simplify the assembly of the negative pressure type booster 101 and increase the operating efficiency.

Although the auxiliary variable pressure chamber 123 is surrounded by the output rod 111, the auxiliary movable wall 119, the seal member 122, and the partition wall 121, the present invention is not limited to this structure. For example, similar operations and effects can be obtained in a negative pressure type booster including an auxiliary variable pressure chamber surrounded by the second movable wall and a diaphragm as a partition member that engages the second movable wall in an airtight manner, or a negative pressure type booster including an auxiliary variable pressure chamber surrounded by only a diaphragm as a partition member at the rear of the second movable wall.

The electromagnetic valve unit 126 is described as being communicated with the negative pressure source through the constant pressure chamber 104aa, but the present invention is not limited in this regard. For example, the electromagnetic valve unit can be directly communicated with the negative pressure source. Also, the present invention is applicable to a single type negative pressure booster.

In this embodiment, the partition wall 121 and the seal member 122 are constructed separately, but the partition member and the seal member can be integrally formed of a flexible member to achieve operations and effects similar to those described above.

As described above, both end portions 125a, 125b of the air passage 125 are urged by the return spring 128, but other arrangements are possible. For example, the negative pressure type booster can be constructed so that an introduction passage having an urging force by itself is used.

The reaction disk 110, the output rod 111, and the forming portion of the auxiliary variable pressure chamber 123 are provided in the rear shell 102b at the assembly of the front shell 102a and the rear shell 102b, but the present invention is not limited in this regard. For example, the negative pressure type booster can be constructed such that the reaction disk 110, the output rod 111, and the forming portion of the auxiliary variable pressure chamber 123 are provided in the front shell 102a.

While this embodiment is designed to so that the electromagnetic valve unit 126 is used as the switching means, but a mechanical valve unit can be used.

Although the output rod 111 is described as being divided into the first member 311 and the second member 312, a united output rod could also be employed.

Figure 15:
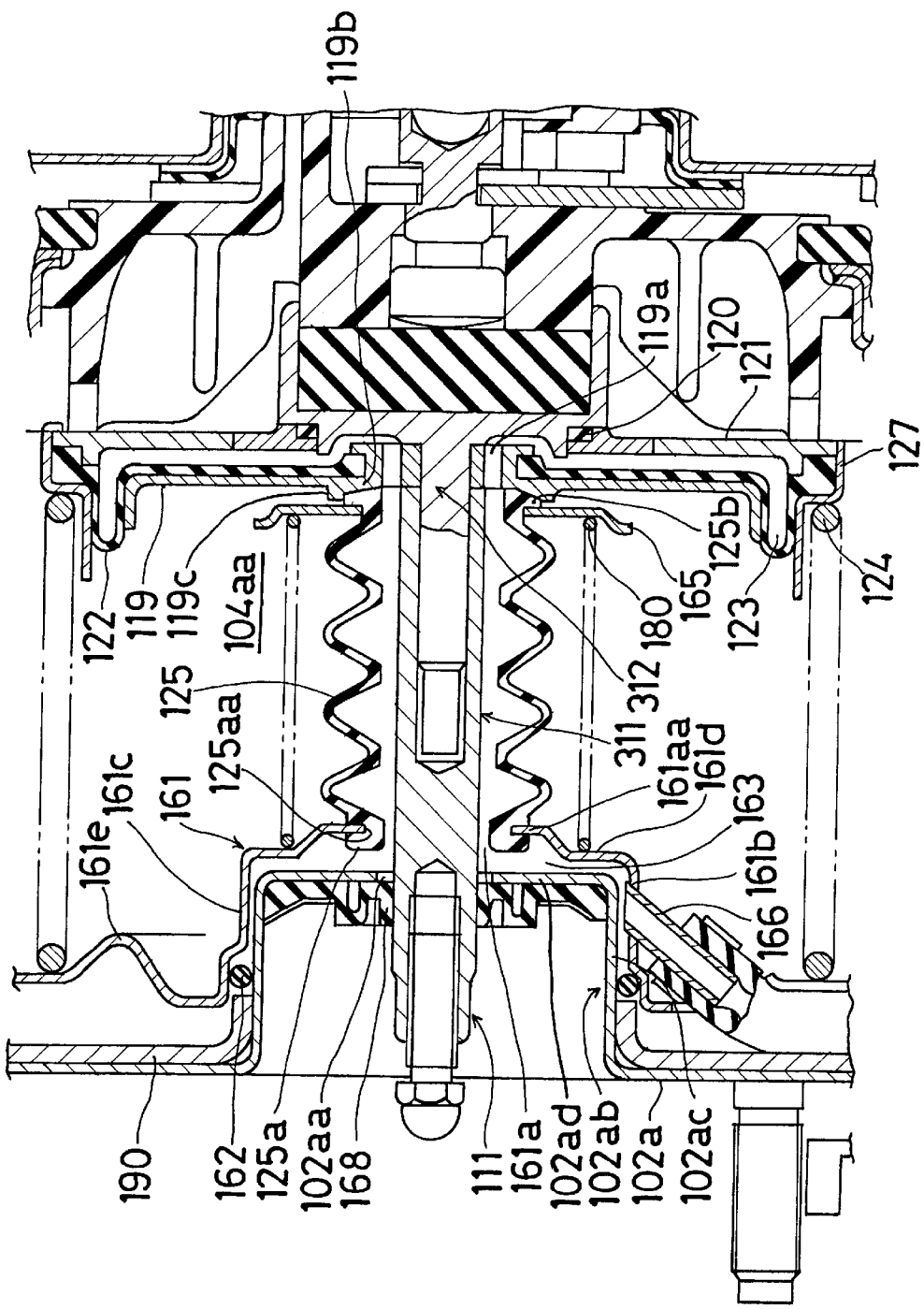
FIG. 15 is an enlarged cross-sectional view of a portion of the negative pressure type booster according to a sixth embodiment of the present invention in the vicinity of the output rod.

FIG. 15 illustrates a sixth embodiment of the present invention in which features similar to those associated with the fifth embodiment are correspondingly designated. Other than the passage 125, the structure of the negative pressure type booster according to this embodiment is much the same as that described above in connection with the fifth embodiment and so a detailed description of all of the features will not be repeated.

As shown in FIG. 15, a housing 102 includes a bottomed cylindrical bulging or protruding portion 102ab bulging towards the constant pressure chamber 104aa at the front inner center portion of the front shell 102a. Further, a reinforcing plate 190 having a substantially bottomed cylindrical shape, which is in contact with the housing 102 at a circumference of a cylindrical portion 102ac of the bulging portion 102ab, is disposed in the housing 102.

A plate 161 opposite to the bulging portion 102ab is disposed in the constant pressure chamber 104aa. A seal member 162 is disposed between the front outer peripheral portion of the cylindrical portion 102ac (first cylindrical portion) of the bulging portion 102ab and the front inner peripheral portion of a cylindrical portion 161c of the plate 161. A space portion 163 separated in an airtight manner from the constant pressure chamber 104aa is formed between the outer peripheral portion of the cylindrical portion 102ac of the bulging portion 102ab and the inner peripheral portion of the cylindrical portion 161c of the plate 161, and between the rear surface of a bottom portion 102ad of the bulging portion 102ab and the front surface of a bottom portion 161d of the plate 161.

An air passage 125 serving as an introduction passage for communicating an auxiliary variable pressure chamber 123 with the space portion 163 is disposed between an auxiliary movable wall 119 and the bottom portion 161d of the plate 161. The air passage 125 is made of an elastic material, has a bellows shape, is flexible, and is retractable/extensible in the rear and front direction (i.e., the right and left direction in FIG. 15).

An annular groove 125aa is formed at the outer peripheral portion of a front end portion 125a of the air passage 125, and a peripheral portion 161aa of an opening 161a formed in the bottom portion 161d of the plate 161 is engaged in an airtight manner with the annular groove 125aa. An annular plate 165 is disposed on the front surface of a rear end portion 125b of the air passage 125, and a return spring 180 is disposed between the bottom portion 161d of the plate 161 and the annular plate 165.

The rear end portion 125b of the air passage 125 has a taper shape tapering toward the rear side (i.e., the right side in FIG. 15), an inner peripheral portion 119b of the auxiliary movable wall 119 with which the rear end portion 125b comes in contact has a recessed shape corresponding to the rear end portion 125b, and the peripheral portion of the recess portion includes a protrusion 119c protruding forward.

The return spring 180 urges the rear end portion 125b of the air passage 125 toward the inner peripheral portion 119b of the auxiliary movable wall 119. Thus, the rear end portion 125b of the air passage 125 is in airtight contact with the inner peripheral portion 119b of the front surface of the auxiliary movable wall 119. Further, the protrusion 119c restrains a positional shift of the rear end portion 125b from the inner peripheral portion 119b.

The plate 161 includes an outward flange portion 161e at the front outer peripheral portion of the cylindrical portion 161c, and a return spring 124 is disposed between the flange portion 161e and the retainer 127. The return spring 124 urges the plate 161 as well as the flange portion 161e toward the front of the housing 102 by its urging force so that the front outer peripheral portion of the flange portion 161e is brought into contact with the housings as well as the rear end portion of the outer cylindrical portion of the reinforcing plate 190.

Upon assembling the front shell 102a and the rear shell 102b of the negative pressure type booster 101, the inlet 102c, the forming portions (i.e., the plate 161, the seal 162) of the space portion 163, the tube 166, the electromagnetic valve unit 126, the plate 165, and the air passage 125 having the return spring 128 are disposed in the front shell 102a, and the power piston 107, the valve mechanism 140, the input rod 108, the reaction disc 110, the output rod 111, and the formation portions (i.e., the auxiliary movable wall 119, the partition member 121, the retainer 127) are disposed in the rear shell 102b.

Next, the return spring 124 is set on the retainer 127. After the respective members are set in the front shell 102a and the rear shell 102b, the front shell 102a and the rear shell 102b are coupled together. When the front shell 102a and the rear shell 102b are coupled together, the output rod 111 protrudes outside of the housing 102 through the air passage 125 and the hole 102a of the front shell 102a, and the rear end portion 125b of the air passage 125 is brought into contact with the recess portion 119b of the auxiliary movable wall 119, so that the air passage 125 is disposed between the plate 161 and the auxiliary movable wall 119, and the return spring 124 is disposed between the flange portion 161c and the retainer 127.

Thus, upon assembly of the negative pressure type booster 101, the structure is divided into two units, that is the front shell 102a including the inlet 102c, the forming portions (i.e., the plate 161, the seal 162) of the space portion 163, the tube 166, the electromagnetic valve unit 126, and the air passage 125 with the plate 165 and the return spring 128, and the rear shell 102b including the power piston 107, the valve mechanism 140, the input rod 108, the reaction disk 110, the output rod 111, and the forming portions (i.e., the auxiliary movable wall 119, the partition member 121, the retainer 127) of the auxiliary variable pressure chamber 123. The return spring 124 is disposed between the unit of the front shell 102a and the unit of the rear shell 102b, and the unit of the front shell 102a and the unit of the rear shell 102b are coupled together so that the negative pressure type booster 101 can be easily assembled.

Further, because the front end portion 125a of the air passage 125 is engaged in an airtight manner with only the plate 161, even if, for example, the negative pressure type booster 101 is constructed such that the bulging portion 102ab has a cylindrical shape and a rear end portion of the master cylinder is disposed to the inside of the constant pressure chamber 104aa through the cylindrical portion, the air passage 125 and the plate 161 are stably engaged with each other.

Other advantageous operations and effects are the same as those of the fifth embodiment described above.

Figure 16:
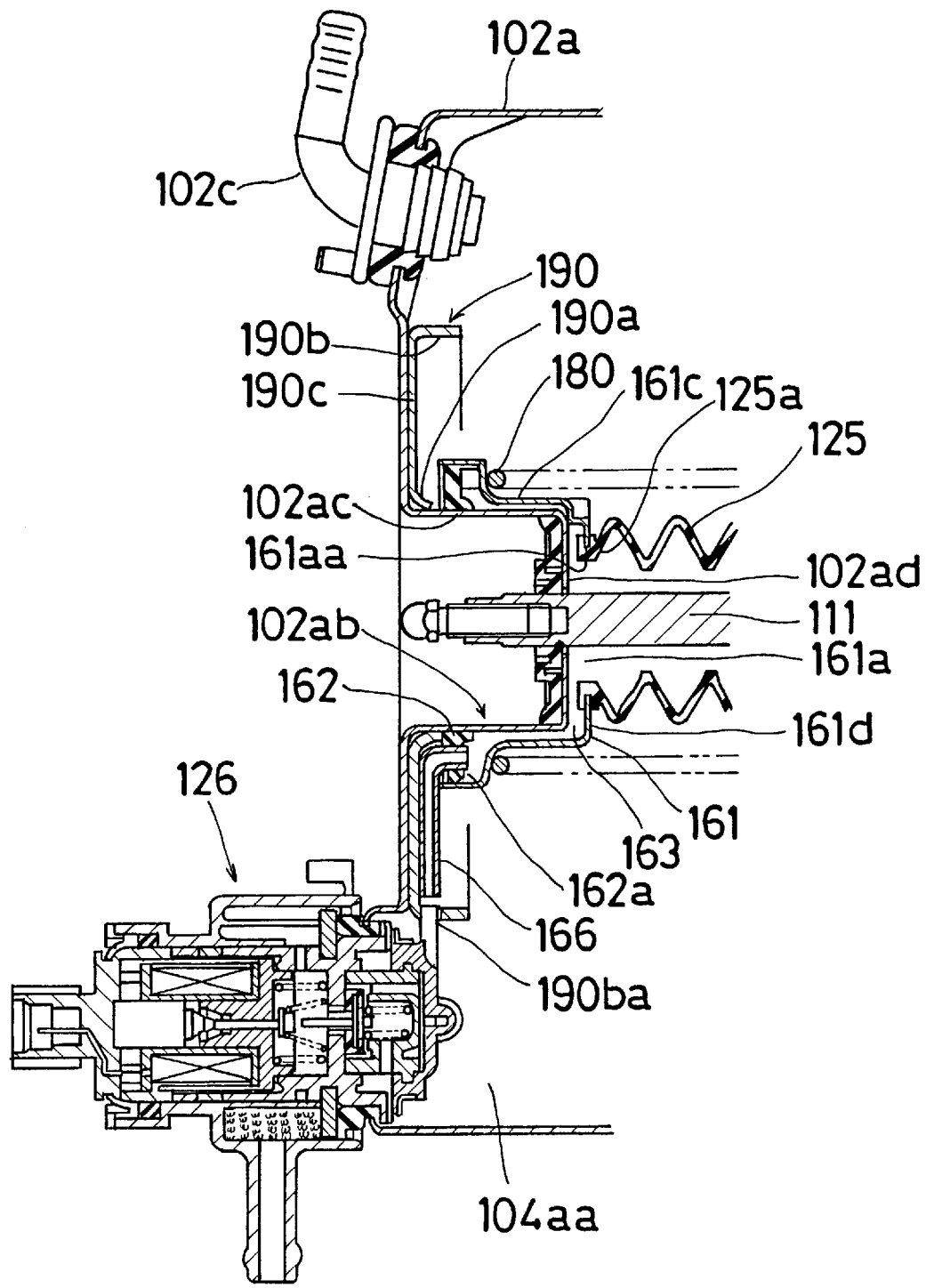
FIG. 16 is an enlarged cross-sectional view of a portion of the negative pressure type booster according to a seventh embodiment of the present invention in the vicinity of the plate.

A seventh embodiment of the present invention is shown in FIG. 16. Features of this embodiment that are similar to those of the sixth embodiment are denoted by the same reference characters. Further, a detailed description of features other than those relating to a plate 161 and a connection structure between a space portion 163 and an electromagnetic valve unit 126 through a tube 166 will not be repeated here as they have already been described previously.

As shown in FIG. 16, a housing includes a bottomed cylindrical bulging or protruding portion 102ab bulging towards a constant pressure chamber 104aa at a front inner central portion of the front shell 102a. Further, a reinforcing plate 190 having a substantially bottomed cylindrical shape, which is in contact with the housing 102 at the circumference of a cylindrical portion 102ac of the bulging portion 102ab, is disposed in the housing 102. The reinforcing plate 190 is made up of an inner cylindrical portion 190a, an outer cylindrical portion 190b, and an annular bottom portion 190c for connecting the front end portion of the inner cylindrical portion 190a and the front end portion of the outer cylindrical portion 190b.

A plate 161 positioned opposite to the bulging portion 102ab is disposed in the constant pressure chamber 104aa. An annular seal member 162 is disposed between the front outer peripheral portion of the cylindrical portion 102ac (first cylindrical portion) of the bulging portion 102ab and the front inner peripheral portion of a stepped cylindrical portion 161c of the plate 161. A space portion 163 separated in an airtight manner from the constant pressure chamber 104aa is formed between the outer peripheral portion 102ac of the cylindrical portion 102ac of the bulging portion 102ab and the cylindrical portion 161c of the plate 161, and between the rear surface of the bottom portion 102ad of the bulging portion 102ab and the front surface of the bottom portion 161d of the plate 161.

The front end portion of the cylindrical portion 161c of the plate 161 is separated from the rear surface of the bottom portion 190c of the reinforcing plate 190 by a predetermined distance so that they are not in contact with each other. An annular plate is disposed on the front surface of the seal member 162, and the inner peripheral portion of the seal member 162 is brought into contact with the rear end portion of the inner cylindrical portion 190a of the reinforcing plate 190 through this annular plate.

An assembling hole 162a in which the other end portion of the tube 166 is fitted and which extends in the rear and front direction (right and left direction in FIG. 16), is formed in the seal member 162. The tube 166 passes through a communication hole 190ba, which extends in the vertical direction to the axial direction of the outer cylindrical portion 190b (up and down direction in FIG. 16) and is formed in the outer cylindrical portion 190b of the reinforcing plate 190, and is extended in the vertical direction to the axial direction. The one end portion of the tube 166 is communicated with a variable pressure port of the electromagnetic valve unit 126 which is integrally and airtightly fitted to the front portion of the front shell 102a, and the other end portion passes along the space portion between the seal member 162 and the bottom portion 190c of the reinforcing plate 190, is inserted into the assembling hole 162a of the seal member 162 from the front side, and is communicated with the space portion 163. Thus, the electromagnetic valve unit 126 is communicated with the inside of the air passage 125 through the tube 166, the space portion 163, and the opening 161a.

The front end portion of the return spring 180 is brought into contact with the outer peripheral step portion of the cylindrical portion 161c of the plate 161 to urge the plate 161 forward, so that the plate is brought into contact with the front shell 102a as well as the rear end portion of the inner cylindrical portion 190a of the reinforcing plate 190 through the seal member 162 engaged with the inner peripheral step portion of the plate 161.

According to the negative pressure type booster of this embodiment, the space portion 163 is formed between the outer peripheral portion 102ac of the cylindrical portion 102ac of the bulging portion 102ab and the cylindrical portion 161c of the plate 161, and between the rear surface of the bottom portion 102ad of the bulging portion 102ab and the front surface of the bottom portion 161d of the plate 161. Thus, the space 163 formed of the plate 161 and the bulging portion 102ab in the constant pressure chamber 104aa can be made small. Thus, the space of the constant pressure chamber 104aa can be effectively used.

Further, because the other end portion of the tube 166 is fitted in the assembling hole 162a of the seal member 162 for maintaining airtightness between the bulging portion 102ab and the plate 161, the tube 166 is communicated in an airtight manner with the space portion 163. Thus, members other than the seal member 162 are not required as airtightness keeping members attendant on the communication between the tube 166 and the space portion 163. It thus becomes possible to prevent an increase in the number of parts and to improve the assembly operation.

Other operations and effects associated with this embodiment are the same as those of the fifth embodiment and the sixth embodiment.

Figure 17:
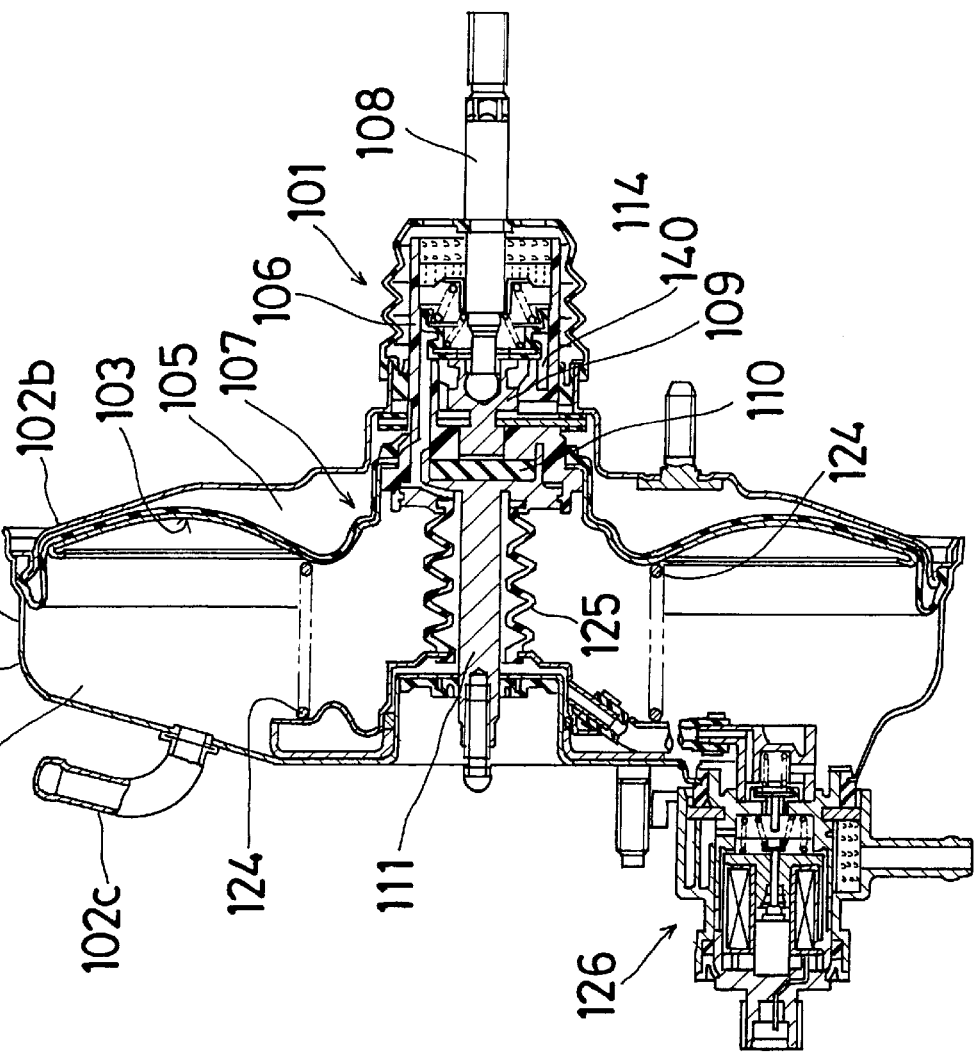
FIG. 17 is a cross-sectional view of a negative pressure type booster according to an eighth embodiment of the present invention.
Figure 18:
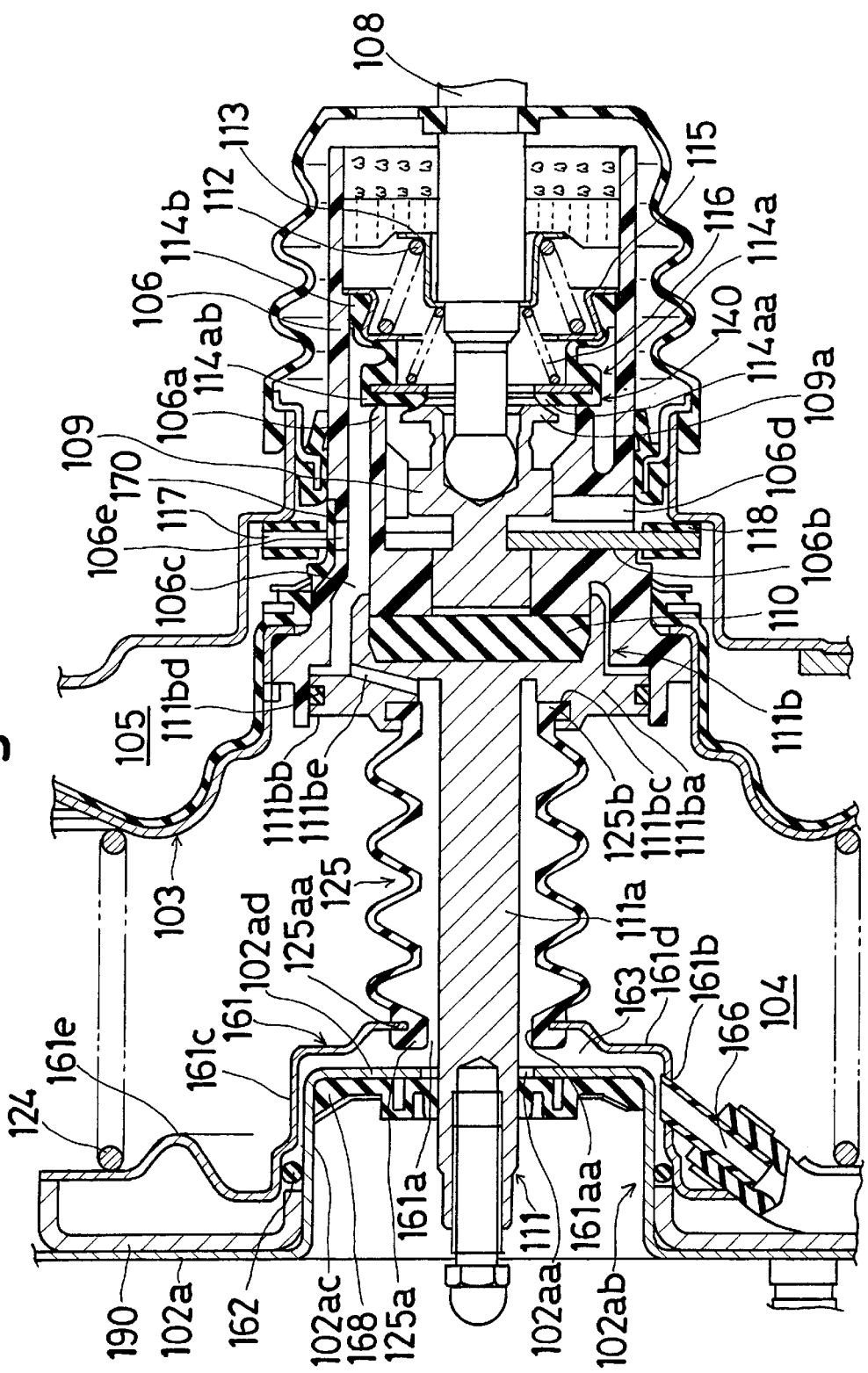
FIG. 18 is an enlarged cross-sectional view of a portion of the negative pressure type booster shown in FIG. 17 in the vicinity of the valve mechanism.

FIGS. 17 and 18 illustrates an eighth embodiment of the negative pressure type booster of the present invention. Features similar to those of the fifth embodiment are denoted by the same reference characters.

As shown in FIGS. 17 and 18, a housing 102 of the negative pressure type booster 102 is made up of a front shell 102a of a front side (i.e., the left side in FIG. 17) portion and a rear shell 102b of a rear side (i.e., the right side in FIG. 17) portion, The housing includes a movable wall 103 which has its outer peripheral portion fixed in an airtight manner in the housing 102. The wall 103 can be moved in the rear and front direction (right and left direction in FIG. 17) and divides the pressure chamber in the housing 102 in an airtight manner into a constant pressure chamber 104 positioned at the front thereof and a variable pressure chamber 105 positioned at the rear thereof. The constant pressure chamber 104 communicates with the intake manifold of an engine of a vehicle as a negative pressure source through an inlet 102c, and always generates a negative pressure.

A valve housing 106 made of a resin material is inserted into the housing 102 from the rear, and a movable wall 103 is fixed in an airtight manner to the valve housing 106 at its inner peripheral end. The movable wall 103 and the valve housing 106 form a power piston 107 which moves in the housing 102 in the rear and front direction.

In FIG. 17, an input rod 108, the rear end of which is coupled to a brake operation member of a vehicle (e.g., a brake pedal), is inserted into the inside of the valve housing 106. The input rod 108 is coupled to an input member 109 so as to be unitedly movable in the rear and front direction.

The input member 109 serves to transmit the input from the input rod 108 to a reaction disk 110. An output rod 111 brought into contact with the reaction disk 110 is moved by receiving the input through the reaction disk 110 to operate a piston (not shown) of a master cylinder.

A first retainer 113 receiving a return spring 112 is fixed to the input rod 108. A second retainer 115, which supports a rear end portion 114b of a control valve 114, is fixed to the valve housing 106 while receiving an elastic force from the input rod 108 through the first retainer 113 and the return spring 112. The control valve 114 is engaged with the second retainer 115 at the inner periphery of the rear end portion 114b in FIG. 17, and produces a sealing function between the outer periphery and the valve housing 106. A valve spring 116 is provided between a retainer for supporting a seal portion 114a as the front end portion of the control valve 114 and the first retainer 113.

By virtue of the structure described above, in an inoperative state of the input rod 108, an air valve portion 114aa of the seal portion 114a of the control valve 114 is engaged with an air valve seat 109a formed at the rear end of the input member 109. In an operative state of the input rod 108, a vacuum valve portion 114ab of the seal portion 114a is adapted to be engaged with a vacuum valve seat 106a provided in the valve housing 106. That is, the air valve portion 114aa and the air valve seat 109a make up an atmosphere valve, and the vacuum valve portion 114ab and the vacuum valve seat 106a make up a negative pressure valve. The control valve 114, the air valve seat 109a of the input member 109, and the vacuum valve seat 109a of the valve housing 106 make up a valve mechanism 140.

A key 117 is inserted in a key groove 106b set in the valve housing 106, and is in contact with the housing 102 through a damper member 118 in the inoperative state. Further, in the valve housing 106 are formed a vacuum path 106c for communicating the costant pressure chamber 104 with the negative pressure valve, and an air path 106d for communicating the variable pressure chamber 105 with the atmosphere valve.

One end opening portion of the vacuum path 106c opening in the constant pressure chamber 104 is formed at the front end portion of the valve housing 106 and the other end opening portion is communicated with the negative pressure valve. One end opening portion of the air path 106d opening in the constant pressure chamber 105 is formed at the side portion of the valve housing 106 and the other end opening portion is communicated with the atmosphere valve. In addition, a hole 106e for communicating the vacuum path 106c with the variable pressure chamber 105 is formed at the side portion of the valve housing 106. A one-way valve 170, which is opposite to the hole 106e and allows only communication from the vacuum path 106c to the variable pressure chamber 105, is disposed at the outer peripheral portion of the valve housing 106. The one-way valve 170 is made of an elastic material.

The output rod 111 includes a shaft portion 111a, a bottomed cylindrical portion 111b containing the reaction disk 110 and fitted in the front end portion of the valve housing 106, an annular protrusion 111ba protruding forward from the bottom of the bottomed cylindrical portion 111b, and an outer flange portion 111bb as a contact portion formed on the outer periphery of the annular protrusion 111ba. An annular groove 111bc is formed in the inner peripheral portion of the annular protrusion 111ba, and a seal ring 111bd is disposed in an annular groove formed in the outer peripheral portion of the outer flange portion 111bb.

The bottomed cylindrical portion 111b is fitted to the front central portion of the valve housing 106 through the reaction disc 110, and the flange portion 111bb is fitted in an airtight manner to the front portion inner periphery of the valve housing 106 through the seal ring 111bd, so that the output rod 111 is coupled in such a manner that it can slide in the rear and front direction with respect to the valve housing 106. Because the flange portion 111bd of the output rod 111 is coupled to the valve housing 106, the one end opening portion of the vacuum path 106c is blocked by the flange portion 111bd, that is the output rod.

The housing 102 includes a bottomed cylindrical bulging portion 102ab bulging toward the constant pressure chamber 104aa at the front inner peripheral portion of the front shell 102a. Further, a reinforcing plate 190, which has a substantially bottomed cylindrical shape and is in contact with the housing 102 at a circumference of a cylindrical portion 102ac of the bulging portion 102ab, is disposed in the housing 102.

A plate 161 opposite to the bulging portion 102ab is disposed in the constant pressure chamber 104aa. A seal member 162 is disposed between the outer peripheral portion of the cylindrical portion 102ac (first cylindrical portion) of the bulging portion 102ab and the front inner peripheral portion of the cylindrical portion 161c of the plate 161. A space portion 163 separated in an airtight manner from the constant pressure chamber 104aa is formed between the outer peripheral portion of the cylindrical portion 102ac of the bulging portion 102ab and the cylindrical portion 161c of the plate 161, and between the rear surface of the bottom portion 102ad of the bulging portion 102ab and the front surface of the bottom portion 161d of the plate 161.

An air passage 125 as an introduction passage for communicating the vacuum path 106c with the space portion 163 is disposed between the annular protrusion 111ba of the output rod 111 and the bottom portion 161d of the plate 161. The air passage 125 is made of an elastic material, has a bellows shape, is flexible, and is retractable/extensible in the rear and front direction (i.e., the left and right direction in FIG. 18).

An annular groove 125aa is formed on the outer peripheral portion of the front end portion 125a of the air passage 125, and a peripheral flange portion 161aa of the opening 161a formed in the bottom portion 161d of the plate 161 is engaged in an airtight manner with the annular groove 125*aa*. A rear end portion 125*b* of the air passage 125 is engaged in an airtight manner with the annular groove 111*bc* formed in the annular protrusion 111*ba* of the output rod 111.

The inside of the air passage 125 and the space portion 163 are communicated with each other through the opening 161*a* of the plate 161, and a communication passage 111*be* for communicating the vacuum path 106*c* with the inside of the air passage 15 is formed in the output rod 111. Thus, the vacuum path 106*c* and the space portion 163 are communicated with each other through the communication passage 111*be*, the inside of the air passage 125, and the opening 161*a*.

A shaft portion 111*a* of the output rod 111 protrudes outside of the housing 102 through the hole 102*aa* formed in the bottom portion 102*ac* of the bulging portion 102*ab* of the front shell 102*a*, the opening 161*a* of the plate 161, and the inside of the air passage 125. That is, the output rod 111 is disposed in the air passage 125 and passes through the space portion 163 and the air passage 125. The shaft portion 111*a* of the output rod 111 passes in an airtight manner through the front shell 102*a* through the seal member 168.

An electromagnetic valve unit 126 is disposed in an airtight manner at the front side of the front shell 102*a* of the housing 102. The electromagnetic valve 126 and the plate 161 are connected with each other through the tube 166. One end portion of the tube 166 is connected to a variable pressure port of the electromagnetic valve unit 126, and the other end portion is attached in an airtight manner to the communication hole 161*b* formed in the plate 161. Thus, the variable pressure port of the electromagnetic valve unit 126 is communicated with the space portion 163 through the tube 166.

A flange portion 161*e* is disposed at the front outer peripheral portion of the cylindrical portion 161*c* of the plate 161, and a return spring 124 is disposed between the flange portion 161*e* and the movable wall 103. The return spring 124 urges the flange portion 161*e* toward the front of the housing 102 by its urging force so that the front portion of the cylindrical portion 161*c* of the plate 161 is airtightly brought into contact with the housing 102 through the seal member 162 and the reinforcing plate 190. Further, the return spring 124 urges the movable wall 103 rearward, and moreover, urges the power piston 107 rearward.

The electromagnetic valve unit 126 used in this embodiment is similar to the electromagnetic valve unit of the previous embodiment and so a detailed explanation will not be repeated.

Upon assembly of the front shell 102*a* and the rear shell 102*b* of the negative press type booster 101, the inlet 102*c*, the forming portions (i.e., the plate 161, the seal 162) of the space portion 163, the tube 166, the electromagnetic valve unit 126, and the output rod 111 provided with the air passage 125 and the reaction disk 110 are first disposed in the front shell 102*a*. Also, the power piston 107, the valve mechanism 140, and the input rod 108 are disposed in the rear shell 102*b*.

Next, the return spring 124 is set on the flange portion 161*c* of the plate 161. After the respective members are set in the front shell 102*a* and the rear shell 102*b*, the front shell 102*a* and the rear shell 102*b* are coupled together. When the front shell 102*a* and the rear shell 102*b* are coupled together, the output rod 111 is coupled to the front portion of the valve housing 106, and the return spring 124 is disposed between the flange portion 161*c* and the movable wall 103.

Figure 19:
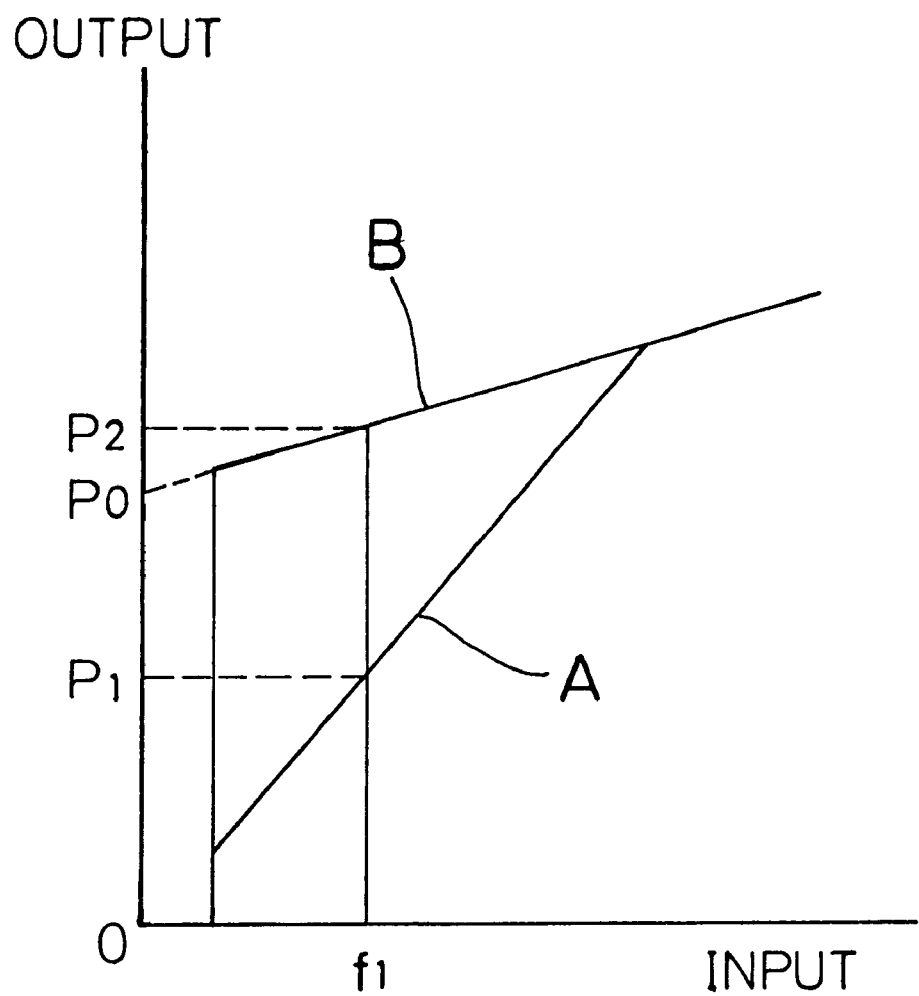
FIG. 19 is a characteristic input/output diagram of the negative pressure type booster according to the eighth embodiment of the present invention.

The operation of the negative pressure type booster 101 is as follows. FIG. 19 is a characteristic diagram of the negative pressure type booster 101 in which the vertical axis indicates output and the horizontal axis indicates input. The electromagnetic valve unit 126 will be described with reference to FIG. 13. As shown in FIG. 13 and FIGS. 17–19, in an initial state in which a driver does not operate a brake operation member of a vehicle (e.g., brake pedal), the air valve portion 114*aa* of the seal portion 114*a* of the control valve 114 is engaged with the air valve seat 109*a* of the input member 109, and the vacuum valve portion 114*ab* of the seal portion 114*a* is not engaged with the vacuum valve seat 106*a* of the valve housing 106. Thus, the variable pressure chamber 105 is communicated with an intake manifold of an engine of a vehicle through the air path 106*d*, the clearance between the vacuum valve portion 114*ab* and the vacuum valve seat 106*a*, the vacuum path 106*c*, the communication path 111*be*, the inside of the air passage 125, the space portion 163, the tube 166, the variable pressure port 126*c* of the electromagnetic valve 126, the clearance between the valve 126*f* and the constant pressure valve seat 126*d*, the constant pressure port 126*a*, the constant pressure chamber 104, and the inlet 102*a*.

When the driver operates the brake operation member of the vehicle (e.g., a brake pedal), the input rod 108 coupled to the brake operation member receives the input and is moved forward. Thus, the input member 109 fixed to the input rod 108 is also moved forward together with the input rod 108.

Through movement of the input member 109, the seal portion 114*a* as well as the control valve 114 is moved forward by the urging force of the valve spring 116 together with the input member 109. The vacuum valve portion 114*ab* of the seal portion 114*a* is brought into contact with the vacuum valve seat 106*a* of the valve housing 106 and the variable pressure chamber 105 is cut off from the constant pressure chamber 104 so that the communication between the variable pressure chamber 105 and the negative pressure source of the vehicle is also cut off.

When the input member 109 is further moved forward, the engagement between the air valve portion 114*aa* of the seal portion 114*a* and the air valve seat 109*a* of the input member 109 is released, and the variable pressure chamber 105 is communicated with the atmosphere through the air path 106*d*, and the clearance between the air valve portion 114*aa* and the air valve seat 109*a*. Thus, by the inflow of the air into the variable pressure chamber 105, a pressure difference is generated between the constant pressure chamber 104 and the variable pressure chamber 105, so that the movable wall 103 receiving the load caused by this pressure difference and the valve housing coupled thereto, (i.e., the power piston 107) advances in the housing 102, and presses the output rod 111 forward through the reaction disk 110. That is, the power piston 107 outputs an amplified input to the output rod 111. When the propelling force of the power piston 107 is outputted to the output rod 111 and the output rod 111 is moved forward, a braking force is applied to a wheel of the vehicle.

Subsequently, by the counter force received by the input rod 108 through the input member 109 from the reaction disk 110, the air valve portion 114*aa* of the seal portion 114*a* and the air valve seat 109*a* of the input member 109, and the vacuum valve portion 114*ab* of the seal portion 114*a* and the vacuum valve seat 106*a* of the valve housing 106, are selectively engaged with each other so that the assisting force of the negative pressure type booster 101 is controlled according to the input of the driver applied to the input rod 108.

The propelling force of the power piston 107, that is the counter force caused by the output of the output rod 111 and the input generated by the operation of the brake pedal and transmitted to the input member 108 are applied to the reaction disk 110 and are balanced.

When the inside of the variable pressure chamber 105 reaches atmospheric pressure by the inflow of the air into the variable pressure chamber 105, the power piston 107 does not advance any more, and thereafter the output of the negative pressure type booster 101 is made in such a manner that the input rod 108 and the input member 109 press the output rod 111 forward through the reaction disk 110. That is, the input becomes equal to the output.

In the state of this normal operation, the relationship between the braking operation force applied to the input rod 108 and the braking output to the output rod 111 is shown by a line A in FIG. 19.

When, for example, an obstacle appears in front of a vehicle and a controller of the vehicle judges the need for urgent braking through a method of judging the necessity of an urgent braking operation upon detecting the existence of an obstacle in front of a vehicle by picture processing with a CCD camera or by a distance sensor, an automatic operation in which an electric power source supplies electric power to the solenoid 126k so that an output larger than a normal output of the negative pressure type booster 101 is generated, is also started independently of the braking operation of the driver.

The solenoid 126k supplied with the electric power generates an electromagnetic force to move the movable core 126i rearward against the urging force of the springs 126l and 126n. Because the air is introduced into the variable pressure chamber 105 by the movement of the movable core 126i, a pressure difference is generated between the rear and the front of the movable wall 103 so that the movable wall 103 is moved forward. Because the movable wall 103 moves, the output rod 111 is moved forward while shrinking the air passage 125a.

When the output rod 111 is applied with the load caused by the pressure difference between the constant pressure chamber 104 and the variable pressure chamber 105 so that the output rod 111 is moved forward, the piston of the master cylinder is pressed and the brake fluid pressurized by the negative pressure type booster 101 is conveyed to the wheel cylinders of the respective wheels.

At this time, the relationship between the input applied to the input rod 108 in the negative pressure type booster 101 and the output to the output rod 111 is shown by point $P_0$ in FIG. 19. That is, the negative pressure type booster 101 outputs the output $P_0$ in the state where the input is 0.

In the state in which the negative pressure type booster 101 outputs the output $P_1$ by the operation to the input rod 108 at input $f_1$, and the counter force from the output rod 111 and the input of the input rod 108 and the power piston 107 are balanced, the vacuum valve seat 106a and the air valve seat 109a are engaged with the seal portion 114a, and the vacuum path 106c and the air path 106b are cut off. In the case where the electromagnetic valve unit 126 is operated in this state, the air flowing from the air passage 125 into the vacuum path 106c opens the one-way valve 170 toward the side of the variable pressure chamber 105 from the hole 106e formed in the valve housing 106 and flows into the variable pressure chamber 105.

Because air is introduced into the variable pressure chamber 105, a pressure difference is generated between the rear and the front of the movable wall 103, and the movable wall 103 is moved forward. Because the movable wall 103 is moved, the output rod 111 is moved forward while shrinking the air passage 125a.

When the output rod 111 receives the load caused by the pressure difference between the constant pressure chamber 104 and the variable pressure chamber 105, and the output rod 111 is moved forward, the piston of the master cylinder is pressed and the brake fluid pressurized by the negative pressure type booster 101 is conveyed to the wheel cylinders of the respective wheels.

At this time, the relationship between the input applied to the input rod 108 in the negative pressure type booster 101 and the output to the output rod 111 is shown by a diagram B in FIG. 19. That is, the negative pressure type booster 101 outputs the output $P_2$ in the state of the input $f_1$.

When the braking operation is released by the driver, the communication between the variable pressure chamber 105 and the atmosphere is cut off by the operation of the valve mechanism 140, and the variable pressure chamber 105 is communicated with the constant pressure chamber 103 so that the pressure difference between the variable pressure chamber 105 and the constant pressure chamber 103 is decreased.

Also, when the controller detects that urgent braking has become unnecessary, because electric power supply from the power source to the solenoid 126k is stopped, the solenoid does not generate the electromagnetic force to the movable core 126i, and the movable core 126i is returned forward by the urging force of the spring 126l through the rod portion 126j. In addition, the valve body portion 126g is urged forward by the urging force of the spring 126n, and the valve 126f is separated from the constant pressure valve seat 126d and is brought into contact with the atmosphere valve seat 126e.

By the forward movement of the movable core 126i and the valve body portion 126g, the space portion 163, the inside of the air passage 125, and the vacuum path 106c are cut off from the atmosphere and are again communicated with the constant pressure chamber 104. By the operation of the valve mechanism 140 and the electromagnetic valve unit 126, the power piston 107 is returned back by the return spring 124. That is, the automatic operation of the negative pressure type booster 101 is ended.

As described above, upon assembling the negative pressure type booster 101, the structure is divided into two units, that is the front shell 102a including the inlet 102c, the forming portions (i.e., the plate 161, the seal 162) of the space portion 163, the tube 166, the electromagnetic valve unit 126, and the output rod 111 with the air passage 125 and the reaction disk 110, and the rear shell 102b including the power piston 107, the valve mechanism 140, the input rod 108, the reaction disk 110, and the output rod 111. The return spring 124 is disposed between the front shell unit 102a and the rear shell unit 102b, and the front shell unit 102a and the rear shell unit 102b are coupled together so that the negative pressure type booster 101 can be easily assembled. Other operations and effects associated with this embodiment are similar to those of the fifth embodiment described above.

In this embodiment, although the invention is described in the context of a single type negative pressure booster, the invention is also applicable to a tandem type negative pressure type booster. Also, the one-way valve 170 made of an elastic member can be replaced by an alternative device such as an electrically operated valve unit.

By virtue of the present invention, because the effective diameter of the auxiliary movable wall is set so as to generate an output suitable for the front stage pressurizing function in the braking fluid pressure control apparatus equipped with the braking and steering control system and the like, the negative pressure type booster can be applied for the front pressurizing function in the braking and steering control system and the like. Thus, in the negative pressure type booster which is automatically operable, the booster can be applied for the front stage pressurizing function in the braking and steering control system and the like, and it is possible to provide the negative pressure type booster in which control such as braking and steering control is made more effective.

The present invention also makes it possible for the partition member to stably receive the urging force from the urging member. Additionally, the configuration of the seal member is advantageous as the curved portion makes it possible to realize smooth movement of the auxiliary movable wall.

The present invention also desirably makes communication between the negative pressure path and the front chamber through the communication path more certain at the contact between the partition member and the piston.

According to the present invention, because the one end portion of the introduction passage is engaged with only the plate, the inflow of air from the space portion to the introduction passage or from the introduction passage to the space portion can be made smooth. It is thus possible to provide the negative pressure type booster in which the inflow of the air from the space portion to the variable pressure chamber is made smoothly.

By virtue of the present invention, the space portion in the constant pressure chamber can be made small and the space in the constant pressure chamber can be used effectively. Also, the number of parts forming the negative pressure type booster can be reduced, the assembling operation can be improved and the size of the booster cab be reduced.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A negative pressure type booster comprising:
   a housing including at least one pressure chamber;
   a piston including a movable wall and a valve housing coupled to the movable wall, the movable wall being disposed in the housing for moving back and forth with respect to the housing, the movable wall dividing the pressure chamber into a front chamber for communicating with a negative pressure source and a rear chamber adapted to be selectively communicated with the negative pressure source and the atmosphere;
   an input member disposed in the valve housing for moving back and forth with respect to the valve housing and adapted to be moved by a braking operation;
   a valve mechanism disposed in the valve housing and including a negative pressure valve for communicating the rear chamber with the front chamber according to movement of the input member, and an atmosphere valve for communicating the rear chamber with the atmosphere according to movement of the input member;
   an output member for outputting to outside a propelling force of the valve housing caused by movement of the movable wall, said output member being comprised of a first member at a front side and a second member at a rear side;
   an auxiliary movable wall which is disposed in the front chamber for moving back and forth and being adapted to be engaged with the first member, the auxiliary movable wall being slidably engaged with the second member in the rear and front direction;
   a partition member for forming an auxiliary variable pressure chamber behind the auxiliary movable wall;
   switching means for selectively communicating the auxiliary variable pressure chamber with the negative pressure source or the atmosphere; and
   an urging member for urging the partition member rearward to contact the piston and for urging the piston rearward.

2. The negative pressure type booster as claimed in claim 1, including a negative pressure passage formed in the valve housing for communicating the front chamber with the negative pressure valve, and a communication passage formed in a contact portion which contacts the piston, the communication passage communicating the front chamber with the negative pressure passage when the contact portion is in contact with the piston.

3. A negative pressure type booster comprising:
   a housing including at least one pressure chamber;
   a piston including a movable wall and a valve housing coupled to the movable wall, the movable wall being disposed in the housing for moving back and forth with respect to the housing, the movable wall dividing the pressure chamber into a front chamber for communicating with a negative pressure source and a rear chamber adapted to be selectively communicated with the negative pressure source and the atmosphere;
   an input member disposed in the valve housing for moving back and forth with respect to the valve housing and adapted to be moved by a braking operation;
   a valve mechanism disposed in the valve housing and including a negative pressure valve for communicating the rear chamber with the front chamber according to movement of the input member, and an atmosphere valve for communicating the rear chamber with the atmosphere according to movement of the input member;
   an output member for outputting to outside a propelling force of the valve housing caused by movement of the movable wall, said output member being comprised of a first member at a front side and a second member at a rear side;
   an auxiliary movable wall which is disposed in the front chamber for moving back and forth and being adapted to be engaged with the first member;
   a partition member for forming an auxiliary variable pressure chamber behind the auxiliary movable wall, the partition member being engaged with the second member and including a flexible engaged portion;
   switching means for selectively communicating the auxiliary variable pressure chamber with the negative pressure source or the atmosphere; and
   an urging member for urging the partition member rearward to contact the piston and for urging the piston rearward.

4. The negative pressure type booster as claimed in claim 3, wherein the partition member is engaged with the auxiliary movable wall, and the auxiliary variable pressure chamber is surrounded by the auxiliary movable wall and the partition member.

5. A negative pressure type booster comprising:

a housing including at least one pressure chamber;

a piston including a movable wall and a valve housing coupled to the movable wall, the movable wall being disposed in the housing for moving back and forth with respect to the housing, the movable wall dividing the pressure chamber into a front chamber for communicating with a negative pressure source and a rear chamber adapted to be selectively communicated with the negative pressure source and the atmosphere;

an input member disposed in the valve housing for moving back and forth with respect to the valve housing and adapted to be moved by a braking operation;

a valve mechanism disposed in the valve housing and including a negative pressure valve for communicating the rear chamber with the front chamber according to movement of the input member, and an atmosphere valve for communicating the rear chamber with the atmosphere according to movement of the input member;

an output member for outputting to outside a propelling force of the valve housing caused by movement of the movable wall, said output member being comprised of a first member at a front side and a second member at a rear side;

an auxiliary movable wall which is disposed in the front chamber for moving back and forth and being adapted to be engaged with the first member;

a partition member for forming an auxiliary variable pressure chamber behind the auxiliary movable wall, the partition member being engaged with the auxiliary movable wall, and the auxiliary variable pressure chamber being surrounded by the auxiliary movable wall and the partition member;

switching means for selectively communicating the auxiliary variable pressure chamber with the negative pressure source or the atmosphere;

an urging member for urging the partition member rearward to contact the piston and for urging the piston rearward; and a seal member for engaging the auxiliary movable wall with the partition member in an airtight manner.

6. The negative pressure type booster as claimed in claim 5, wherein an inner peripheral portion of the seal member is held in an airtight manner by the auxiliary movable wall, and an outer peripheral portion of the seal member is held in an airtight manner by the partition member.

7. The negative pressure type booster as claimed in claim 6, wherein the seal member includes, between the outer peripheral portion and the inner peripheral portion, an outer peripheral cylindrical portion protruding forward, an inner peripheral cylindrical portion protruding forward at an inner peripheral side of the outer peripheral cylindrical portion, and a connection portion for connecting a front portion of the outer peripheral cylindrical portion and a front portion of the inner peripheral cylindrical portion, the seal member further including a flexible curved portion.

8. A negative pressure type booster comprising:

a housing including at least one pressure chamber;

a piston including a movable wall and a valve housing coupled to the movable wall, the movable wall being disposed in the housing for moving back and forth with respect to the housing, the movable wall dividing the pressure chamber into a front chamber adapted to communicate with a negative pressure source and a rear chamber adapted to be selectively communicated with the negative pressure source and the atmosphere;

an input member disposed in the valve housing for moving back and forth with respect to the valve housing and being movable by a braking operation;

a valve mechanism disposed in the valve housing, the valve mechanism including a negative pressure valve for communicating the rear chamber with the front chamber according to movement of the input member and an atmosphere valve for communicating the rear chamber with the atmosphere according to movement of the input member;

a first negative pressure passage formed in the valve housing for communicating the front chamber with the negative pressure valve;

an output member for outputting to outside a propelling force of the valve housing caused by movement of the movable wall, said output member being defined by a first member at a front side and a second member at a rear side;

an auxiliary movable wall disposed in the front chamber for back and forth movement and being adapted to be engaged with the first member;

a partition member for forming an auxiliary variable pressure chamber behind the auxiliary movable wall;

switching means for selectively communicating the auxiliary variable pressure chamber with the negative pressure source or the atmosphere; and a second negative pressure passage formed between the partition member and the piston for communicating the front chamber with the first negative pressure passage.

9. The negative pressure type booster as claimed in claim 8, wherein the housing includes a front pressure chamber and a rear pressure chamber, the movable wall including a first movable wall for dividing the front pressure chamber into a first front chamber and a first rear chamber, and a second movable wall for dividing the rear pressure chamber into a second front chamber and a second rear chamber, the auxiliary variable pressure chamber being positioned at the first front chamber.

10. The negative pressure type booster as claimed in claim 8, wherein the switching means includes an electromagnetic valve for selectively communicating the introduction passage with the negative pressure source or the atmosphere.

11. The negative pressure type booster as claimed in claim 8, wherein the switching means includes an introduction passage passing through the front chamber and communicating with the auxiliary variable pressure chamber.

12. The negative pressure type booster as claimed in claim 11, wherein the introduction passage has a bellows shape and is movable in the front and back direction.

13. The negative pressure type booster as claimed in claim 11, wherein the introduction passage covers an outer periphery of the output member, and includes a first passage communicating with the auxiliary variable pressure chamber and a second passage for communicating the first passage with an electromagnetic valve unit.

14. The negative pressure type booster as claimed in claim 13, wherein the first passage is movable in the front and back direction.

15. The negative pressure type booster as claimed in claim 13, including a partition wall disposed in an airtight manner in an inner front portion of the housing and forming the second passage between the partition wall and the inner front portion.

16. A negative pressure type booster comprising:

a housing including at least one pressure chamber;

a movable wall disposed in the housing for moving back and forth, the movable wall dividing the pressure chamber into a constant pressure chamber positioned at a front side that is adapted to be communicated with a negative pressure source and a variable pressure chamber positioned at a rear side that is adapted to be selectively communicated with the negative pressure source and the atmosphere;

a plate member disposed in the constant pressure chamber and forming a space portion separated in an airtight manner from the constant pressure chamber between the plate member and the housing;

an introduction passage disposed in the constant pressure chamber, one end portion of the introduction passage being in contact with only the plate member and communicating the space portion with the variable pressure chamber;

switching means for selectively communicating the variable pressure chamber with the negative pressure source or the atmosphere through the space portion and the introduction passage; and an output member for outputting to outside a propelling force caused by movement of the movable wall.

17. The negative pressure type booster as claimed in claim 16, wherein the switching means is integrally disposed in the housing.

18. The negative pressure type booster as claimed in claim 16, wherein the switching means is an electromagnetic valve unit.

19. The negative pressure type booster as claimed in claim 16, further comprising:

a valve housing coupled to the movable wall;

an input member disposed in the valve housing for moving back and forth with respect to the valve housing and being adapted to be moved by a braking operation; and a valve mechanism disposed in the valve housing and including a negative pressure valve for communicating the variable pressure chamber with the constant pressure chamber according to movement of the input member and an atmosphere valve for communicating the variable pressure chamber with the atmosphere according to movement of the input member.

20. The negative pressure type booster as claimed in claim 19, further comprising:

a negative pressure passage disposed in the valve housing, the negative pressure passage having one end opening which opens at a front end portion of the valve housing and an opposite end opening which communicates with the negative pressure valve;

a one-way valve disposed in the valve housing for allowing one-way communication from the negative pressure passage to the variable pressure chamber when the space portion is communicated with the atmosphere by the switching means in a state where communication between the constant pressure chamber and the variable pressure chamber and communication between the variable pressure chamber and the atmosphere are cut off by the valve mechanism, the output member being disposed in the introduction passage;

a contact portion for contacting a front end portion of the valve housing and blocking the one end opening of the negative pressure passage, the open end portion of the introduction passage being engaged with the plate member and an opposite end portion of the introduction passage being engaged with the contact portion; and a communication passage disposed at the contact portion for communicating the negative pressure passage with the introduction passage.

21. The negative pressure type booster as claimed in the claim 16, wherein the movable wall includes a first movable wall for dividing the pressure chamber into a front chamber at a front side and a rear chamber at a rear side, the rear chamber being selectively communicated with the negative pressure source and the atmosphere, and a second movable wall disposed in the front chamber for moving back and forth and dividing the front chamber into the constant pressure chamber positioned at a front side and the variable pressure chamber positioned at a rear side;

the booster further comprising:

a valve housing coupled to the first movable wall;

an input member disposed in the valve housing for moving back and forth with respect to the valve housing and being adapted to be moved by a braking operation; and a valve mechanism disposed in the valve housing and including a negative pressure valve for communicating the rear chamber with the negative pressure source according to movement of the input member, and an atmosphere valve for communicating the rear chamber with the atmosphere according to movement of the input member.

22. The negative pressure type booster as claimed in claim 21, wherein the output member is disposed in the introduction passage, and an opposite end portion of the introduction passage being adapted to contact the second movable wall.

23. The negative pressure type booster as claimed in claim 22, including a partition member disposed in the constant pressure chamber and forming the variable pressure chamber separated in an airtight manner from the constant pressure chamber between the partition member and the second movable wall.

24. The negative pressure type booster as claimed in claim 22, wherein the one end portion of the introduction passage is engaged with the plate member, and including an urging member disposed between the opposite end portion of the introduction passage and the plate member for urging the opposite end portion toward the second movable wall so that the opposite end portion is brought into contact with the second movable wall.

25. The negative pressure type booster as claimed in claim 24, wherein the housing includes a front shell at a front side and a rear shell at a rear side, and upon assembling the front shell and the rear shell together, the front shell integrally includes at least the plate member and the introduction passage, and the rear shell integrally includes at least the first movable wall and the valve housing.

26. The negative pressure type booster as claimed in claim 22, including an urging member disposed between the one end portion of the introduction passage and the opposite end portion of the introduction passage, said urging member urging the one end portion of the introduction passage toward the plate member so that the one end portion is brought into contact with the plate member and urging them opposite end portion of the introduction passage toward the second movable wall so that the opposite end portion is brought into contact with the second movable wall.

27. The negative pressure type booster as claimed in claim 26, wherein the housing includes a front shell at a front side and a rear shell at a rear side, and upon assembling the front shell and the rear shell, the front shell integrally includes at least the plate member, and the rear shell integrally includes at least the first movable wall and the valve housing.

28. The negative pressure type booster as claimed in claim 21, wherein the housing includes a front shell at a front side and a rear shell at a rear side, and upon assembling the front shell and the rear shell together, the front shell integrally includes at least the output member, the plate member, and the introduction passage, and the rear shell integrally includes at least the movable wall and the valve housing.

29. The negative pressure type booster as claimed in claim 28, wherein the front shell integrally includes the switching means.

30. The negative pressure type booster as claimed in claim 16, wherein the plate member includes an opening to which the one end portion of the introduction passage is coupled, and an outer periphery of the one end portion of the introduction passage including an annular groove with which a peripheral flange portion of the opening of the plate member is engaged.

31. The negative pressure type booster as claimed in claim 16, wherein the housing includes a first cylindrical portion bulging toward the constant pressure chamber at a front portion, and the plate member includes a second cylindrical portion extending in a rear and front direction, and including a seal member disposed between an outer peripheral portion of the first cylindrical portion and an inner peripheral portion of the second cylindrical portion.

32. The negative pressure type booster as claimed in claim 31, including an introduction conduit for communicating the switching means with the space portion, the introduction conduit being in communication in an airtight manner with the space portion through the seal member.

\* \* \* \* \*